(12) United States Patent
Yahata et al.

(10) Patent No.: US 8,447,164 B2
(45) Date of Patent: May 21, 2013

(54) RECORDING MEDIUM, REPRODUCTION DEVICE

(75) Inventors: Hiroshi Yahata, Osaka (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 518 days.

(21) Appl. No.: 12/749,914

(22) Filed: Mar. 30, 2010

(65) Prior Publication Data

US 2010/0183281 A1 Jul. 22, 2010

Related U.S. Application Data

(63) Continuation of application No. 10/594,687, filed as application No. PCT/JP2005/007302 on Apr. 15, 2005, now Pat. No. 7,720,355.

(30) Foreign Application Priority Data

Apr. 16, 2004 (JP) .................................. 2004-121594

(51) Int. Cl.
*H04N 9/80* (2006.01)
(52) U.S. Cl.
USPC ......................................................... 386/241
(58) Field of Classification Search
None
See application file for complete search history.

(56) References Cited

U.S. PATENT DOCUMENTS

| | | | |
|---|---|---|---|
| 5,913,010 A | 6/1999 | Kaneshige et al. | |
| 6,393,204 B2 | 5/2002 | Setoguchi et al. | 386/111 |
| 7,346,216 B2 | 3/2008 | Adachi et al. | 382/236 |
| 2002/0158971 A1 | 10/2002 | Daiku et al. | |
| 2003/0103604 A1 | 6/2003 | Kato et al. | |
| 2003/0113096 A1 | 6/2003 | Taira et al. | |
| 2003/0235404 A1 | 12/2003 | Seo et al. | |
| 2004/0001700 A1 | 1/2004 | Seo et al. | 386/70 |
| 2005/0019007 A1 | 1/2005 | Kato et al. | |
| 2005/0206783 A1 | 9/2005 | Kato | |
| 2007/0003219 A1 | 1/2007 | Ikeda et al. | |

FOREIGN PATENT DOCUMENTS

| | | |
|---|---|---|
| EP | 1 103 974 | 5/2001 |
| EP | 1 198 132 | 4/2002 |
| EP | 1 280 348 | 1/2003 |
| JP | 11004444 | 1/1999 |
| JP | 2000-228656 | 7/2000 |
| JP | 2002-0158971 | 5/2002 |
| WO | 04/001749 | 12/2003 |
| WO | WO 2004/045206 | 5/2004 |
| WO | 2004/055809 | 7/2004 |
| WO | WO 2004/095455 | 11/2004 |

OTHER PUBLICATIONS

Wiegand T: "Draft Text of Final Draft International Standard for Advanced Video Coding (ITU-T Rec. H.264/ISO/IEC 14496-10 AVC)." ISO/ IEC JTC1/SC29/WG11 N5555, Pattaya, Thailand, Mar. 31, 2003, pp. I-XVI, 01, XP001091555.

(Continued)

*Primary Examiner* — Huy T Nguyen
(74) *Attorney, Agent, or Firm* — Panasonic Patent Center

(57) ABSTRACT

A BD-ROM has a video stream, playlist information, and an entry map recorded thereon. The playlist information defines a playback path by indicating a sequence of one or more pairs of a playback start time (In_time) and a playback end time (Out_time) within the video stream. The entry map (EP_map) indicates positions (SPN_EP_start) and playback times (PTS_EP_start) of a plurality of intra pictures in the video stream, in one-to-one correspondence with flags (is_angle_change_point). Each flag indicates whether a corresponding intra picture is an intra picture (IDR picture) for causing decoder refresh or an intra picture (Non-IDR picture) having reference to a preceding picture.

2 Claims, 42 Drawing Sheets

OTHER PUBLICATIONS

Blu-ray Disc: "Application Definition Blu-ray Disc Format BD-J Baseline Application and Logical Model Definition for BD-ROM" Internet Citation, [Online] Mar. 1, 2005, pp. 1-45, XP007904998.

Blue-ray Disc: "While paper Blu-ray disc format 2.A logical and Audio Visual Application Format Specification for BD-RE", Internet Citation, [Online] Aug. 1, 2004, pp. 1-26, XP007904846.

Karczewicz M et al.: "The SP- and SI-Frames Design for H.264/AVC", IEEE Translations on Circuits and Systems for video technology, IEEE Service Center, Piscataway, NJ, US, vol. 13, No. 7, Jul. 1, 2003, pp. 637-644, XP011099256.

Supplementary European Search Report of European Patent Application No. EP05730640.9, dated on Mar. 24, 2010.

Kelly, D.P. et al., "Blu-Ray Disc—a Versatile Format for Recording High Definition Video", 2003 digest of technical papers; Int'l Conference on Consumer Electronics (Cat. No. 03CH37416) IEEE, Piscataway, NJ, USA, vol. Conf. 22, Jun. 17, 2003, pp. 72-73.

JVT: "Study of Final Committee Draft of Joint Video Specification (ITU-T Rec. H.264: ISO/IEC 14496-10 AVC)" ITU Study Group 16—Video Coding Experts Group—ISO/IEC MPEG & ITU-T VCEG(ISO/IEC JTC1/SC29/WG11 and ITU-T SG16 Q6), XX, XX, No. JVT-F100, Dec. 13, 2002, XP030005665.

EPO Office Action dated Jun. 1, 2010, regarding the corresponding European patent application No. 05730556.7.

Jisedai Dougazou Fugouka Housiki/MPEG-4AVC /H.264, p. 36-37, Mar. 12, 2004.

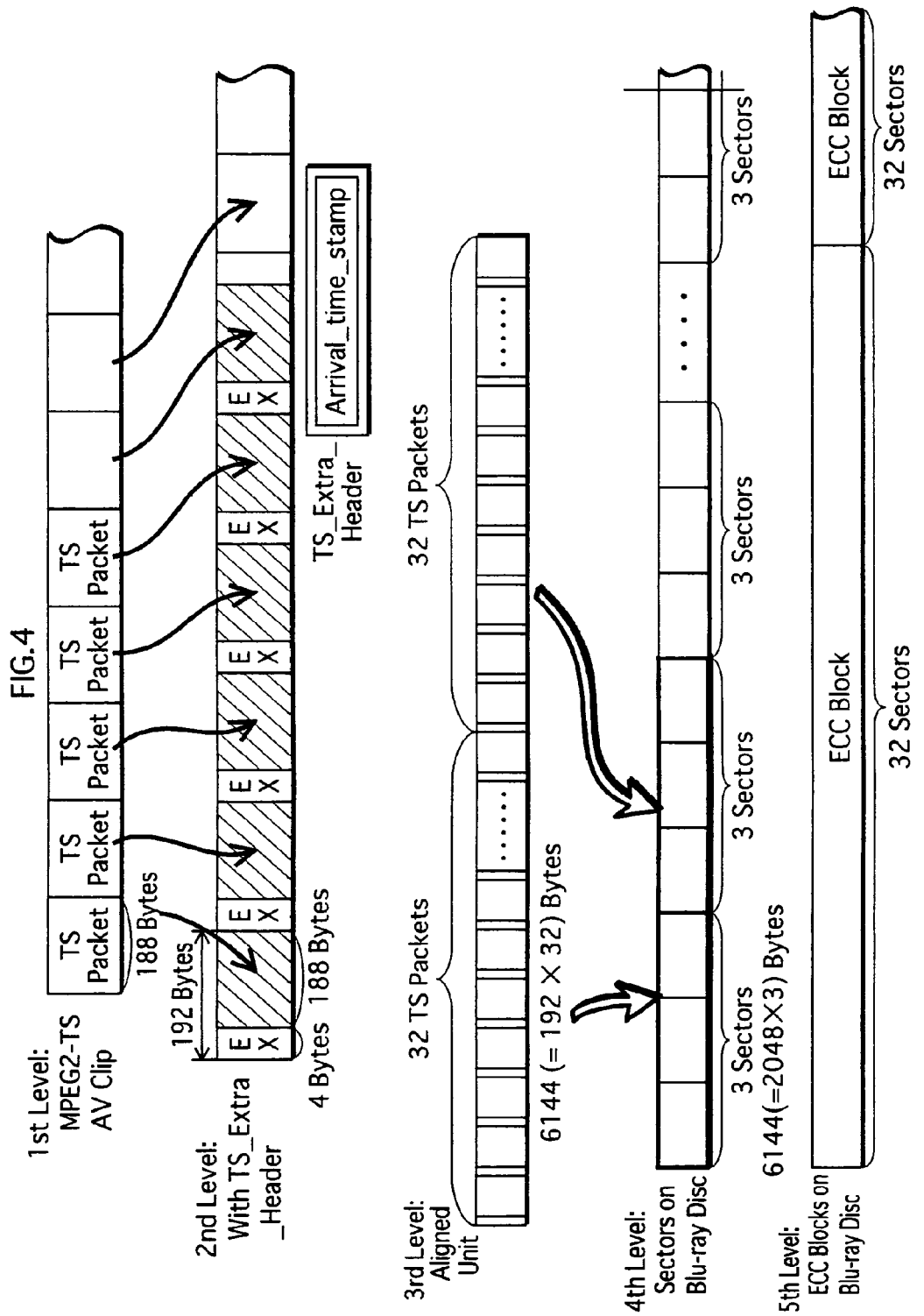

MPEG4-AVC
Video Stream
(Coding Order)

Closed-GOP

Open-GOP

IDR Picture in MPEG4-AVC Format

Non-IDR I Picture

FIG.11A

Stream_Coding_Info

| Stream_Coding_type | ⇐ MPEG4-AVC, MPEG2-Video |
| Video_format | ⇐ 480i,576i,480p,1080i,720p,1080p |
| frame_rate | ⇐ 23.976,29.97,59.94 |
| aspect_ratio | ⇐ 4:3,16:9 |

FIG.11B

Stream_Coding_Info

| Stream_Coding_type | ⇐ LPCM,DolbyAC-3,Dts |
| audio_presentation_type | ⇐ Stereo, Mono, Multi |
| Sampling_frequency | ⇐ 48kHz,96kHz,192kHz |
| audio_language_code | |

FIG.14

Back to IDR Picture in Past Direction

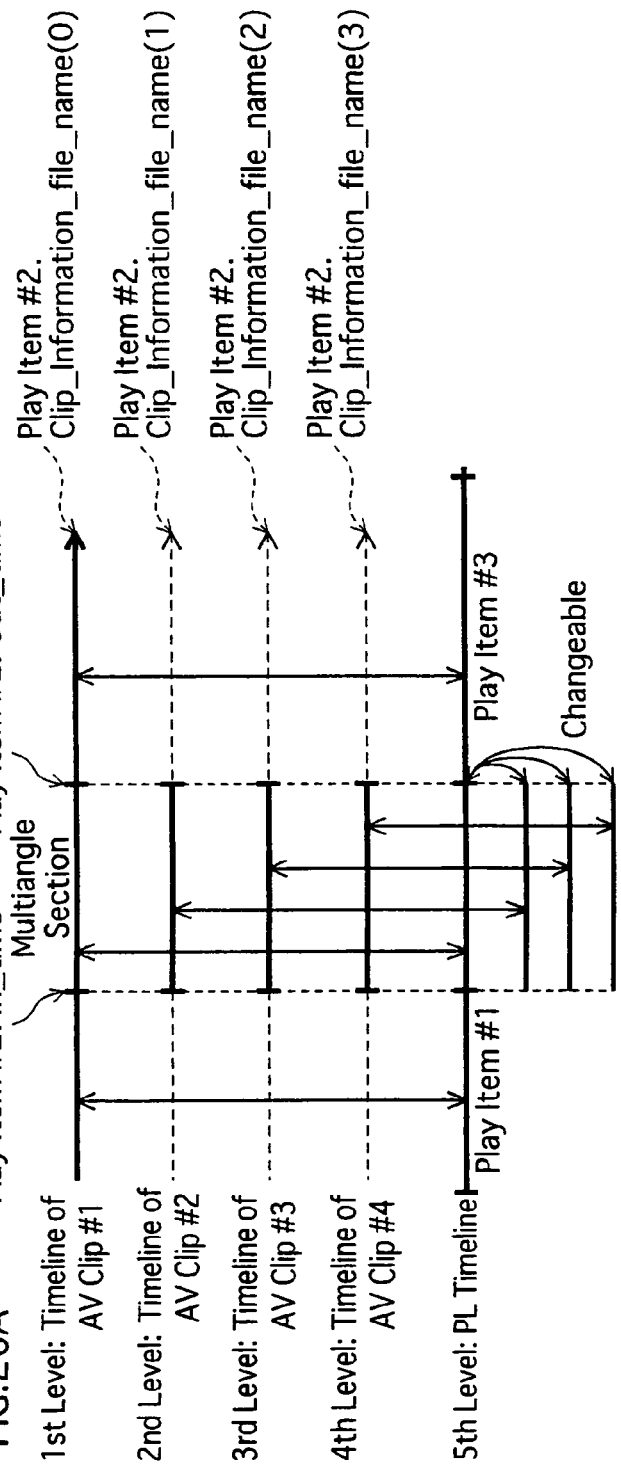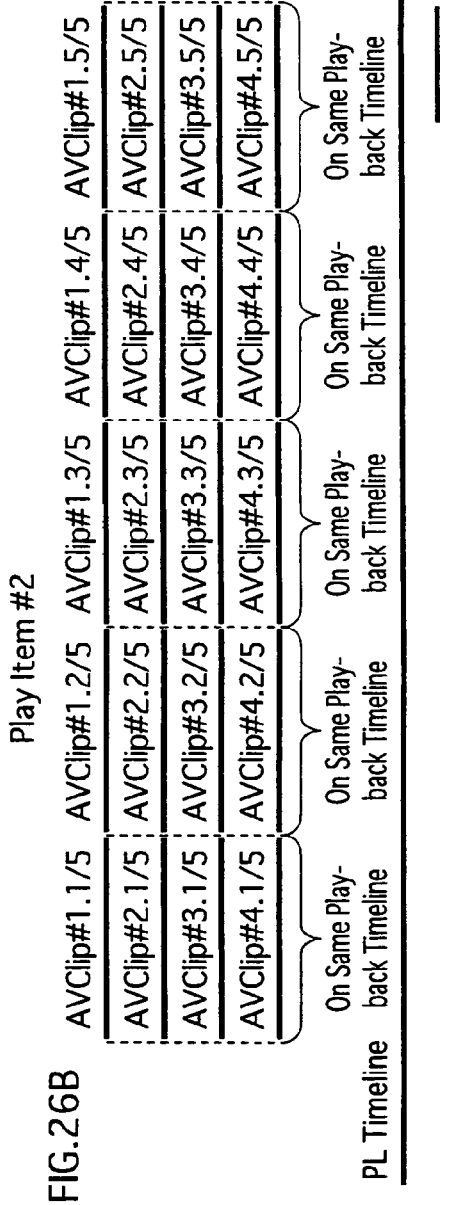
FIG.26A
FIG.26B

RECORDING MEDIUM, REPRODUCTION DEVICE

TECHNICAL FIELD

The present invention relates to a technique of defining a playback path.

BACKGROUND ART

A playback path is a logical unit of a digital stream recorded on a recording medium and defined by playback path information also recorded on the recording medium. A playback apparatus executes playback of the digital stream in accordance with the playback path information. With this technique, simply by defining a plurality of pieces of playback path information, the same digital stream can be played back with variations. With this advantage, the technique is considered essential in creating multi-story movies.

Playback path information may be defined using addresses on the recording medium or time information. In the case of playback path information defined using time information, the time information needs to be converted into address information of a specific point on the stream. The conversion is carried out by converting the time information specifying the start point of playback path (In_time) to the address of an I picture. Here, the address derived from the same In_time differs depending on the GOP structure of the video stream. In the case where the video stream is an MPEG2-Video stream and the In_time corresponds to a Closed-GOP, the first I picture of the GOP shall be read. Thus, the address of the first I picture in the GOP to which In_time belongs needs to be derived as a result of the conversion.

On the other hand, an Open-GOP has reference to the previous GOP and is not independently decodable. In order to correctly start playback from an Open-GOP corresponding to In_time, the playback apparatus needs to start reading the video stream from the immediately preceding GOP to the GOP corresponding to the In_time. As described above, playback of an Open-GOP requires the playback apparatus to read an extra GOP before reading the Open-GOP.

The following patent literature discloses a data structure for facilitating playback of a playback path defined using time information.

Patent Literature 1: JP Patent Application Publication No. 2001-169247 (Application No. 2000-228656)

DISCLOSURE OF THE INVENTION

Problems the Invention is Attempting to Solve

In the case of an MPEG2-Video stream, an open-GOP uses reference pictures as far as from the immediately previous GOP. In the case of an MPEG4-AVC stream, however, an open-GOP may have a reference to a picture contained in as many as tens of frames before the current frame. It is because the MPEG4-AVC decoder model uses two types of reference pictures, namely short-term reference pictures and long-term reference pictures. A long-term reference picture may be used by a picture that is located tens of pictures after the long-term reference picture. Thus, reading of the immediately previous GOP is not sufficient to provide the decoder with all the reference pictures necessary for decoding.

In view of the above, the playback apparatus needs to read a large number of pictures in preparation for the worst case. In the worst case, a picture to be decoded may have a reference to a picture located at the beginning of the video stream. If so, the playback apparatus needs to read all the pictures from the beginning of video stream. Suppose, for example, that a video stream is worth two hours of playback and that a request is made to start playback from a point corresponding to one hour from the beginning of the video stream. In this case, the playback apparatus is required to read and decode picture data worth one hour of playback time. Thus, it takes a long time before all the necessary reference pictures are ready in the decoder.

As described above, it takes a relatively long time to specify the start address of a playback path defined using time information. Due to this drawback, the MPEG4-AVC standard is said not suitable for movie distribution via a recording medium. MPEG4-AVC streams are said most advantageous in the form of stream distribution where the stream is always played back from the beginning. Yet, in view of the advantage of high image quality and high compression rate, it is a waste to abandon the application of MPEG4-AVC standard to recording media even if it takes a relatively long time to specify the start address of a playback path defined using time information.

In view of the above, the present invention aims to provide a recording medium that ensures efficient playback of a video stream following a playback path defined using time information, in the case where the video stream contains an open-GOP having a reference to a GOP located at quite a distance in the video stream.

Means for Solving the Problems

In an attempt to achieve the above aim, the present invention provides a recording medium having a video stream, playlist information, and an entry map recorded thereon. The playlist information defines a playback path by indicating a sequence of one or more pairs of a playback start time and a playback end time within the video stream. The entry map indicates a plurality of entry points in the video stream, in one-to-one correspondence with a plurality of entry times and flags. Each flag indicates whether an intra picture at a corresponding entry point is for causing decoder refresh.

Effects of the Invention

According to the present invention, each flag recorded on the recording medium is associated with a picture located at an entry point and indicates whether the associated picture is an intra picture that causes decoder refresh or an intra picture that has a reference to a previous picture. With reference to the flags associated with the respective entry points, the playback apparatus is enabled to distinguish which of the pictures are intra pictures for causing decoder refresh. Even in the case where an open-GOP has a reference to a number of pictures away, the long-term reference does not go beyond any picture at which the decoder is to be refreshed. Thus, when executing playback of a playback path defined using time information, the playback apparatus starts reading from the first previous picture for causing decode refresh. Consequently, it is ensured that the decoder is supplied with all the reference pictures necessary for decoding a picture located at the start point of the playback path.

Suppose, for example, that a video stream is worth two hours of playback and that playback is to be executed from a playback point corresponding to one hour of playback time from the stream start point. In order to execute such playback, reading of the video stream should be started from the first previous picture for causing decoder refresh, so that all the necessary reference pictures are sufficiently supplied to the decoder. Consequently, data that needs to be read is reduced from data worth one hour to data worth fifteen minutes. As a result, reference pictures necessary for decoding the picture at the requested playback start point will be ready in the decoder sooner than in a conventional technique. With this improvement, the MPEG4-AVC format is applicable to a wider variety of uses, including movie distribution via recording media.

BEST MODE FOR CARRYING OUT THE INVENTION

First Embodiment

The following describes an embodiment of a recording medium according to the present invention. First of all, among various acts of practicing a recording medium of the present invention, an act of using is described. FIG. 1 illustrates a form of using the recording medium according to the present invention. In FIG. 1, a BD-ROM 100 is a recording medium according to the present invention. The BD-ROM 100 is used to supply a movie to a home theater system composed of a playback apparatus 200, a remote controller 300, and a television set 400.

This concludes the description of the act of using the recording medium of the present invention. Now, the following describes the act of manufacturing, as one example of acts of practicing the recording medium of the present invention. FIG. 2 illustrates the internal structure of the BD-ROM.

In the figure, the BD-ROM is illustrated on the fourth level, and the track of the BD-ROM is illustrated on the third level. The track is laterally stretched out, although the track in practice spirals outwards from the center of the BD-ROM. The track is composed of a lead-in area, a volume area, and a lead-out area. The volume area has a layer model of a physical layer, a file system layer, and an application layer. The first level illustrates, in a directory structure, a format of the application layer (application format) of the BD-ROM. As illustrated on the first level, the BD-ROM has a ROOT directory, and the ROOT directory has a BDMV directory.

The BDMV directory has three subdirectories called a PLAYLIST directory, a CLIPINF directory, and a STREAM directory.

The STREAM directory stores files with the extension ".m2ts" (e.g. files called "00001.m2ts", "00002.m2ts", and "00003.m2ts") containing data constituting the main body of an individual digital stream.

The PLAYLIST subdirectory stores files with the extension ".mpls" (e.g. files called "00001.mpls", "00002.mpls", and "00003mpls").

The CLIPINF directory stores files with the extension ".clpi" (e.g. files called "00001.clpi", "00002.clpi", and "00003.clpi").

<AV Clip Structure>

Next, a description is given of files with the extension ".m2ts". FIG. 3 schematically illustrates the structure of a file with the extension ".m2ts". Each file with the extension ".m2ts" (namely, 00001.m2ts, 00002.m2ts, 00003.m2ts, . . . ) contains an AV clip. The AV clip (illustrated on the middle level) is created as follows. A video stream (illustrated on the upper first level) containing a plurality of video frames (pictures pj1, pj2, pj3, . . . ) is converted into PES packets (illustrated on the upper second level). Similarly, an audio stream (illustrated on the upper first level) containing a plurality of audio frames is converted into PES packets (illustrated on the upper second level). The resulting PES packets are further converted into TS packets (illustrated on the upper third level). In addition, the presentation graphics stream carrying text subtitle data (the PG stream illustrated on the lower first level) and the interactive graphics stream carrying interactive composition data (the IG stream illustrated on the lower second level) are converted into TS packets. These TS packets of the video, audio, IG, and PG streams are multiplexed to form the AV clip.

Next, a description is given of how an AV clip, which is an MPEG2-TS digital stream, is recorded onto the BD-ROM. FIG. 4 illustrates the process through which TS packets carrying the AV clip are recorded onto the BD-ROM. In FIG. 4, the TS packets of the AV clip are illustrated on the first level.

As illustrated on the second level, each TS packet of the AV clip is attached with "TS_extra_header" (denoted as "EX" in the figure).

The third and fourth levels illustrate the physical units of the BD-ROM in relation to the TS packets. As illustrated on the fourth level, the track on the BD-ROM is divided into a plurality of sectors. The TS packets each attached with the TS_extra_header (hereinafter, simply "EX-TS packets") are divided into groups of 32 EX-TS packets, and each group is written into three sectors of the BD-ROM. Each group composed of 32 EX-TS packets amounts to 6,144 (=32×192) bytes, which is equal to the total size of three sectors (=2048×3). Each group of 32 EX-TS packets stored in three sectors of the BD-ROM is referred to as an "Aligned Unit". When data is recorded onto the BD-ROM, encryption is carried out in Aligned Units.

As illustrated on the fifth level, an error correction code is attached to every 32 sectors to constitute an ECC block. As long as accessing the BD-ROM in Aligned Units, the playback apparatus is ensured to obtain a complete set of 32 EX-TS packets. This concludes the description of the process of recording the AV clip onto the BD-ROM.

<Video Stream>

The following describes the internal structure of an MPEG4-AVC video stream. An MPEG4-AVC video stream is composed of a plurality of pictures. FIG. 5A illustrates the plurality of pictures arranged in the coding order.

In the figure, the reference numerals "I", "P", and "B" denote an I picture, a P picture, and a B picture, respectively. There are two types of I pictures: one is an IDR picture and the other is a Non-IDR I picture. Non-IDR I pictures, P pictures, and B pictures are encoded using correlation with other pictures. More specifically, a B picture is composed of Bidirectionally Predictive (B) slices, and a P picture is composed of Predictive (P) slices. There are two types of B pictures: one is a reference B picture, and the other is a non-reference B picture.

In FIG. 5A, a Non-IDR I picture is denoted as "I", and an IDR picture is denoted as "IDR". The same denotations are used throughout the following descriptions and figures.

<GOP Structure>

FIG. 5B illustrates the GOP structure of the video stream illustrated in FIG. 5A. As illustrated in the figure, an IDR picture, together with the following B and P pictures, forms a closed-GOP. On the other hand, a Non-IDR I picture, together with the following B and P pictures, forms an open-GOP.

FIG. 6A illustrates the internal structure of a closed-GOP. The upper level illustrates the pictures of the closed-GOP in the presentation order, and the lower level illustrates the pictures of the closed-GOP in the coding order. In the coding order, the closed-GOP starts with an IDR picture. In the presentation order, however, the IDR picture is not the first picture in the closed-GOP. Yet, even the pictures other than the IDR picture (B and P pictures) do not rely on any pictures from the previous GOPs. In the figure, an arrow attached with the mark "x" represents that the closed-GOP does not use any reference pictures from the previous GOPs. As described above, a closed-GOP is independent without any reference to the previous GOPs.

FIG. 6B illustrates the internal structure of an open-GOP. The upper level of FIG. 6B illustrates the pictures of the open-GOP in the presentation order, and the lower level illustrates the pictures of the open-GOP in the coding order. In the coding order, the open-GOP starts with a Non-IDR I picture. In the presentation order, however, the IDR, Non-IDR I, and P pictures are arranged in a different sequence. More specifically, in the presentation order, B pictures precede the Non-IDR I picture. The B pictures preceding the Non-IDR I picture relay on the previous GOPs. Yet, pictures subsequent to the Non-IDR I picture do no rely on any pictures from the previous GOPs. As described above, an open-GOP may have references to the previous GOPs. This concludes the description of the GOP structure of an MPEG4-AVC stream.

Next, the following describes the internal structures of an IDR picture and a Non-IDR I picture. FIG. 7A illustrates the internal structure of an IDR picture. As illustrated in the figure, the IDR picture is composed of a plurality of Intra slices. FIG. 7B illustrates the internal structure of a Non-IDR I picture. Different from the IDR picture composed solely of Intra slices, the Non-IDR I picture is composed of Intra-, P-, and B-slices. FIG. 7C illustrates the dependencies between the Non-IDR I picture and other pictures. A Non-IDR I picture may be composed of B and P slices and thus may have references to other pictures.

FIG. 8 illustrates the dependencies that a Non-IDR I picture may have. The first level illustrates a sequence of pictures in the presentation order. The second level illustrates a sequence of pictures in the coding order. Arrows in the figure schematically represent references that the Non-IDR I picture may have. Although some pictures are referenced over a relatively long period, no picture is referenced beyond an IDR picture. It is because an IDR picture requires decoder refresh, so that all the reference pictures stored on the decoder are erased. Thus, no Non-IDR I picture has references beyond an IDR picture.

<IDR Picture>

The following describes the technical significance of inserting IDR pictures in a video stream. An IDR picture forms a closed-GOP and is not located at fixed unit intervals, such as every GOP. The number and locations of IDR pictures contained in a single video stream vary depending on the encoding condition. Depending on the encoding condition, a video stream may contain relatively few IDR pictures or relatively many IDR pictures. Since an IDR picture is encoded without using any short-term and long-term reference pictures, the video stream containing a larger number of IDR pictures achieves lower compression rate. Thus, the compression rate decreases with the increase in the number of IDR pictures. Yet, the presence of at least one IDR picture in the video stream significantly helps to efficiently execute trick play starting from a randomly chosen point in the video stream.

Suppose, for example, a P picture needs to be decoded to execute trick play. In this case, it cannot be determined up to how many previous pictures in the video stream need to be decoded in order to decode the P picture. It is because the target P picture may have references to a previous B picture, and the B picture may in turn have references to another previous B or P picture in the coding order. Thus, there is no fixed rule as to how may previous pictures need to be decoded for correctly decoding the target P picture. Yet, if the video stream contains IDR pictures at appropriate points, it is known that inter-picture dependencies do not exist across any IDR picture. Thus, decoding of up to the nearest preceding IDR picture ensures that all the pictures necessary for playback of the target P picture is supplied to the decoder. In this way, decoding of a P picture in trick play execution is facilitated. As a consequence, fast-speed playback of the video stream, which involves sequential decoding of I and P pictures, is readily executed.

As described above, the number and locations of IDR pictures in a single video stream are determined in accordance with the encoding condition. In the determination, it is important to consider both the efficiency of trick play and compression rate. The description of the present embodiment is given on precondition that IDR pictures are located at relatively long time intervals, such as fifteen-minute or thirty-minute intervals.

<Recording to BD-ROM>

Next, the following describes how IDR pictures and Non-IDR I pictures are converted into TS packets and recorded onto the BD-ROM. FIG. 9 illustrates the process through which an IDR or Non-IDR I picture is converted into TS packets. In the figure, the first level illustrates an IDR or Non-IDR I picture. The second level illustrates an Access Unit stipulated according to MPEG4-AVC. A plurality of slices constituting the IDR or Non-IDR I picture is arranged in a sequence. Then, AUD (Access Unit Delimiter), SPS (Sequence Parameter Set), PPS (Picture Parameter Set), and SEI (Supplemental Enhanced Information) are attached to the slice sequence. In this way, the picture slices are converted into an Access Unit.

AUD, SPS, PPS, SEI, and Access Unit mentioned above are information all stipulated according to MPEG4-AVC and described in various documents, such as "ITU-T Recommendation H.264". For the details, such documents should be referenced. The point in this description is that AUD, SPS, PPS, and SEI need to be supplied to the playback apparatus for executing random access to the video stream.

The third level illustrates NAL units. AUD, SPS, PPS, SEI, and slices illustrated on the second level are separately attached with a header to be converted into separate NAL units. NAL units are supported by the Network Abstraction Layer (NAL) stipulated according to MPEG-4 AVC and described in various documents, such as "ITU-T Recommendation H.264". For the details, such documents should be referenced. The point in this description is that AUD, SPS, PPS, SEI, and each slice are converted into separate NAL units and manipulated independently in the Network Abstraction Layer.

As described above, the single picture is converted into a plurality of NAL units. Then, the NAL units are converted into PES packets illustrated on the fourth level, and the PES packets are converted into TS packets. Finally, the resulting TS packets are recorded onto the BD-ROM.

In order to play back one GOP, the playback apparatus needs to supply the decoder with a NAL unit containing AUD of the first IDR or Non-IDR I picture in the GOP. That is, the NAL unit containing AUD is used as an index for decoding the IDR or Non-IDR I picture. In this embodiment, each NAL unit containing AUD is regarded as a point. For playback of the video stream, the playback apparatus recognizes each of such a point as an entry point for executing playback of an I picture. Consequently, for execution of jump playback to a randomly access point in the AV clip, it is extremely important for the playback apparatus to recognize the locations of AUDs of IDR and Non-IDR I pictures. This concludes the description of the structure of the MPEG-4 AVC video stream.

<Clip Information>

Next, the following describes files with the extension ".clpi". Each file with the extension ".clpi" (e.g. 00001.clpi, 00002.clpi, 00003.clpi, ...) contains Clip information. Each piece of Clip information is management information of an individual AV clip. FIG. 10 illustrates the internal structure of a piece of Clip information. As illustrated in the left block of the figure, the Clip information is composed of the following fields:

(i) "ClipInfo( )" storing the attributes of the AV clip file;
(ii) "Sequence Info( )" storing information related to the ATC Sequence and STC sequence;
(iii) "Program Info( )" storing information related to the program sequence; and
(iv) "Characteristics Point Info (CPI ( ))".

Leader lines cu1 in the figure indicates that the structure of the i-th program sequence (Program Sequence(i)) is illustrated in greater detail. As indicated by the leader lines cu1, the Program Info associated with the Program Sequence(i) is composed of the total number of Ns(i) pairs of Stream_PID and Stream_Coding_Info (in the figure, Stream_PID[i](0) and Stream_Coding_Info(i, 0)-Stream_PID[i](Ns(i)-1) and Stream_Coding_Info(i, Ns(i)-1)).

The Stream_PID is a packet identifier of an individual packet carrying an elementary stream constituting the AV clip. The Stream_Coding_Info indicates the coding standard used to encode the elementary stream.

FIG. 11A illustrates the Stream_Coding_Info associated with the video stream, whereas FIG. 11B illustrates Stream_Coding_Info associated with the audio stream. The Stream_Coding_Info is composed of the following fields: "stream_coding_type" indicating the coding method of the video stream is either MPEG4-AVC or MPEG2-Video; "video_format" indicating the video format is 480i, 576i, 480p, 1080i, 720p, or 1080p; "frame_rate" indicating the frame rate of the video stream is 23.976 Hz, 29.97 Hz, or 59.94 Hz; and "aspect_ratio" indicating the aspect ratio of the pictures is 4:3 or 16:9.

FIG. 11B illustrates the Stream_Coding_Info associated with the audio stream. As illustrated in the figure, the Stream_Coding_Info associated with the audio stream is composed of the following fields: "stream_coding_type" indicating the coding type of the audio stream is LPCM, Dolby-AC3, or Dts; "audio_presentation_type" indicating the presentation type of the audio stream is stereo channel, mono channel, or multi-channel; "sampling_frequency" indicating the sampling frequency of the audio stream; and "audio_language" indicating a language code of the audio stream.

With reference to the Stream_Coding_Info, the playback apparatus is enabled to identify which of the elementary streams contained in an AV clip are MPEG4-AVC streams.

<CPI(EP_map)>

Next, a description of CPI is given with reference to FIG. 10 again. Leader lines cu2 in the figure indicates that the structure of CPI is illustrated in greater detail. As illustrated in the leader lines cu2, the CPI is composed of a plurality of EP_map fields. Each EP_map is composed of Ne piceces of EP_map_for_one_stream_PID (namely, EP_map_for_one_stream_PID(0)-(Ne-1)). Each piece of EP_map_for_one_stream_PID is an EP_map associated with one of elementary streams contained in the AV clip. An EP_map is information indicating entry points set on the associated elementary stream. An entry point is where the Access Unit Delimiter of an I picture is present. The EP_map indicates the packet number of each entry point (SPN_EP_start) and the corresponding entry time (PTS_EP_start). Leader lines cu3 in the figure indicates that the internal structure of EP_map_for_one_stream_PID is illustrated in greater detail.

As illustrated in the figure, the EP_map_for_one_stream_PID is composed of Nc pieces of EP_High (EP_High(0)-(Nc-1)) and Nf pieces of EP_Low (EP_Low(0)-(Nf-1)). Here, the EP_High holds the most significant bits of the SPN_EP_start and PTS_EP_start of an I picture. The EP_Low holds the least significant bits of the SPN_EP_start and PTS_EP_start of the I picture.

Leader lines cu4 in the figure indicate that the internal structure of the EP_High is illustrated in greater detail. As illustrated in the leader lines cu4, EP_High(i) is composed of the following fields: "ref_to_EP_Low_id[i]" which is a reference value to the EP_Low; "PTS_EP_High[i]" indicating the most significant bits of the PTS for the I picture; and "SPN_EP_High[i]" indicating the most significant bits of the SPN for the I picture. Here, the reference numeral "i" denotes an identifier uniquely identifying an arbitrary EP_High field.

Leader lines cu5 in the figure indicate that the EP_Low structure is illustrated in greater detail. As indicated by the leader lines cu5, the EP_Low is composed of the following fields: "is_angle_change_point (EP_Low_id)"; "I_end_position_offset (EP_Low_id)" indicating the size of the associated I picture; "PTS_EP_Low(EP_Low_id)" indicating the least significant bits of the PTS of the associated I picture; and "SPN_EP_Low(EP_Low_id)" indicating the least significant bits of the SPN of the associated I picture. Here, the "EP_Low_id" denotes an identifier uniquely identifying an arbitrary EP_Low field.

The data structure of the EP_map as described above is basically disclosed, for example, in the above patent literature. Thus, no further description is given in this specification. Yet, the flag called "is_angle_change_point" is one feature of the present invention and thus will be described in detail.

The "is_angle_change_point" is a flag indicating whether the I picture specified as an entry point serves as a point where the playback apparatus can enter to the AV clip form other AV clips. FIG. 12 illustrates the concept of entering to an AV clip and exiting form the AV. Here, the process of entering to an AV clip refers to the seek process of causing the optical pickup to move from the current TS packet contained in the current AV clip to a TS packet contained in another AV clip. An arrow er1 illustrated in FIG. 12 schematically represents the movement of the optical pickup at the time of entering to the AV clip. Each TS packet specified by the is_angle_change_point field set to the value "1" is judged as a permissible entering point.

The TS packet immediately preceding a TS packet specified by the is_angle_change_point field set to the value "1" is judged as an exit point to the AV clip. Here, the process of exiting from an AV clip refers to a seek process of causing the optical pickup to move from the currently reading TS packets contained in the current AV clip to a TS packet contained in another AV clip. An arrow ex1 illustrated in FIG. 12 schematically represents the movement of the optical pickup exiting from the AV clip.

At the time of entering to an AV clip from another AV clip, the decoder cannot use any pictures obtained through the decoding process having been conducted by that time. Thus, the I picture specified as an entry point by the is_angle_change_point field set to the value "1" must be an IDR picture. That is, the "is_angle_change_point" set to the value "1" indicates that the specified I picture is an IDR picture. The "is_angle_change_point" set to the value "0" indicates that the specified I picture is a Non-IDR I picture. The process illustrated in the figure, i.e. the process of "exiting" from the currently played AV clip and "entry" to another AV clip is referred to as "angle_change". The field is named "is_angle_change_point" in view of that the field specifies a point where "angle_change" is possible. It should be noted, however, that provision of the EP_map having the is_angle_change_point field set to "1" is not sufficient to implement the angle change process. The implementation of the angle change process additionally requires improvements on AV clips and PlayList information. The improvements of AV clips and PlayList information necessary for implementing the angle change will be described later in detail in a second embodiment of the present invention. Thus, such description is omitted in this embodiment.

It should be noted, in addition, that the EP_map is expressed as a pair of EP_High and EP_Low values in terms of the data structure. Yet, for the sake of simplicity of the description, unless specifically noted, the most significant bits and least significant bits of the PTS indicated by EP_High and EP_Low are collectively denoted as PTS_EP_start. Similarly, the most significant bits and least significant bits of the SPN indicated by EP_High and EP_Low are collectively denuded as SPN_EP_start.

The following describes how the EP_map associated with the video stream illustrated in FIGS. 5 and 8 is set. FIG. 13 illustrates the setting the EP_map associated with the video stream illustrated in FIG. 5. The first level illustrates a sequence of a plurality of pictures arranged in the presentation order. The second level illustrates the timeline for the picture sequence. The fourth level illustrates a plurality of TS packets stored on the BD-ROM. The third level illustrates the EP_map setting. Suppose that I pictures are located at points t1, t2, t3, t4, and t5 on the timeline illustrated on the second level. The PTS_EP_start fields of the EP_map are set to the value specifying the points t1-t5. The Access Unit Delimiters of the video stream stored on the BD-ROM are located at points n1, n2, n3, n4, and n5 in the TS packet sequence. The SPN_EP_start fields of the EP_map are set to the value specifying points n1-n5. Among entry points #1-#5 corresponding to the points t1-t5 and thus to the points n1-n5, pictures located at entry points #1 and #3 are IDR pictures. Thus, for entry points #1 and #3, the is_angle_change_point is set to the value "1". Regarding the other entry points, namely entry points #2, #4, and #5, the is_angle_change_point is set to the value "0".

Figure 14:
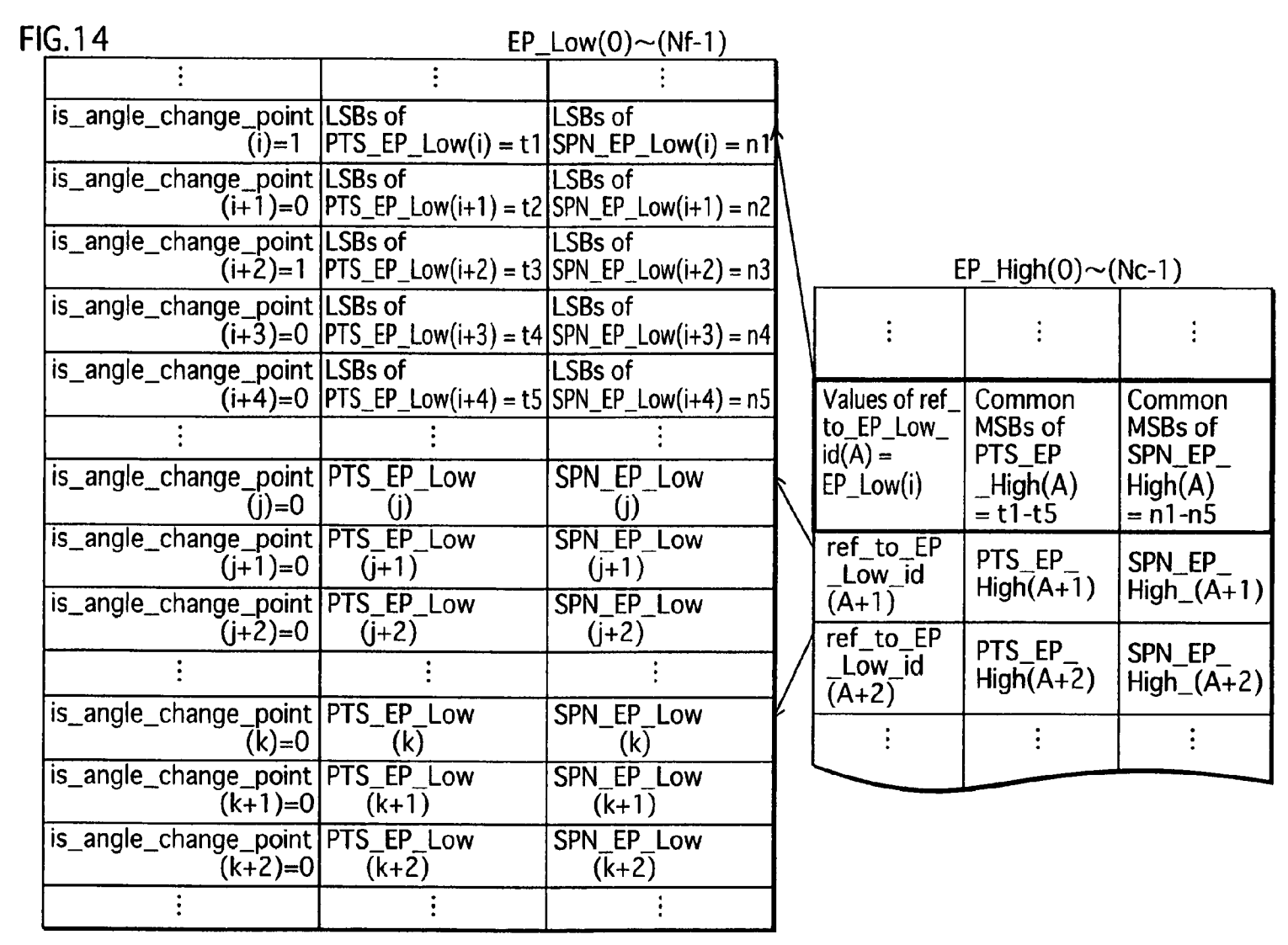

FIG. 14 shows, in tabular form, pairs of EP_Low and EP_High values indicating the PTS_EP_start and the SPN_EP_start of entry points #1-#5 illustrated in FIG. 13. In FIG. 14, the left table shows the values of EP_Low and the right table shows the values of EP_High.

In FIG. 14, the left table shows EP_Low(0)-(Nf-1). The EP_Low(i)-(i+1) values of the PTS_EP_Low indicate the least significant bits of the points t1-t5, respectively. The EP_Low(i)-(i+1) values of the SPN_EP_Low indicate the least significant bits of the points n1-n5, respectively. Among the is_angle_change_point(i)-(i+1), each of the is_angle_change_point(i) and the is_angle_change_point(i+2) is set to the value "1" because the corresponding I picture is an IDR picture. On the other hand, each of the is_angle_change_point(i+1), (i+3), and (i+4) is set to the value "0" because their corresponding pictures are Non-IDR I pictures.

The right table in FIG. 14 shows the values of EP_High (0)-(Nc-1) set in the EP_map. Provided that the points t1-t5 commonly have the same set of most significant bits and the points n1-n5 commonly have the same set of most significant bits, the values of PTS_EP_High and SPN_EP_High are set to the respective sets of most significant bits. In addition, the ref_to_EP_Low_id is set to specify the first EP_Low field (EP_Low(i)) out of the EP_Low fields indicating the points t1-t5 and n1-n5. With this setting, the EP_High indicates the common most significant bits of the PTS_EP_start and the common most significant bits of the SPN_EP_start.

The most significant feature of such EP_map lies in that the data required to be read to execute jump playback is kept to a minimum. FIG. 15 illustrates the range of data required to be read to execute jump playback.

Suppose, for example, jump playback is to be executed so as to start playback from the point corresponding to In_time illustrated in the figure. When the point corresponding to the In_time is a jump playback point, the playback apparatus locates the nearest one of the entry point preceding the jump playback point and with the is_angle_change_point set to the value "1". In the figure, the entry point corresponding to the temporal point t3 has the is_angle_change_point set to the value "1". Thus, the playback apparatus retrieves the value of the SPN_EP_start=n3 of entry point #3 that corresponds to the PTS_EP_start=t3. The playback apparatus then reads the TS packets carrying the AV clip, starting from the point n3 and supplies the read TS packets to the decoder. With this arrangement, the playback apparatus is enabled to supply to the decoder all the reference pictures necessary for decoding the I picture. That is, the need is eliminated to read the TS packets all the way from the beginning of the video stream.

Suppose, for example, that the video stream is worth two hours of playback time and that playback is to be started from a playback point whose In_time corresponds to one hour from the start of the video stream. In this example, the temporal point t3 corresponds to fifteen minutes before the In_time. Thus, by reading the preceding pictures up to the temporal point t3, the playback apparatus is enabled to supply all the reference pictures necessary for executing the jump playback to the decoder.

That is, when executing jump playback to start playback from the point corresponding to the In_time which is "one hour after" the start of the video stream, the playback apparatus starts reading the pictures at most from the point corresponding to fifteen minutes before the temporal point t3. As a result, all the reference pictures necessary for the decoding process are duly supplied to the decoder. In this manner, playback of an MPEG4-AVC video stream stored on a BD-ROM can be started from any given point on the video stream by reading a minimum range of the stream data. This advantageous feature helps to use the MPEG4-AVC format for movie distribution via BD-ROM and thus significantly increases the usage of the MPEG4-AVC format.

In the following description, a comparison is made in data structure between the EP_map for an MPEG4-AVC stream and the EP_map for an MPEG2-Video stream. Both the EP_map for an MPEG4-AVC stream and the EP_map for an MPEG2-Video stream commonly show the relationships between the SPN and PTS values of I pictures. The difference lies in that the EP_map for an MPEG4-AVC stream includes the is_angle_change_point field indicating whether the associated I picture is an IDR picture or a Non-IDR I picture. The EP_map of an MPEG4-AVC stream indicates, for each of IDR and Non-IDR I pictures, the is_angle_change_point field in addition to a pair of SPN and PTS. Furthermore, the EP_map for an MPEG4-AVC stream is compatible with the EP_map for an MPEG2-Video stream. Owing to the compatibility between the EP_map for an MPEG4-AVC stream and the EP_map for an MPEG2-Video stream, BD-ROM creators are allowed to choose either of the MPEG2-Video and PEG4-AVC standards without giving any consideration to the EP_map structure. Consequently, a choice between the MPEG2-Video and MPEG4-AVC standards can be made relatively freely without being bound to EP_map structure.

That is to say, the BD-ROM creators are offered wider variety of options in the selection of codec standard.

This concludes the description of the Clip information according to the present embodiment. Next, a description is given of files with the extension "mpls".

<PlayList Information>

Each file with the extension "mpls" (00001.mpls, 00002.mpls, 00003.mpls . . . ) stores PlayList information. PlayList information defines a playback path called a PlayList that uses elementary streams. FIG. 16 illustrates the data structure of PlayList information. As illustrated in the middle block of the figure, the PlayList information is composed of a plurality of pieces of PlayItem information. A PlayItem defines a playback section by specifying a pair of In_time and Out_time on at least one AV clip timeline. With a plurality of pieces of PlayItem information, the PlayList information defines a PlayList (PL) composed of multiple playback paths. The dashed lines hs1 in the figure indicates that the internal structure of the PlayItem information is illustrated in greater detail. As illustrated in the figure, the PlayItem information is composed of the following fields: "Clip_information_file_name" indicating the name of a file containing the associated Clip information; "Clip_codec_identifier" indicating the coding type of the associated AV clip; and "In_time"; and "Out_time. FIG. 17 illustrates the relationship between the AV clip and the PlayList information. The first level illustrates the timeline of the AV clip. The second level illustrates the timeline of the PlayList information (hereinafter, PL timeline). The PlayList information contains three pieces of PlayItem information called PlayItem #1, #2, and #3. The In_time and Out_time of the respective pieces of PlayItem information define three playback sections. By linearly aligning the three playback sections, a timeline that is different from the AV clip timeline is defined. This timeline is the PL timeline illustrated on the second level. As described herein, with the use of PlayItem information, a different timeline from the AV clip timeline is defined.

As described above, the EP_map contained in the Clip information indicates, for each I picture contained in the video stream, a pair of SPN and PTS values of the I picture along with whether the I picture is an IDR picture. Since the EP_map enables the playback apparatus to efficiently execute trick play starting from a given temporal point, the PlayList information is expressed using time information on precondition that trick play can be efficiently executed. This expression ensures the compatibility in data structure between the PlayList information on the BD-ROM and the PlayList information on a rewritable recording medium (BD-RE).

This concludes the description of the internal structure of the PlayList information according to the present embodiment and thus concludes the description of the recording medium according to the present invention. Next, a description is given of the playback apparatus according to the present invention.

<Internal Structure of Playback Apparatus>

FIG. 18 illustrates the internal structure of the playback apparatus. Based on the internal structure illustrated in the figure, playback apparatuses consistent with the present invention are industrially manufactured. The playback apparatus of the present invention is roughly composed of two parts, one of which is a system LSI and the other is a drive device. By mounting those parts into a device cabinet and onto a substrate, the playback apparatus can be manufactured industrially. The system LSI is an integrated circuit containing various processing units for implementing the functions of the playback apparatus. The playback apparatus manufactured in the above manner is composed of a BD drive 1, an arrival time clock counter 2, a source de-packetizer 3, a PID filter 4, a transport buffer 5, a multiplexed buffer 6, a coded picture buffer 7, a video decoder 8, a decoded picture buffer 10, a video plane 11, a transport buffer 12, a coded data buffer 13, a stream graphics processor 14, an object buffer 15, a composition buffer 16, a composition controller 17, a presentation graphics plane 18, a CLUT unit 19, a transport buffer 20, a coded data buffer 21, a stream graphics processor 22, an object buffer 23, a composition buffer 24, a composition controller 25, an interactive graphics plane 26, a CLUT unit 27, compositors 28 and 29, a switch 30, a network device 31, a local storage 32, an arrival time clock counter 33, a source de-packetizer 34, a PID filter 35, a switch 36, a transport buffer 37, an elementary buffer 38, an audio decoder 39, a transport buffer 40, a buffer 41, a text subtitle decoder 42, a scenario memory 43, a controller 44, and a PSR set 46. Note that the internal structure illustrated in the figure is a decoder model based on the MPEG T-STD model and capable of downconverting.

The BD drive 1 loads/ejects the BD-ROM and accesses the BD-ROM to sequentially read Aligned Units each composed of 32 ES-TS packets.

The arrival time clock counter 2 generates an arrival time clock using a 27 MHz crystal oscillator (27 MHz X-tal). The arrival time clock is a clock signal defining the timeline on which the ATS assigned to each TS packet is based.

Once an Aligned Unit composed of 32 EX-TS packets is read from the BD-ROM, the source de-packetizer 3 removes the TP_extra_header from each ES-TS packet carrying the Aligned Unit and outputs the resulting TS packets to the PID filter 4. The output by the source de-packetizer 3 to the PID filter 4 is performed at the timing when the time measured by the arrival time clock counter 2 reaches the ATS shown by the TP_extra_header. Since the output to the PID filter 4 is carried out in accordance with the ATSs, the TS packets are sequentially output to the PID filter 4 in accordance with the current time measured by the arrival time clock counter 2, irrespective of the speed at which data is read from the BD-ROM, such as 1×-speed or 2×-speed.

The PID filter 4 judges, with reference to the PID attached to the TS packets, the type of stream to which the TS packets belong is a video stream, a PG stream, or an IG stream. According to the judgment, the PID filter 4 outputs the TS packets to one of the transport buffers 5, 12, 20, and 37.

The transport buffer (TB) 5 is a buffer for temporarily storing TS packets output from the PID filter 4, if the TS packets belong to a video stream.

The multiplexed buffer (MB) 6 is a buffer for temporarily storing PES packets output from the transport buffer 5, in order to later output the video stream to the coded picture buffer 7.

The coded picture buffer (CPB) 7 is a buffer for storing coded pictures (I pictures, B pictures, and P pictures).

The video decoder 8 decodes individual frames contained in the video elementary stream at every predetermined decoding time (DTS) to obtain a plurality of frames and writes the resulting picture data on the decoded picture buffer 10.

The decoded picture buffer 10 is a buffer on which decoded picture data is written.

The video plane 11 is used for storing uncompressed picture data. A plane is a memory area of the playback apparatus for storing a frame of pixel value data. The video plane 11 stores picture data at the resolution of 1920×1080, and the picture data is composed of pixel values each expressed by 16-bit YUV values.

The transport buffer (TB) 12 is a buffer for temporarily storing TS packets output from the PID filter 4, if the TS packets belong to a PG stream.

The coded data buffer (CDB) 13 temporarily stores PES packets constituting a PG stream.

The stream graphics processor (SPG) 14 decodes PES packets carrying graphics data (ODSs) to obtain uncompressed bitmap data expressed by index colors, and writes the obtained graphics data as a graphics object on the object buffer 15.

The object buffer 15 holds the graphics object obtained as a result of the decoding by the stream graphics processor 14.

The composition buffer 16 is memory for storing control information (PCS) used for graphics data rendering.

The composition controller 17 analyzes the PCS stored on the composition buffer 16 and executes control according to the analytical result.

The presentation graphic plane 18 is a memory area as large as one full screen and stores uncompressed graphics data worth one screen. The presentation graphic plane 18 stores uncompressed graphics data at the resolution of 1920× 1080 and the uncompressed graphics data is composed of pixel values each expressed using 8-bit index colors. By converting the index colors with reference to a CLUT (Color Lookup Table), the uncompressed graphics data stored on the presentation graphics plane 18 is supplied for display.

The CLUT unit 19 converts the index colors of the uncompressed graphics data stored on the presentation graphic plane 18 to Y, CR, and Cb values.

The transport buffer (TB) 20 is a buffer for temporarily storing TS packets belonging to an IG stream.

The coded data buffer (CDB) 21 is a buffer for temporarily storing PES packets constituting an IG stream.

The stream graphics processor (SPG) 22 decodes PES packets containing graphics data and writes uncompressed graphics data obtained by the decoding to the object buffer 23.

The object buffer 23 stores a plurality of uncompressed graphics objects decoded by the stream graphics processor 22.

The composition buffer 24 is a buffer for storing control information used for graphics data rendering.

The composition Controller 25 analyzes the control information stored on the composition buffer 24 and executes control according to the analytical result.

The interactive graphics plane 26 is a plane on which uncompressed graphics data obtained as a result of the decoding by the stream graphics processor (SGP) 22 is written at the resolution of 1920×1080. The graphics data is composed of pixel values each expressed using 8-bit index colors. By converting the index colors with reference to the CLUT (Color Lookup Table), the uncompressed graphics data stored on the interactive graphics plane 26 is supplied for presentation.

The CLUT unit 27 converts the index colors of the uncompressed graphics data stored on the interactive graphics plane 26 to Y, CR, and Cb values.

The compositor 28 overlays the uncompressed frame data stored on the video plane 11 with the uncompressed graphics object stored on the presentation graphic plane 18. As a result of the overlaying, the intermediate composite image in which text subtitles are overlaid on video is obtained.

The compositor 29 overlays the uncompressed graphics object stored on the interactive graphics plane 26 with the intermediate composite image (uncompressed picture data overlaid with the uncompressed graphics object rendered on the presentation graphic plane 18) output from the compositor 28.

The switch 30 selectively supplies to, the transport buffer 20, the TS packets read from the BD-ROM or the TS packets read from the local storage 32.

The network device 31 is used to implement the communications functionality of the playback apparatus. More specifically, the network device 31 establishes TCP connection, FTF connection, and so on with a web site at an URL.

The local storage 32 is a hard disk used for storing contents supplied from a various recording media and communications media. Contents downloaded from the web site via the connection established by the network device 31 are also stored to the local storage 32.

The source de-packetizer 34 removes the TP_extra_header from each TS packet constituting the AV clip read from the local storage 32 and outputs the TS packets without headers to the PID filter 35. The output of the TS packets to the PID filter 35 is carried out at the timing when the time measured by the arrival time clock counter 33 reaches the ATS shown by the TP_extra_header.

The PID filter 35 switches to output the TS packets read from the local storage 32 to either of the PG stream decoder, IG stream decoder, and the audio decoder.

The switch 36 supplies to the audio decoder 39 the TS packets read from the BD-ROM or from the local storage 32.

The transport buffer (TB) 37 is used to store TS packets carrying an audio stream.

The elementary buffer (EB) 38 is used to store the PES packets carrying the audio stream.

The audio decoder 39 decodes the PES packets output from the elementary buffer 38 and outputs uncompressed audio data.

The transport buffer (TB) 40 is used to store TS packets carrying a text subtitle stream.

The elementary buffer (EB) 41 is used to store PES packets carrying the text subtitle stream.

The text subtitle decoder 42 decodes PES packets read to the elementary buffer 41 and supplies the resulting data for presentation. To decode the text subtitle stream, the text subtitle decoder 42 expands text strings contained in the text subtitle stream into bitmapped data, by applying font data separately read from the local storage 32. The resulting data is written on the presentation graphics plane 18.

The scenario memory 43 is used to store current PlayList information and current Clip information. The current PlayList information used herein refers to the currently processed PlayList information from among a plurality of pieces of PlayList information stored on the BD-ROM. The current Clip information used herein refers to the currently processed Clip information from among a plurality of pieces of Clip information stored on the BD-ROM.

The controller 44 is composed of an instruction ROM and a CPU. The controller 44 executes software stored on the instruction ROM to carry out overall control of the playback apparatus. The control executed on the playback apparatus dynamically changes in response to a user event generated upon receipt of a user operation and in accordance with the values held in each PSR of the PSR set 49.

The PSR set 46 is a set of non-volatile registers provided within the playback apparatus. The set of registers include 64 player status registers (PSR(1)-PSR(64)) and 4,096 general-purpose registers (GPRs). The 64 player status registers (PSRs) each represent the current status of the playback apparatus, such as the current playback point. Among the 64 PSRs, the values of PSR(5)-PSR(8) represent the current playback point. Specifically, PSR(5) is set to a value from 1-999 to indicate the chapter number to which the current playback point belongs. When set to "0xFFFF", PSR(5) indicates that the chapter numbers are invalid in the playback apparatus.

PSR(6) is set to a value from 0-999 to indicate the PL number to which the current playback point belongs (current PL Number).

PSR(7) is set to a value from 0-255 to indicate the PlayItem number to which the current playback point belongs (current PI Number).

PSR(8) is set to a value from 0-0xFFFFFFFF and indicates the current playback point (current PTM) in 45 kHz accuracy.

This concludes the description of the internal structure of the playback apparatus. Among the components of the playback apparatus, the video decoder 8 and the decoded picture buffer 10 are of significant importance. Thus, a more detailed description thereof will be given with reference to FIGS. 19-21.

The decoded picture buffer 10 is used to store a plurality of decoded pictures. FIG. 19 illustrates the internal structure of the decoded picture buffer 10. As illustrated in the figure, the decoded picture buffer 10 stores decoded pictures including reference pictures and non-reference pictures. The reference pictures include short-term reference pictures and long-term reference pictures. The short-term reference pictures are stored to a FIFO memory area and handled in the first-in, first-out (FIFO) method. On the other hand, long-term reference pictures are not stored to the FIFO memory area and not handled in the FIFO method.

FIG. 20 illustrates the decoding process of a Non-IDR I picture by the video decoder 8. During the decoding process of a Non-IDR I picture, references are made to the long-term reference pictures and the short-term reference pictures stored on the decoded picture buffer 10. Arrows rf1, rf2, and rf3 illustrated in the figure schematically represent references to the short-term reference pictures, whereas arrows rf4, rf5, and rf6 schematically represent references to long-term reference pictures. FIG. 21 illustrates the contents stored in the decoded picture buffer 10 at the time of the IDR picture decoding. At the time of decoding the IDR picture, the video decoder 8 and the decoded picture buffer 10 are instantaneously refreshed, so that all the short-term and long-term reference pictures stored on the decoded picture buffer 10 are erased. This concludes the details of the coded picture buffer 7, the video decoder 8, and the decoded picture buffer 10. Next, the following describes the processing steps performed by the controller 44.

The controller 44 controls the BD drive 1 and the video decoder 8 so as to execute fast-speed playback or jump playback of an MPEG4-AVC video stream.

The fast-speed playback is executed by sequentially playing back, out of a plurality of pictures contained in the video stream, I pictures (including IDR pictures and Non-IDR I pictures). Here, the EP_map shows entry points each along with the position and the size of an IDR or Non-IDR I picture. Thus, by selectively reading and playing back I pictures contained in the video stream, the playback apparatus can execute trick play of the video stream at, for example, a double- or triple-speed.

There are two types of jump playback: one is time-search playback and the other is PL playback. The time-search playback is executed upon receipt of timing information from a user and playback of a video stream is started from a playback point corresponding to a specific time and second indicated in the timing information. At the time of executing the jump playback, the controller 44 converts the timing information into the address of an I picture stored on the BD-ROM. Then, the controller 44 causes the BD-ROM to be read starting from the TS packet at the thus obtained I picture address and causes the read TS packets to be sequentially supplied to the decoder.

The PL playback refers to playback of a section of a video stream between points corresponding to In_time and Out_time indicated in PlayList information.

The principal part of the above-mentioned playback control is a process of deriving an I picture address from timing information. FIG. 22 is a flowchart of a process of converting timing information into an I picture address. In the flowchart, the timing information denoted as In_time specifies a jump playback point to be accessed to execute jump playback. In a step S1 illustrated in FIG. 22, the value of In_time is assigned to PTS_EP_start. A step S2 is to calculate a pair of EP_High_id and EP_Low_id values indicating an entry point that is near the PTS_EP_start. More specifically, the EP_High_id to be calculated is an identifier specifying a nearby EP_High preceding the In_time. On the other hand, the EP_Low_id is an identifier specifying an EP_Low indicating a nearby temporal point following the EP_High [EP_High_id] and preceding the In_time.

In order to calculate the value of EP_High_id, the controller 44 keeps adding the time length of each PTS_EP_High included in a plurality of EP_High values until the total Σ of the time lengths first exceeds the In_time. The time length indicated by each PTS_EP_High is a time unit whose most significant bits are held by the PTS_EP_High. The controller 44 then identifies the k-th EP_High_id that results in the total Σ first exceeding the In_time and determines the value obtained by (k−1) as the value of EP_High_id.

Similarly, to calculate the value of EP_Low_id, the controller 44 keeps adding, to the total Σ of up to the PTS_EP_High (EP_High_id), the time length indicated by each PTS_EP_Low included in EP_Low, until the resulting total first exceeds In_time. The controller 44 then identifies the h-th EP_Low_id that causes the resulting total to first exceeds the In_time, and determines the value obtained by (h−1) as the value of EP_Low_id.

The pair of EP_High_id and EP_Low_id values specifies a nearest entry point preceding the In_time.

Once the EP_Low_id value is obtained, the controller 44 enters a loop composed of steps S3-S5. More specifically, the controller 44 assigns the EP_Low_id value to a variable j (step S3) and executes the loop composed of the steps S4 and S5. In each iteration of the loop, the variable j is decremented by "1" (step S4) and a judgment is made as to whether the is_angle_change_point (PTS_EP_Low[j].is_angle_change_point) is set to the value "1" (step S5). The loop is repeatedly executed unit the judgment in the step S5 results in YES, i.e. as long as the is_angle_change_point field of each entry point is set to "0".

That is, the loop is terminated if the entry point specified by the variable j has the is_angle_change_point set to the value "1". When the judgment in the step S5 results in YES, the controller 44 assigns the value of variable j to the EP_Low_id (step S6) and calculates the EP_High[i] having the ref_to_EP_Low_id[i] that specifies an entry point near the EP_Low_id (step S7). Once the values of the EP_Low_id and the variable i are calculated, the controller 44 calculates the SPN_EP_Start using the SPN_EP_Low[EP_Low_id] and SPN_EP_High[i] values (step S8). Finally, the thus calculated SPN_EP_start value is converted into an I picture address (step S9).

An SPN is a serial number assigned to an individual TS packet. In order to read a TS packet having a specific SPN, the SPN needs to be converted into a relative sector number. As illustrated in FIG. 4, TS packets are converted into Aligned Units each containing 32 TS packets, and each Aligned Unit is recorded in three sectors. Thus, by dividing the SPN by 32, the number of the Aligned Unit containing the I picture is calculated. Then, by multiplying the Aligned Unit number by 3, the sector address of the Aligned Unit located near the SPN is calculated. The sector address calculated in the above manner is a relative sector number counted from the start of one AV clip. Thus, by setting the file pointer to the relative sector number, the playback apparatus reads the AV clip to supply the I picture to the video decoder 8.

Through the above processing, the playback apparatus successfully identifies an entry point indicating an IDR picture located at a point preceding the In_time. Reading of the IDR picture and the following pictures multiplexed in the stream ensures that the decoder is supplied with all the reference pictures necessary for decoding a picture corresponding to the In_time. This concludes the description of processing for deriving the I picture address from timing information. Next, a description is given of the playback processing based on PlayList information.

FIG. 23 is a flowchart of the PL playback performed by the controller 44. In the description regarding this flowchart, the PlayItem currently subject to the playback processing is denoted as PlayItem #x. According to the flowchart, first, the current PL information (.mpls) is read (step S101), and the steps S102-S110 are performed. The steps S102-S110 create a loop in which the steps S103-S110 are repeated on each piece of PI information included in the current PL information. The processing exits from the loop when the judgment in the step S109 results in "YES". The PlayItem currently subject to the loop is referred to as PlayItem #x (PI #x). When set to be the first PlayItem in the current PL, PlayItem #x is initialized (step S102). The terminal condition of the loop described above is satisfied when the last PlayItem in the current PL is designated as PlayItem #x (Step S109: YES). If there is another PlayItem following PlayItem #x in the current PL (Step S109, NO), the next PlayItem is designated as a new PlayItem #x (Step S110).

In the steps S103-S110 repeated in the loop, the following processing is performed. First, Clip information specified by the Clip_information_file_name included in the PlayItem #x is read to the memory (step S103). The value held in the In_time of the PlayItem #x is converted into the address u of an I picture, using the EP_map associated with the current Clip information (step S104). This conversion of In_time into an I picture address is carried out in accordance with the flowchart illustrated in FIG. 22. In this way, the I picture address u indicating the address of an IDR picture is calculated.

Next, the value held in the Out_time of PlayItem #x is converted into the address v of an I picture, using the EP_map associated with the current Clip information (step S105). The conversion of the Out_time into an I picture address is carried out without conducting the processing in the flowchart illustrated in FIG. 22. Rather, the conversion is carried out in the following way. First, the address of an I picture located at a temporal point near the Out_time is designated as the address v. Next, the address of the first I picture subsequent to the address v is obtained, and the address immediately preceding the thus obtained address is designated as an address w (Step S107). Finally, the controller 44 instructs the BD-ROM drive 1 to read TS packets starting from the I picture address u and ending at the address w (step S108).

On the other hand, the controller 44 instructs the video decoder 8 to output pictures starting from a point corresponding to the mark_time_stamp included in the current PlayList-Mark and ending at a point corresponding to the Out_time of PlayItem #x (step S106). Through the above steps S105-S108, playback of part of the AV clip used by PlayItem #x is executed.

Then, it is judged whether PlayItem #x is the last PI in the current PlayList (step S109).

If PlayItem #x is not the last PI in the current PlayList, the next PlayItem in the current PlayList is designated as a new PlayItem #x (Step S110) and the processing returns to the step S103. By repeatedly performing the steps S103-S110 described above, the playback apparatus sequentially plays back PlayItems constituting the PlayList.

As described above, according to the present embodiment, as long as the playback apparatus reads pictures up to entry point specified by the is_angle_change_point set to the value "1", it is ensured that an IDR picture is supplied to the video decoder 8. That it, all the reference pictures necessary for decoding to execute jump playback is made available in the decoded picture buffer 10. Thus, the number of pictures that needs to be read to execute jump playback is kept to a minimum.

As above, even if a video stream is compressed to have IDR pictures at relatively long intervals such as fifteen minutes or thirty minutes of playback time for the sake of high-compression rate, trick play is efficiently executed. That is, without significantly sacrificing the advantage of high-compression rate achieved by the MPEG4-AVC standard, the playback apparatus is enabled to efficiently execute trick play.

Second Embodiment

The first embodiment discloses the data structure of the EP_map containing the is_angle_change_point field that indicates a point where the playback apparatus can enter to the AV clip. A second embodiment of the present invention describes an angle change executed by the playback apparatus with the use of angle changeable points indicated by the is_angle_change_point. As described in the first embodiment, the processing of angle change is composed of "exiting" from the currently executed AV clip and "entering" into another AV clip.

Suppose, for example, the BD-ROM stores a plurality of AV clips containing video images of the same subject shot from different camera angles, for example, the front, right, and left. During playback of the AV clip containing images shot from the front, the playback apparatus may "exit" from the current AV clip and "enter" to the AV clip containing images short from the right. As a result, the playback angles are changed from the front to the right. Since the playback images are changed as if a camera angle is changed, the above processing composed of "exiting" from an AV clip and "entering" to another AV clip is referred to as "angle change". In order to implement the "angle change" functionality, some improvements need to be made on AV clips and PlayList information. The improvement is embodied in the structure called a multiangle section defined by PlayList information containing PlayItem information and using a plurality of AV clips.

FIG. 24 illustrates an application layer layout implementing a multiangle section. In the present embodiment, a multiangle section contains four angles. Thus, the multiangle section is composed of four AV clips (00001.m2ts, 00002.m2ts, 00003.m2ts, and 00004.m2ts), one piece of PlayList information (00001.mpls), and four pieces of Clip information (00001.clpi, 00002.clpi, 00003.clpi, and 00004.clpi).

FIG. 25 illustrates the data structure of PlayList information. As illustrated in the figure, each piece of PlayItem information constituting the multiangle section includes two portions: one is a portion compatible with a non-multiangle PlayItem and the other is an extended portion used for implementing a multiangle section. The compatible portion is identical in data structure to the PlayItem information illustrated in FIG. 16. More specifically, the compatible portion is composed of "Clip_information_file_name", "Clip_codec_identifier", "In_time", and "Out_time". The AV clip specified in the compatible portion constitutes the first angle section in the multiangle section. With this structure, a playback apparatus not capable of handling a multiangle section (a playback apparatus capable of handing BD-RE data structure only) is enabled to read PlayItem information containing multiple angles and duly execute playback of the first angle section by simply manipulating the compatible portion. The extended portion is composed of the following fields: "is_multi_angles"; "number_of_angles"; "is_seamless_angle_change"; and "Angle information[2], [3] ... [j]".

The "is_multi_angles" field indicates whether the playback section used by this PlayItem is a multiangle section or non-multiangle section.

The "number_of_angles" field indicates the number of angles contained in the multiangle section, if the "is_multi_angles" field is set to the value indicating a multiangle section.

The "is_seamless_angle_change" field indicates whether the multi-angle section is prepared for seamless angle change. Whether or not the angle change is to be seamless is determined depending on whether the AV clip is interleaved or not. In the case of an AV clip that is interleaved, the "is_seamless_angle_change" is set to "ON". On the other hand, in the case of an AV clip that is not interleaved, the "is_seamless_angle_change" is set to "OFF".

Each piece of "Angle info [2]-[j]" relates to an individual angle section contained in the multiangle section and includes the following fields: "Clip_Information_file_name" and "Clip_codec_identifier".

The "Clip_Information_file_name [angle_id]" field indicates the file name containing an AV clip used in the angle section.

The "Clip_codec_identifier [angle_id]" field indicates the codec of the AV clip contained in the file specified by the Clip_Information_file_name field.

As described above, the "Angle info" contains neither "In_time" nor "Out_time". It is because the In_time and Out_time included in the compatible portion collectively specify the start and endpoints of each of the second and the following angle sections. That is to say, every AV clip specified by the Clip_Information_file_name contained in a respective piece of Angle information in the extended portion needs to have the same playback time with the AV clip specified by the Clip_Information_file_name in the compatible portion. In addition, the timestamps (System Time Clock) specifying the playback timing of the respective AV clips on the playback timeline need to be the exactly same value.

Both the compatible and extended portions of PlayItem information have the Clip_Information_file_name field. Thus, a playback section of each of a plurality of AV clips is specified all at once.

FIG. 26A illustrates the playback sections of a plurality of AV clips collectively specified by the four Clip_Information_file_name fields contained in the PlayItem information. In the figure, the first level illustrates four timelines of the four AV clips (AV clips #1, #2, #3, and #4). The fifth level illustrates the PL timeline. The four Clip_Information_file_name fields included in the PlayItem information specify the four timelines. With this data structure, the In_time and Out_time of the PlayItem define four playback sections that are selectable for playback. That is, a section composed of a plurality of selectable angle images (so-called a multiangle section) is defined on the PL timeline. The four playback sections of the four AV clips specified by the In_time and the Out_time are located at the same position on the PlayList timeline.

The following describes how the AV clips used to constitute a multiangle section is divided on a BD-ROM. Each AV clip is stored on the BD-ROM in units called extents. An extent is one divided portion that is recorded in a contiguous area on the BD-ROM and is also referred to as a "segment".

Suppose, for example, AV clips #1-#4 illustrated in FIG. 24 contain video data of motion picture images shot from four different angles. In this case, each of AV clips #1-#4 are divided into five extents as follows:

AV clip #1→
AV clip #1.1/5, AV clip #1.2/5, AV clip #1.3/5, AV clip #1.4/5, and AV clip #1.5/5
AV clip #2→
AV clip #2.1/5, AV clip #2.2/5, AV clip #2.3/5, AV clip #2.4/5, and AV clip #2.5/5
AV clip #3→
AV clip #3.1/5, AV clip #3.2/5, AV clip #3.3/5, AV clip #3.4/5, and AV clip #3.5/5
AV clip #4→
AV clip #4.1/5, AV clip #4.2/5, AV clip #4.3/5, AV clip #4.4/5, and AV clip #4.5/5

FIG. 26B illustrates the extents of each AV clip on the PlayList timeline. The five extents of each AV clip are located at the same positions on the playback timeline with the counterpart extents of the other AV clips. More specifically, AV clip #1.1/5, AV clip #2.1/5, AV clip #3.1/5, and AV clip #4.1/5 are all located at the same position on the timeline. Likewise, AV clip #1.2/5, AV clip #2.2/5, AV clip #3.2/5, and AV clip #4.2/5 are all located at the same position on the timeline. AV clip #1.3/5, AV clip #2.3/5, AV clip #3.3/5, and AV clip #4.3/5 are all located at the same position on the timeline.

The extents of the four AV clips are recorded onto the BD-ROM by interleaving. Interleaving is a technique of recording multiple files, so that each file is divided into a plurality of extents and that extents with the same playback timing are alternately recorded on the BD-ROM. Owing to the interleaving, the playback apparatus currently reading a file can suitably switch to read another file. Thus, the playback apparatus is enabled to "exit" from the currently played AV clip and "enter" into another AV clip without interrupting playback, thereby to execute seamless angle change.

The extents illustrated in FIG. 26B are interleaved on the BD-ROM as illustrated on FIG. 27A.

FIG. 27A is an allocation image showing the arrangement of the four AV clips constituting the multiangle section on the BD-ROM. As described above, each of the four AV clips is divided into five extents. The first extents of the respective AV clips (AV clip #1.1/5, AV clip #2.1/5, AV clip #3.1/5, and AV clip #4.1/5) are contiguously recorded. Those extents AV clip #1.1/5-AV clip #5.1/5 are all part of the AV clips to be played back in the same playback period. That is, all the extents corresponding to the same playback period are collectively and contiguously recorded on the BD-ROM. The extents of AV clip #1 and of AV clip #2 are arranged in series on the BD-ROM. Thus, by reading AV clip #1.1/5 together with AV clip #2.1/5, either of AV clip #1.1/5 and AV clip #2.1/5 can be selectively decoded. This makes it possible to implement angle change in response to a user operation.

The multiangle section of an AV clip is divided into a plurality of portions at boundaries residing on points of "entering" and "exiting" described in the first embodiment.

That is, the start and end points of each divided portion coincide with an entering point and an exit point. Since a plurality of divided portions each start with an entering point and ends with an exit point are linearly arranged, entering points and exit points alternate. This arrangement helps the playback apparatus to suitably exit from an AV clip and enter into another AV clip.

FIG. 27B illustrates the internal structure of one extent of an AV clip. As illustrated in the figure, the first NAL unit (or the first piece of video data) contains an Access Unit Delimiter (AUD) followed by an IDR picture, which is an independently decodable Access Unit. The PTS and SPN of the IDR picture are specified by the entry point having the is_angle_change_point field set to the value "1". No extent should be shorter than a predetermined length for the following reason. When read from the BD-ROM, an extent shorter than the predetermined length may cause the buffer to underflow.

One extent may have more than one IDR pictures, each of which serves as an entering point. Yet, the length of the extent between the last IDR picture and the end of the extent should not be shorter than the predetermined length mentioned above. FIG. 28 illustrates the concept of how to determine the contiguous length to the extent. In the figure, entry points #1-#5 have the is_angle_change_point fields set to the values "1", "0", "1", "0", and "1" in the stated order. Thus, the length from entry point #5 to the end of the extent should not be shorter than the predetermined length.

FIG. 29 illustrates the allocation of the extents on the BD-ROM, along with the entry point setting. In the figure, the shaded portions represent the Access Unit Delimiter of an I picture (IDR picture or Non-IDR I picture) located at the start of each extent constituting AV clip #2. Note that the I pictures (IDR pictures or Non-IDR I pictures) located at the start of AV clips #3, #4, and #5 are not illustrated for the sake of simplicity in the illustration. In the case where the extents constituting AV clip #2 (AV clip #2.1/5, AV clip #2.2/5, AV clip #2.3/5, AV clip #2.4/5, and AV clip #2.5/5) are interleaved with the extents of another AV clip, the EP_map contained in the Clip information associated with AV clip #2 is set to indicate the five entry points #1, #2, #3, #4, and #5. Entry points #1, #2, #3, #4, and #5 are indicated in correspondence with the SPN and PTS values of a corresponding one of AV clip #2.1/5, AV clip #2.2/5, AV clip #2.3/5, AV clip #2.4/5, and AV clip #2.5/5.

Suppose, for example, among the five extents of AV clip #2, the first pictures in AV clip #2.2/5, AV clip #2.4/5, AV clip #2.5/5 are Non-IDR I pictures, whereas the first pictures in AV clip #2.1/5 and AV clip #2.3/5 are IDR pictures. In that case, the is_angle_change_point is set to the value "1" for each entry point #1 and #3, which correspond to the SPNs of AV clip #2.1/5 and AV clip #2.3/5, respectively.

As described above, the start of each extent of AV clip #2 is indicated by entry points whose is_angle_change_point is set to the value "1". With this setting, the start point of such an extent is regarded as an entering point, which is a point at which the playback apparatus can enter into the AV clip. Since the end point of an extent immediately precedes an extent with "is_angle_change_point" set to the value "1", the end point is regarded as an exit point, which is a point at which the playback apparatus can exit from the AV clip. FIG. 29 illustrates the entry points set on the extents of AV clip #2. Similarly to the extents of AV clip #2, the start point of each extent of AV clips #1, #3, #4, and #5 is indicated by an entry point with the is_angle_change_point set to the value "1". Since the playback apparatus is enabled to exit from, and enter into AV clips #1, #2, #3, #4, #5 at a boundary between the end point of an extent and the start point of another extent, seamless angle change is guaranteed.

This concludes the description of the improvement made on the recording medium according to the present embodiment. Next, a description of an improvement made on the playback apparatus will be given. According to the second embodiment, the playback apparatus indicates an angle section with PSR(3) included in the PSR set 46. PSR(3) is used to store a value indicating the current angle. The controller 44 of the playback apparatus according to the second embodiment causes the angle section to be selected for playback, in accordance with the value held in PSR(3).

FIG. 30 illustrates the valid values of PSR(3) and the relationship with PlayItem and Clip information. The leftmost block of the figure illustrates the values (1-4) of PSR(3).

When PSR(3) is set to the value "1", the playback apparatus reads the Clip information specified by the Clip_information_file_name in the compatible portion of the PlayItem information. As a result, the Clip information contained in the file called "00001.clpi" is read to the memory. The playback apparatus then refers to the entry_map contained in the read Clip information and executes playback of the AV clip (00001.m2ts).

Similarly, when PSR(3) is set to the value "2", the playback apparatus reads the Clip information specified by the Clip_information_file_name in Angle information[2] of the PlayItem information. As a result, the Clip information contained in the file called "00002.clpi" is read to the memory. The playback apparatus then refers to the entry_map contained in the read Clip information and executes playback of the AV clip (00002.m2ts).

When PSR(3) is set to the value "3", the playback apparatus reads the Clip information specified by the Clip_information_file_name in Angle information[3] of the PlayItem information. As a result, the Clip information contained in the file called "00003.clpi" is read to the memory. The playback apparatus then refers to the entry_map contained in the read Clip information and therefore executes playback of the AV clip (00003.m2ts).

When PSR(3) is set to the value "4", the playback apparatus reads the Clip information specified by the Clip_information_file_name in Angle information[4] of the PlayItem information. Thus, the Clip information contained in the file called "00004.clpi" is read to the memory. The playback apparatus then refers to the entry_map contained in the read Clip information and therefore executes playback of the AV clip (00004.m2ts).

The following describes the processing steps performed by the controller 44 in accordance with the PlayItem information illustrated in FIG. 25. FIG. 31 is a flowchart of processing steps performed to execute of PlayList playback according to the second embodiment.

This flowchart is basically identical to the flowchart illustrated in FIG. 23, except for that the step S103 is replaced with steps S111-S114. More specifically, in order to execute playback of one of PlayItems contained in the current PlayList information, the controller 44 assigns the value held in PSR (3) to a variable V (step S111) and judges whether the variable V is greater than or equal to "2" (step S112). If the variable V is equal to "1" (step S112: NO), the Clip information specified by the Clip_information_file_name in the compatible portion of the PlayItem is read to the memory (step S113). Then, the controller 44 controls the BD-ROM drive 1 to read a sequence of TS packets from the point corresponding to the In_time to the point corresponding to the Out_time of PlayItem #x (steps S104-S108).

If the variable V is greater than or equal to "2" (step S112: YES), the Clip information specified by the Clip_information_file_name in the Angle information[V] of PlayItem #x is to the memory (step S114). Then, the controller 44 controls the BD-ROM drive 1 to read a sequence of TS packets from the point corresponding to the In_time to the point corresponding to the Out_time of PlayItem #x (steps S104-S108).

As described above, by accessing a different AV clip in accordance with the value of PSR(3), the playback apparatus executes playback of a requested angle section.

FIG. 32 is a flowchart of processing steps performed to read a multiangle section from a disc. In the following description relating to the figure, the term "current address" refers to an address of a point on a disc currently read by the optical pickup. The term "current extent" refers to the extent containing the current address. The term "current angle" refers to a currently played angle contained in the multiangle section.

The steps S50-S52 constitute a main loop of the flowchart. In each iteration of the loop, the current address is updated to the next address (step S50).

By repeating the steps S50-S52, the current address is successively updated to the next address within one extent.

In the step S51, it is judged whether an angle change is requested. An angle change is requested at a push of an angle key or numeric key on the remote controller. If an angle change is requested, the value indicating the requested angle is assigned to the variable V (step S53) and the preparation flag is set to the value "1" (step S54).

Here, if the angle change is requested at a push of the angle key, the value obtained by adding "1" to the PSR(3) value is assigned to the variable V. On the other hand, if the angle change is requested at a push of a numeric key, the value corresponding to the numeric key is assigned to the variable V.

In the step S52, it is judged whether the current address has reached the end address of the current extent. The judgment in the step S52 results in "YES" when all the TS packets of the current extents are read and thus the current address reaches the end point of the extent.

If the judgment in the step S52 results in "YES", the steps S55-S57 are performed. In the step S55, it is judged whether the preparation flag is set to the value "1". If the preparation flag="0", the next extent in the current AV clip is set as a new current extent (step S56), and the address of the first Access Unit Delimiter in the new current extent is set to be a new current address (step S57). Then the loop composed of the steps S50-S52 is performed again. That is, as long as the preparation flag is equal to "0", the next extent in the current angle is read.

On the other hand, if the preparation flag is set to the value "1", the AV clip to be read is switched as follows. This is because the AV clip of the requested angle is started to be read at the timing when the current address reaches the end of the current extent.

In order to switch the AV clips to be read, first of all, among the extents of the requested angle section, the extent that immediately follows the current extent in the presentation order is designated as an extent dst (step S58). Then, the Eptop indicating the first Access Unit Delimiter in the extent dst is identified (step S59). Then, it is judged whether the is_angle_change_point of the EPtop is set to the value "1" (step S60). This judgment is made to see whether the start point of the extent dst is a point where the playback apparatus can enter to the AV clip. If the is_angle_change_point is set to the value "0", the step S56 is performed with the preparation flag maintained to the value "1". Through the steps S56-S57, the next extent in the current angle is read, and playback of the current angle is continued. In other words, playback of the current angle is continued as long as the extent dst is in condition where the point is_angle_change_point is not set to the value "1", i.e. as long as the extent dst is not a point where the playback apparatus can enter to the AV clip.

If the is_angle_change_point is set to the value "1", the extent dst is designated as a new current extent (step S61), and the address of the first Access Unit Delimiter in the extent dst is set as a new current address (step S62). Then, the preparation flag is cleared to "0", and PSR(3) is set to the variable V indicating the requested angle (step S63). Then, the processing returns to the step S113. As a result, Clip information specified by the Clip_information_file_name corresponding to the variable V is read and playback is continued in accordance with the thus read Clip information.

FIG. 33 illustrates a process of reading the BD-ROM for executing playback of an angle image A. As illustrated in the figure, five extents (AV clip #1.1/5, AV clip #1.2/5, AV clip #1.3/5, AV clip #1.4/5, and AV clip #1.5/5) of AV clip #1 are sequentially read.

FIG. 34 illustrates a process of reading the BD-ROM performed upon receipt of a user operation of requesting an angle change. As illustrated in the figure, a user operation requesting an angle change is received during the time AV clip #1.2/5 of AV clip #1 is being read (step S5: YES). In response to the user operation, the preparation flag is set to the value "1" (step S54). The user operation received herein is to request an angle change from the angle image presented by AV clip #1 to an angle image presented by AV clip #2. Since the angle change is requested during the time AV clip #1.2/5 is being read, AV clip #2.3/5 is designated as the extent dst, which is the extent that immediately follows the current extent in the presentation order (step S58). The start point of the extent dst is specified by entry point #3 corresponding to the PTS_EP_start indicating the temporal point t3. Thus, a reference is made to the is_angle_change_point corresponding to entry point #3 of AV clip #2 (step S60). In this case, the is_angle_change_point of entry point #3 is set to the value "1". That is to say, entry point #3 is a point where the playback apparatus can enter to the AV clip. Thus, the extent dst (i.e. AV clip #2.3/5) is set as a new current extent (step S61), and the address of the first Access Unit Delimiter in the new current extent is set as a new current address (step S62). Then, PSR(3) is set to the value "2" specifying AV clip #2 (step S64). As a result, AV clip #2.3/5, AV clip #2.4/5, AV clip #2.5/5 of AV clip #2 are sequentially read.

FIG. 35 illustrates a process of reading the BD-ROM performed upon receipt of a user operation of requesting an angle change. As illustrated in the figure, a user operation requesting an angle change is received during the time AV clip #1.1/5 of AV clip #1 is being read (step S51: YES). In response to the user operation, the preparation flag is set to the value "1" (step S54). Since the angle change is requested during the time AV clip #1.1/5 is being read, AV clip #2.2/5 is designated as the extent dst (step S58). The start point of the extent dst is specified by entry point #2 corresponding to the PTS_EP_start indicating the temporal point t2. Thus, a reference is made to the is_angle_change_point corresponding to entry point #2 of AV clip #2 (step S60). In this case, the is_angle_change_point of entry point #2 is set to the value "0". That is to say, entry point #2 is not a point where the playback apparatus can enter to the AV clip. Thus, AV clip #1.2/5, which is the extent next to AV clip #1.1/5 in the current AV clip #1, is set as a new current extent (step S56). Then, the address of the start point of the current extent is set as a new current address (step S57). As a result, AV clip #1.2/5 is read.

When the current address reaches the end of AV clip #1.2/5 (step S52: YES), it is judged whether the preparation flag is set to the value "1" (step S55). Since the preparation flag is set to the value "1" in this case, the judgment in the step S52 results in "YES". Thus, AV clip #2.3/5 is now designated as the extent dst (step S56). The start point of the extent dst is specified by entry point #3 corresponding to the PTS_EP_start indicating the temporal point t3. Thus, a reference is made to the is_angle_change_point of entry point #3 of AV clip #2 (step S60). In this case, the is_angle_change_point of entry point #3 is set to the value "1". That is to say, entry point #3 is a point where the playback apparatus can enter to the AV clip. Thus, AV clip #2.3/5 designated as the extent dst is set as a new current extent (step S61), and the address of the first Access Unit Delimiter in the current extent is set as a new current address (step S62). Then, PSR(3) is set to the value "2" specifying AV clip #2 (step S64). As a result, AV clip #2.3/5, AV clip #2.4/5, AV clip #2.5/5 of AV clip #2 are sequentially read.

As in the example illustrated in FIG. 35, there may be a case where the extent of the requested angle located on the PL timeline immediately after the point of the angle change request is not an entering point. In such a case, playback of the extents presenting the current angle is continued until an angle changeable point is reached.

In addition, an angle change to AV clip #2.3/5 is possible until the playback start of the extent of AV clip #1 (AV clip #1.3/5) that is located at the same point on the PlayList timeline. In other words, once playback of the extent of AV clip #1 (AV clip #1.3/5) is started, an angle change to AV clip #2.3/5 is no longer possible.

As described above, according to the present embodiment, the start point of each of a plurality of extents constituting an AV clip is indicated by an entry point. In addition, with reference to the is_angle_change_point field of a respective entry point, the playback apparatus can readily identify which of such entry points are the points where the playback apparatus can enter to the AV clip of a requested angle image. By supplying to the decoder the IDR picture located at an entering point, the playback apparatus can smoothly execute an angle change even if the video stream is an MPEG4-AVC stream.

Third Embodiment

The first embodiment relates to the improvement for efficiently executing jump playback of a video stream including IDR pictures at 15- or 30-minute intervals. In contrast, a third embodiment of the present invention relates to a technique of allowing selection as to which of pictures contained in a video stream is encoded to be IDR pictures. In other words, the present embodiment allows selection to be made at the time of setting encoding conditions, so that optimal pictures are encoded as IDR pictures. An MPEG4-AVC video stream is encoded with the MPEG4-AVC standard and referenced by PlayList information via Clip information. The present embodiment allows the selection of IDR pictures in view of this nature of PlayList information.

Hereinafter, a description is given of the data structure of PlayList information according to this embodiment. FIG. 36 illustrates the internal structure of PlayList information according to the third embodiment. The PlayList information illustrated in the figure differs from the PlayList information of the second embodiment in that PLMark (PLMark #1-#n) is additionally contained. The selection of IDR pictures is implemented in order to more efficiently execute PL playback of PlayList information having such a data structure.

PLMark information (PLMark( )) illustrated in FIG. 36 specifies an arbitrary section on the PL timeline as a chapter point. As leader lines pm1 in FIG. 36 indicate, the PLMark information includes the following fields: "ref_to_Play-Item_id" and "mark_time_stamp". FIG. 37 illustrates chapters defined by the PLMark information. In the figure, the first level illustrates the AV Clip timeline, whereas the second level illustrates the PL timeline. An arrows pk1 and pk2 represent that two pieces of PLMark information each specify a PlayItem (by ref_to_PlayItem_id) and a point (specified by mark_time_stamp). As a result, the PLMark information defines three chapters (Chapter #1, #2, and #3) on the PL timeline. This concludes the description of the PLMark information.

FIG. 38 illustrates pictures of the video stream used by PlayItem #1 contained in PlayList information, together with the relevant part of the entry_map setting. Suppose, for example, the In_time of PlayItem #1 specifies a temporal point t2 on the timeline. In this case, the picture located at the temporal point t2 is encoded to be an IDR picture. As a result, at the time of executing PlayList information playback, playback in accordance with PlayList #1 is correctly executed simply by reading pictures starting from the picture located at the In_time of PlayItem #1.

FIG. 39 illustrates pictures of the video stream used by PlayItem #2. The picture specified by the In_time of PlayItem #1 is an IDR picture. Yet, the picture specified by the In_time of PlayItem #2 may or may not be an IDR picture. That is, except for the first piece of PlayItem information in the PlayList information, it is not necessary that the picture specified by the In_time of a respective piece of PlayItem information be an IDR picture. Rather, each of such pictures may be encoded as a Non-IDR I picture. It is because the MPEG4-AVC format allows one reference picture to be used over a relatively long term. For example, pictures located between In_time and Out_time of PlayItem #2 as well as pictures located between In_time to Out_time of PlayItem #3 are encoded using a long-term reference picture located between In_time to Out_time of PlayItem #1. As a result, it is not necessary to place an IDR picture at the In_time of PlayItem #2 or at the In_time of PlayItem #3. Encoding with the use of long-term reference pictures advantageously reduces the number of IDR pictures. Thus, an MPEG4-AVC video stream is encoded at a high compression rate. It should be noted, however, that the first PlayItem in the PlayList information has no preceding pictures to be used as reference. Thus, at the time of executing playback starting from the In_time of the first PlayItem, the decoded picture buffer 10 is supplied with no reference picture. That is, the picture specified by the In_time of the first PlayItem needs to be encoded as an IDR picture.

Among a plurality of pictures located between the In_time and the Out_time of PlayItem information #2, the picture specified by PLMark #1 needs to be encoded as an IDR picture. Each picture specified by PLMark information is regarded as a chapter point. When chapter search is executed to start jump playback from a picture specified by PLMark information, the decoded picture buffer 10 is supplied with no reference picture. Thus, each I picture specified by PLMark information needs to be an IDR picture.

FIG. 40 illustrates pictures of the video stream used by PlayItem #3. Similarly to FIG. 39, the picture specified by the In_time of PlayItem #3 illustrated in FIG. 40 may or may not be an IDR picture. Yet, the picture specified by PLMark #3 needs to be encoded as an IDR picture. As a consequence, PLMark playback can be suitably executed, since no reference picture is used to start playback from the chapter.

This concludes the description of the improvement made on the recording medium according to the present embodiment. Next, a description is given of an improvement made on the playback apparatus according to the present embodiment.

The processing steps to execute PlayList playback are basically identical to those described in relation to the first embodiment. The PlayList playback is executed by converting the In_time and the Out_time indicated in PlayList information to I picture addresses.

Among a plurality of pieces of PlayItem information included in PlayList information, the first piece of PlayItem information has the In_time specifying an IDR picture. Since such an IDR picture is indicated by an entry point with the is_angle_change_point field set to the value "1". Thus, by reading the pictures starting from the point specified by the SPN_EP_start of the entry point corresponding to the In_time, the controller 44 can ensure that an IDR picture is supplied to the video decoder 8. In response to that an IDR picture is supplied to the video decoder 8, the decoded picture buffer 10 is cleared.

As described above, the playback apparatus according to the present embodiment is not required to search an entry point close to the In_time. Rather, the playback apparatus of the present embodiment is able to supply an IDR picture to the video decoder 8 simply by reading a point corresponding to the In_time on the BD-ROM. As a result, PL playback is executed at a higher speed.

In addition, since PLMark information defines chapters, the playback apparatus according to the present embodiment is able to execute, using PlayList information, a chapter search function and chapter skip function. With the chapter search function, the playback apparatus first specifies PlayItem information referred to by the ref_to_PlayItem_id included in the PLMark information. The playback apparatus then executes jump playback of the AV clip that is used by the thus specified PlayItem information, starting from a point specified by the mark_time_stamp included in the PLMark information. To this end, the controller 44 specifies one of a plurality of entry points having the PTS_EP_start value close to the mark_time_stamp value included in the PLMark information. The controller 44 then causes playback to be started from the I picture address corresponding to the SPN_EP_start of the thus specified entry point.

With the chapter skip function, the playback apparatus specifies PLMark information defining a chapter that is immediately before or after the chapter containing the current playback point. The playback apparatus then conducts a search of chapters defined by the thus PLMark information. As described above, each picture specified by the mark_time_stamp in the PLMark information has been encoded to be an IDR picture. Each entry point with the is_angle_change_point field set to the value "1" has the PTS_EP_start value indicating the playback time of an IDR picture. Thus, by reading the pictures starting from the point specified by the SPN_EP_start value of any of such entry points, the playback apparatus can ensure that an IDR picture is supplied to the video decoder 8.

The following describes the processing steps of executing the chapter search and chapter skip functions, with reference to flowcharts. FIG. 41 is a flowchart of the processing steps of the chapter search function.

According to the flowchart, first, the playback apparatus is placed in a stand-by mode for a user operation of selecting a chapter on a chapter menu (step S124). Upon receipt of a user operation of selecting a chapter, the PLMark information defining the selected chapter is designated as current PlayListMark (step S125). In a step S126, the PI specified by the ref_to_PlayItem_id field in the current PlayListMark is designated as PlayItem #x. In a step S127, the Clip information specified by the Clip_information_file_name of PlayItem #x is read. In a step S128, the mark_time_stamp value of the current PlayListMark is converted to the I picture address u, using the EP_map associated with the current Clip information. Here, the picture specified by the mark_time_stamp value of the PLMark information is indicated by an entry point with the is_angle_change_point field set to the value "1". That is, the I picture address u is the address of an IDR picture.

In a step S129, the Out_time of PlayItem #x is converted into an I picture address v, using the EP_map associated with the current Clip information. In a step S130, the playback apparatus instructs the decoder to output TS packets starting from the point corresponding to the mark_time_stamp value of the current PlayListMark and ending at the point corresponding the Out_time of PlayItem #x. Through the above steps, the playback apparatus converts the I picture addresses u and v and then goes back the step S107 illustrated in FIG. 23. As a result, TS packets of an AV clip that is different from the currently read AV clip are caused to be read, so that playback is switched to the requested chapter. This concludes the description of the processing steps for executing the chapter search function. Next, a description of processing steps for the chapter skip function will be given. FIG. 42 is a flowchart of the processing steps of the chapter skip function.

In a step S131, the playback apparatus is placed into a stand-by mode for a user operation made on a SkipNext key or a SkipBack key provided on the remote controller. Upon receipt of a user operation, a step S132 is performed to judge whether SkipNext key or the SkipBack key is pushed. If the SkipBack key is pushed, the direction flag is set to the value "−1" in a step S133. On the other hand, if the SkipNext key is pushed, the direction flag is set to the value "+1" in a step S134.

In a step S135, the value held in the direction flag is added to the current PlayListMark number and the addition result is set as a new current PlayListMark number. In the case where the SkipNext key is pushed in the step S131, the direction flag is set to the value "+1". Thus, the current PlayListMark number is incremented. On the other hand, in the case where the SkipBack key is pushed in the step S131, the direction flag is set to the value "−1". Thus, the current PlayListMark number is decremented. After the PLMark information is set as above, the same processing steps S126-S130 as described in FIG. 41 are performed to read suitable TS packets.

Here, the picture specified by the mark_time_stamp of the PLMark has been encoded as an IDR picture. Thus, each entry point with the is_angle_change_point field set to the value "1" has the PTS_EP_start value indicating the presentation time of an IDR picture. By reading the pictures starting from the point specified by the SPN of such an entry point, the playback apparatus can ensure that an IDR picture is duly supplied to the video decoder 8.

According to the present embodiment, as described above, an AV clip is encoded so as to insert IDR pictures at the point specified by the In_time of the first PlayItems in PlayList information and at the chapter points specified by PLMark information. This arrangement eliminates the need for the playback apparatus to search an IDR picture close to the point specified by In_time of PlayItem or the chapter point defined by PLMark information. Consequently, the PlayList playback is executed at a higher speed.

(Supplemental Notes)

Needless to say, the foregoing descriptions do not cover all the modes of practicing the present invention. The present invention can be practiced also by any of the following modifications (A), (B), (C), (D), . . . etc. It should be noted that the inventions recited in the claims of the present application are broadened or generalized descriptions of the above-described embodiments and their modifications. The extent of the broadening and generalization reflects the state of the art at the time of filing the present application.

(A) According to the above embodiments, a BD-ROM is described as a recording medium according to the present invention. Yet, it should be noted that the features of a recording medium according to the present invention lie in the EP_map recorded thereon and these features do not depend on the physical property of the BD-ROM. Any other recording medium is applicable as long as the recording medium can store the EP_map. Specific examples of such recording media include: optical discs, such as ROM, DVD-RAM, DVD-RW, DVD-R, DVD+RW, DVD+R, CD-R, and CD-RW; and magneto-optical disks, such as PD and MO. The examples of the recording medium according to the present invention further include semiconductor memory cards, such as CompactFlash card (registered trademark), SmartMedia card, Memory Stick, MultiMediaCard, and PCM-CIA card. The examples also include (i) magnetic disks, such as a flexible disk, SuperDisk, Zip, and Clik! and (ii) a removable hard disk drive, such as ORB, Jaz, SparQ, SyJet, EZFley, and Microdrive.

(B) Each of the above embodiments relates to the case where the playback apparatus decodes an AV clip stored on a BD-ROM and outputs the decoded AV clip to the television set. As an alternative, the playback apparatus may be equipped with a BD-ROM drive only and the remaining components are provided in the television set. In such a case, the playback apparatus and the television set can be incorporated into a home network connected with an IEEE 1394 connector. In addition, although the above embodiments relate to the playback apparatus connected to the television set, the playback apparatus may instead be integrally provided with a display. Also, the playback apparatus may include only the system LSI (integrated circuit) that carries out an essential part of the processing.

(C) Information processing using the programs shown in the flowcharts is actually realized using hardware resources. Accordingly, the programs, which describe the processing steps shown in the flowcharts, are themselves an invention. The above embodiments all relate to the case where the programs are incorporated in the playback apparatus, but the programs can be used independently of the playback apparatus. Acts of practicing the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

(D) According to the above embodiments, the digital stream is an AV clip in compliance with the BD-ROM standard, but the present invention may also be applicable to a VOB (Video Object) of the DVD-Video standard or the DVD-Video Recording standard. The VOB is a program stream that complies with the ISO/IEC 13818-1 Standard and is obtained by multiplexing a video stream and an audio stream. Also, the video stream in the AV Clip may be an MPEG4 video stream or a WMV video stream. Further, the audio stream in the AV clip may be a Linear PCM audio stream, a Dolby AC-3 audio stream, an MP3 audio stream, an MPEG-AAC audio stream, or a dts audio stream.

(E) According to the third embodiment, it is also applicable that all the pictures specified by the In_time of every PlayItem in PlayList information are IDR pictures.

INDUSTRIAL APPLICABILITY

The recording medium and the playback apparatus according to the present invention may be employed for personal use in a home theater system, for example. Yet, the present invention may be manufactured in volume in accordance with the internal structures disclosed in the above embodiments. Thus, the recording medium and the playback apparatus of the present invention can by industrially manufactured or used on an industrial scale. In view of the above, the recording media and the playback apparatus of the present invention have industrial applicability.

BRIEF DESCRIPTION OF THE DRAWINGS

FIG. 4 illustrates a process through which TS packets carrying an AV clip are recorded onto the BD-ROM;

FIG. 11A illustrates Stream_Coding_Info associated with a video stream;

FIG. 11B illustrates Stream_Coding_Info associated with an audio stream;

FIG. 14 shows, in tabular form, pairs of EP_Low and EP_High values representing the PTS_EP_start and the SPN_EP_start of entry points #1-#5 illustrated in FIG. 13;

FIG. 26A illustrates playback sections of a plurality of AV clips collectively specified by four Clip_Information_file_name fields contained in PlayItem information;

FIG. 26B illustrates extents of each AV clip on a PlayList timeline;

Description of Reference Numerals

Figure 1:
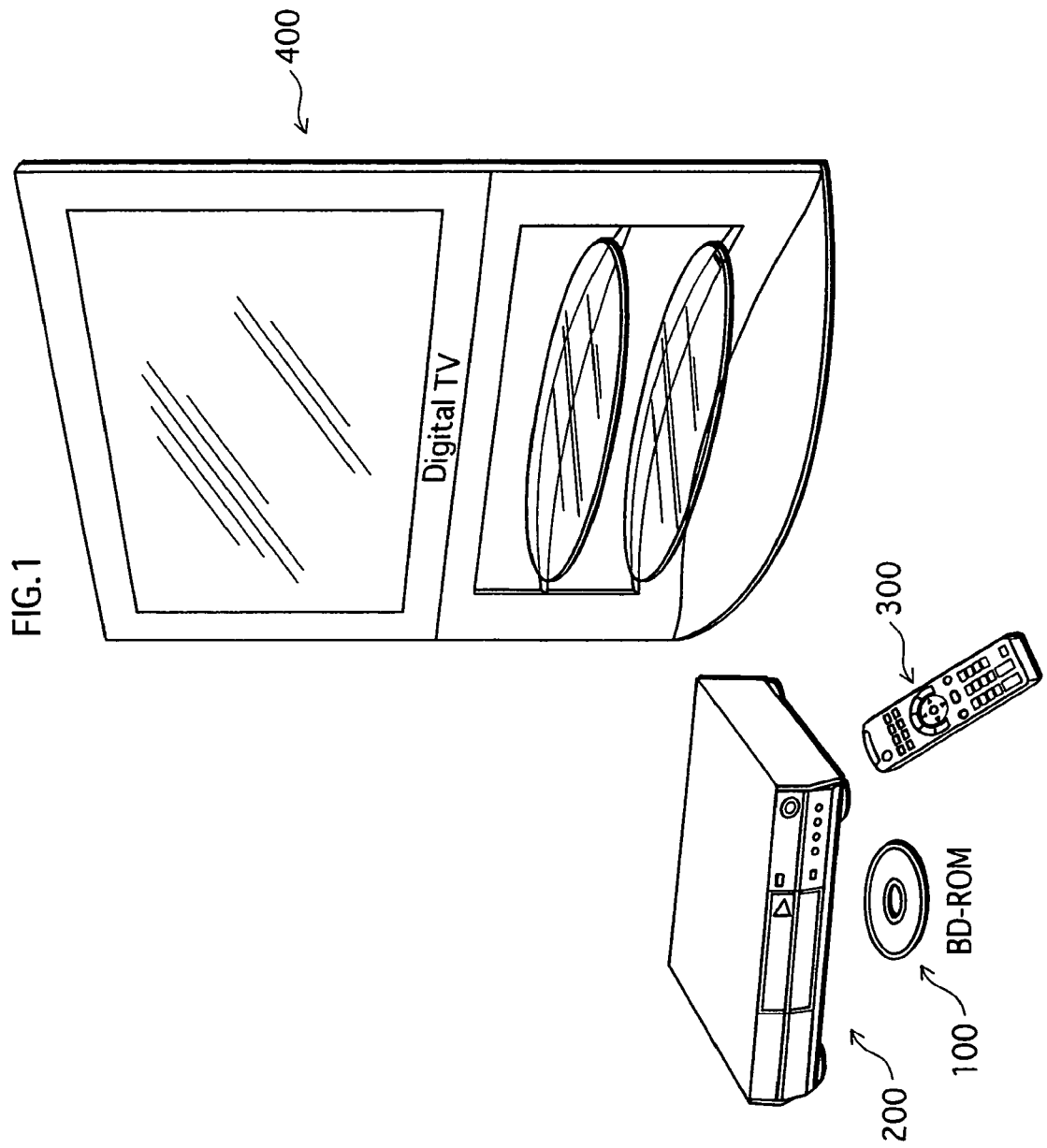
FIG. 1 illustrates a form of using a recording medium according to the present invention.
Figure 2:
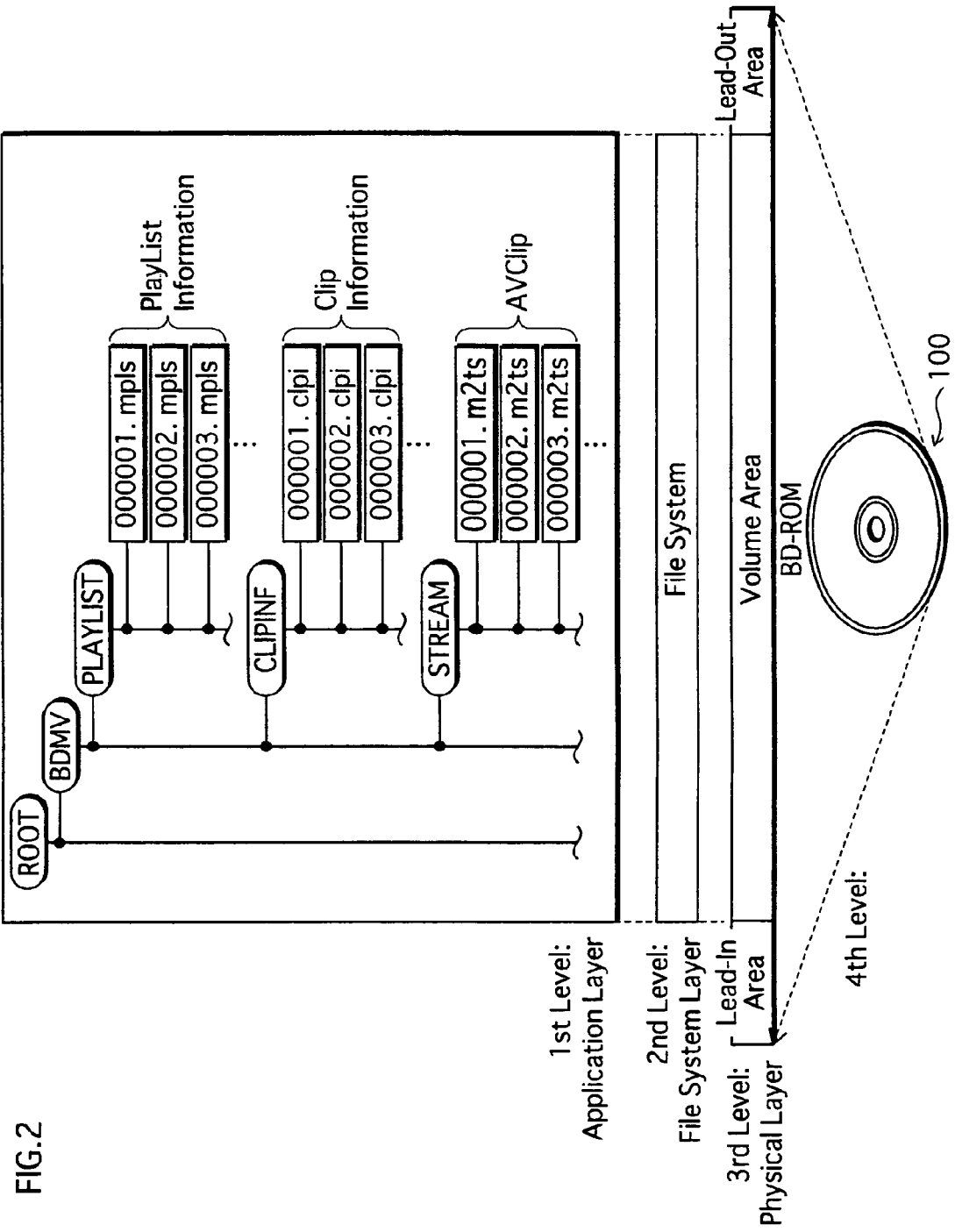
FIG. 2 illustrates the internal structure of a BD-ROM.
Figure 3:
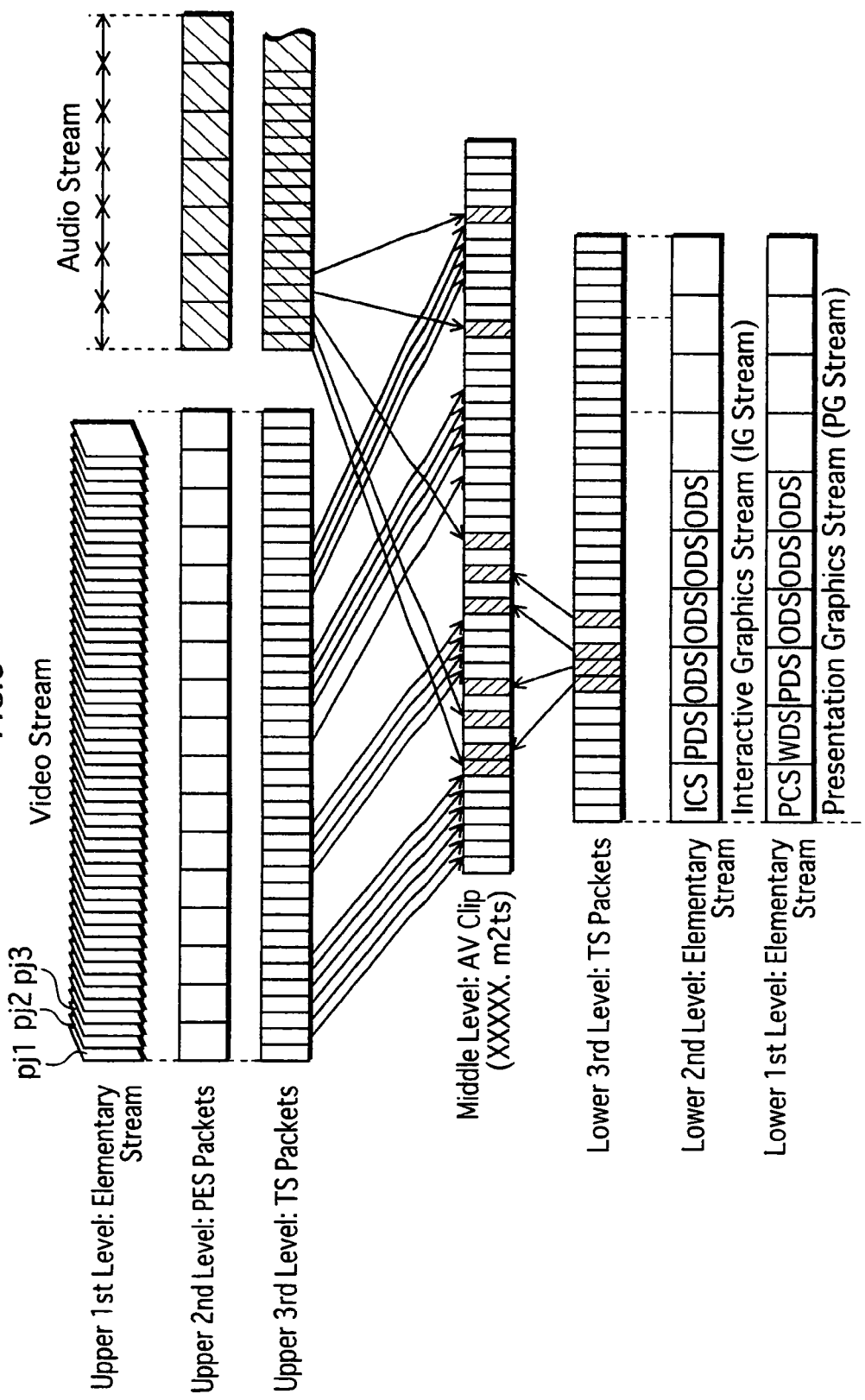
FIG. 3 schematically illustrates the structure of a file with the extension ".m2ts"
Figure 5A:
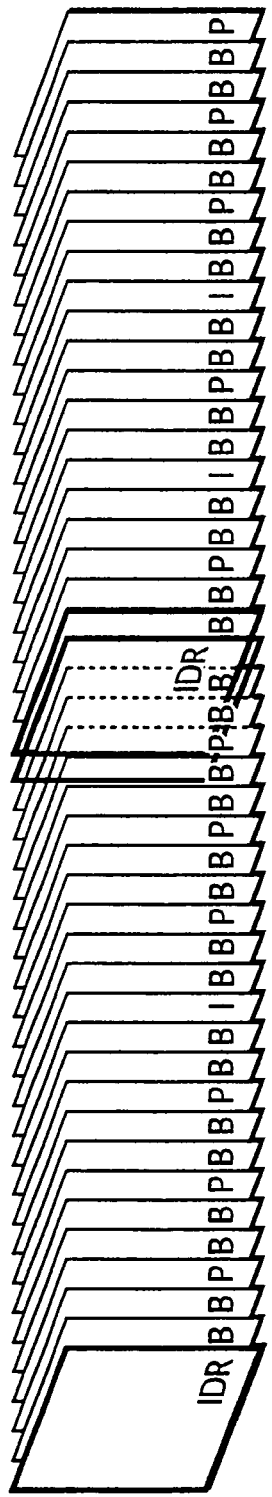
FIG. 5A illustrates a plurality of pictures arranged in the coding order.
Figure 5B:
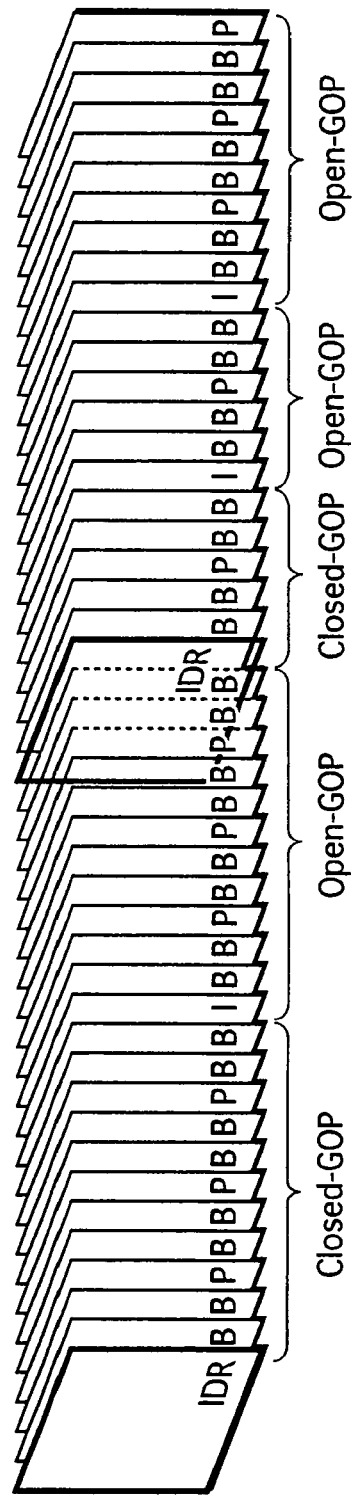
FIG. 5B illustrates the GOP structure of the video stream illustrated in FIG. 5A.
Figure 6A:
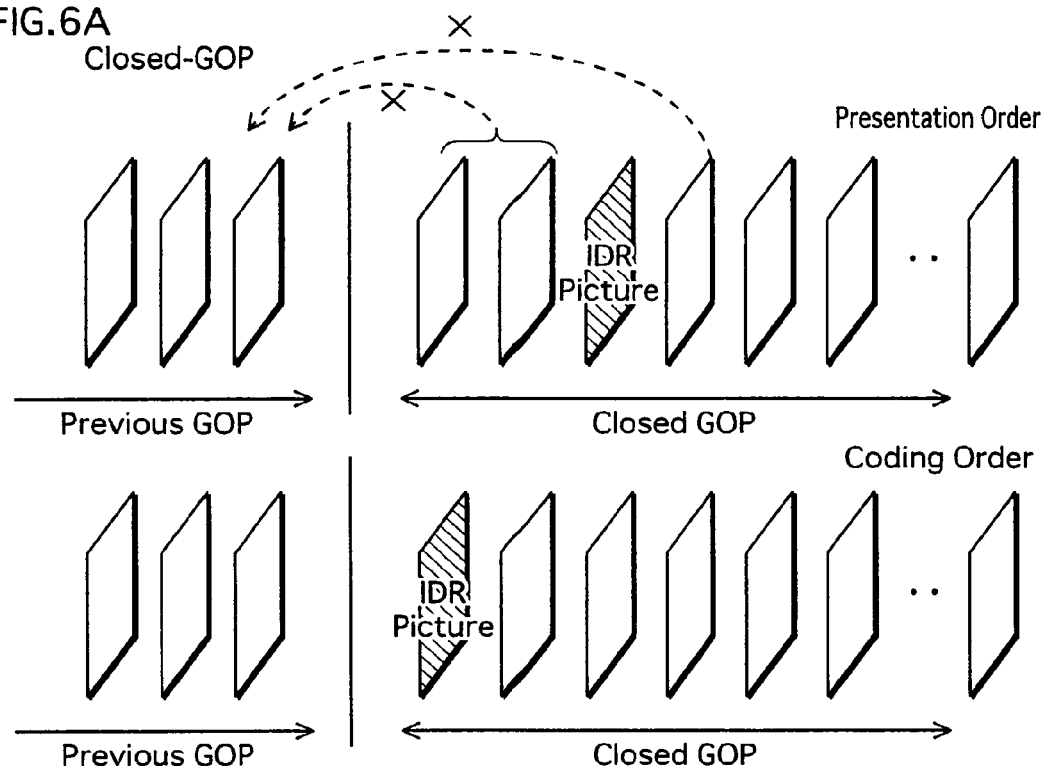
FIG. 6A illustrates the internal structure of a closed-GOP in the presentation order and in the coding order.
Figure 6B:
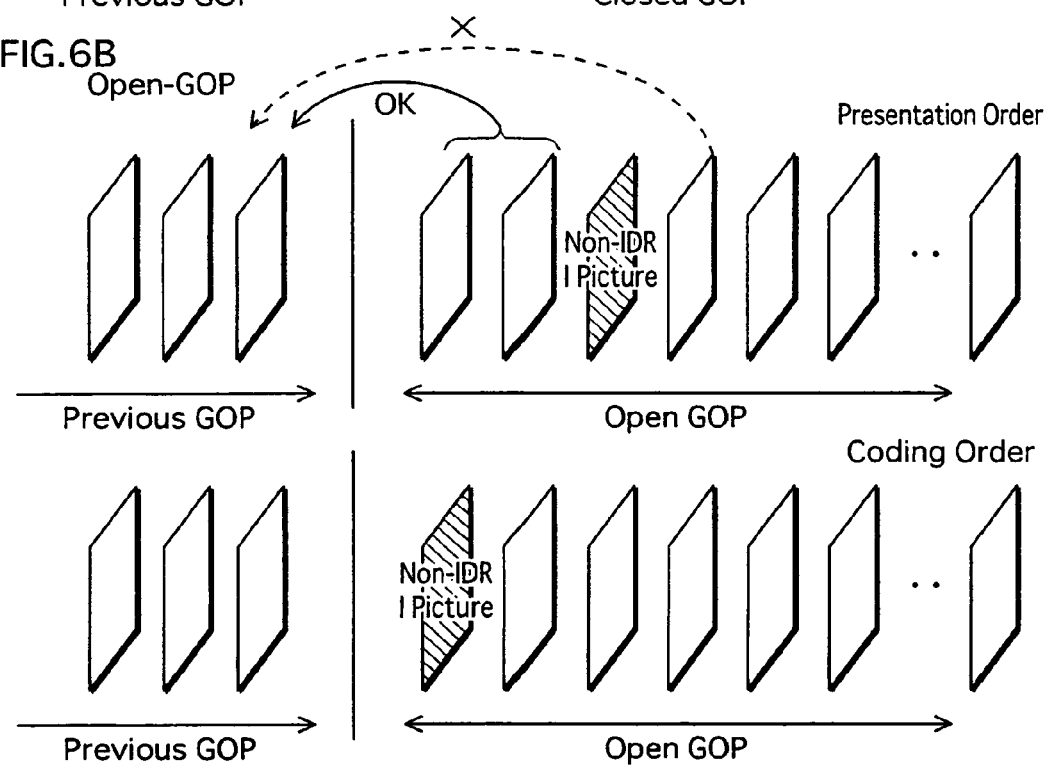
FIG. 6B illustrates the internal structure of an open-GOP.
Figure 7A:
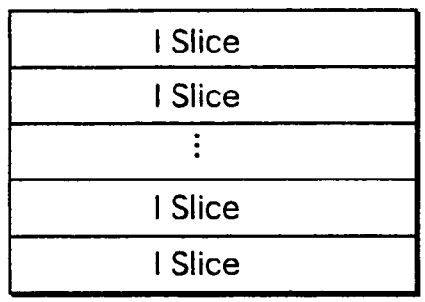
FIG. 7A illustrates the internal structure of an IDR picture.
Figure 7B:
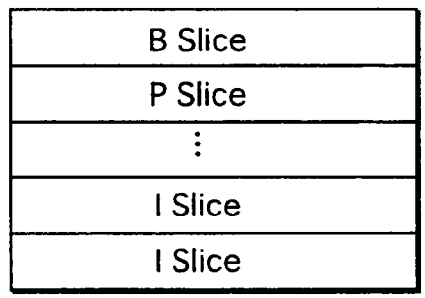
FIG. 7B illustrates the internal structure of a Non-IDR I picture.
Figure 7C:
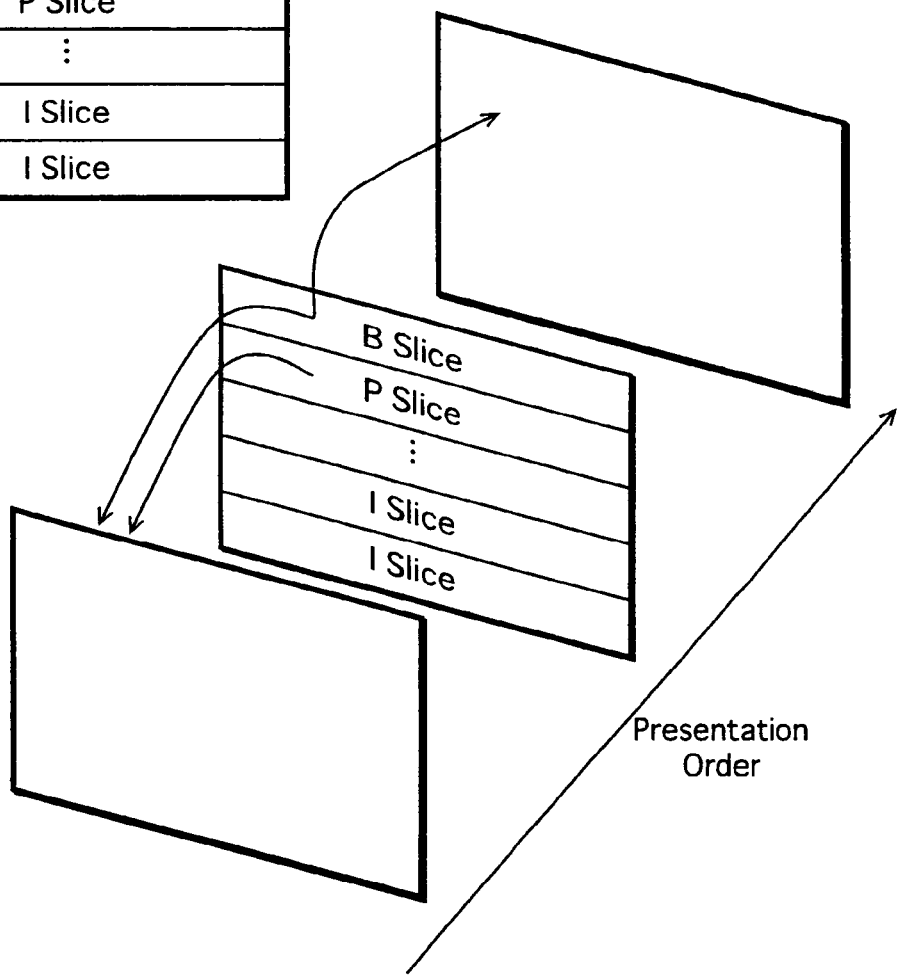
FIG. 7C illustrates the dependencies between the Non-IDR I picture and other pictures.
Figure 8:
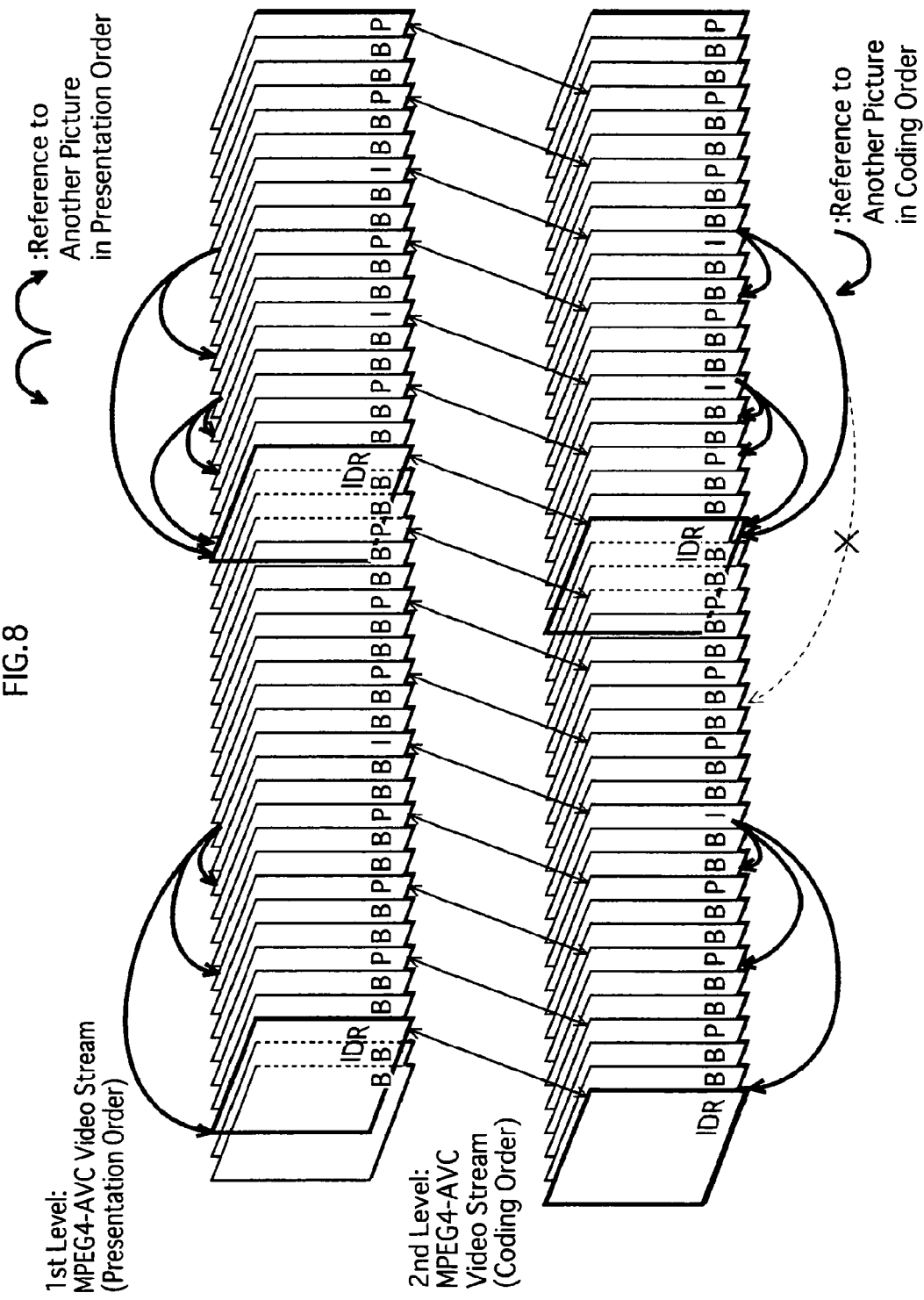
FIG. 8 illustrates the dependencies that a Non-IDR I picture may have.
Figure 9:
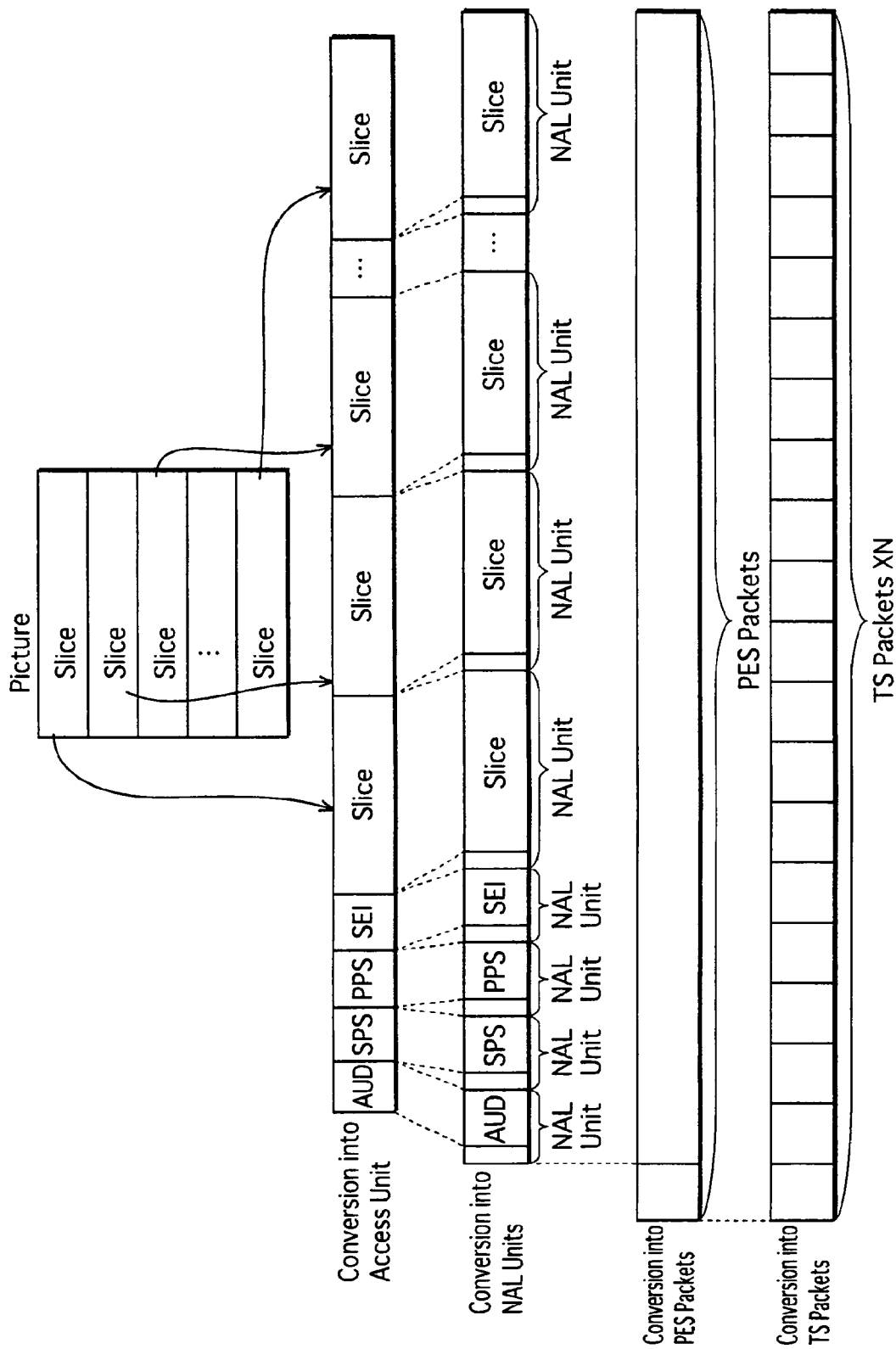
FIG. 9 illustrates a process through which an IDR or Non-IDR I picture is converted into TS packets.
Figure 10:
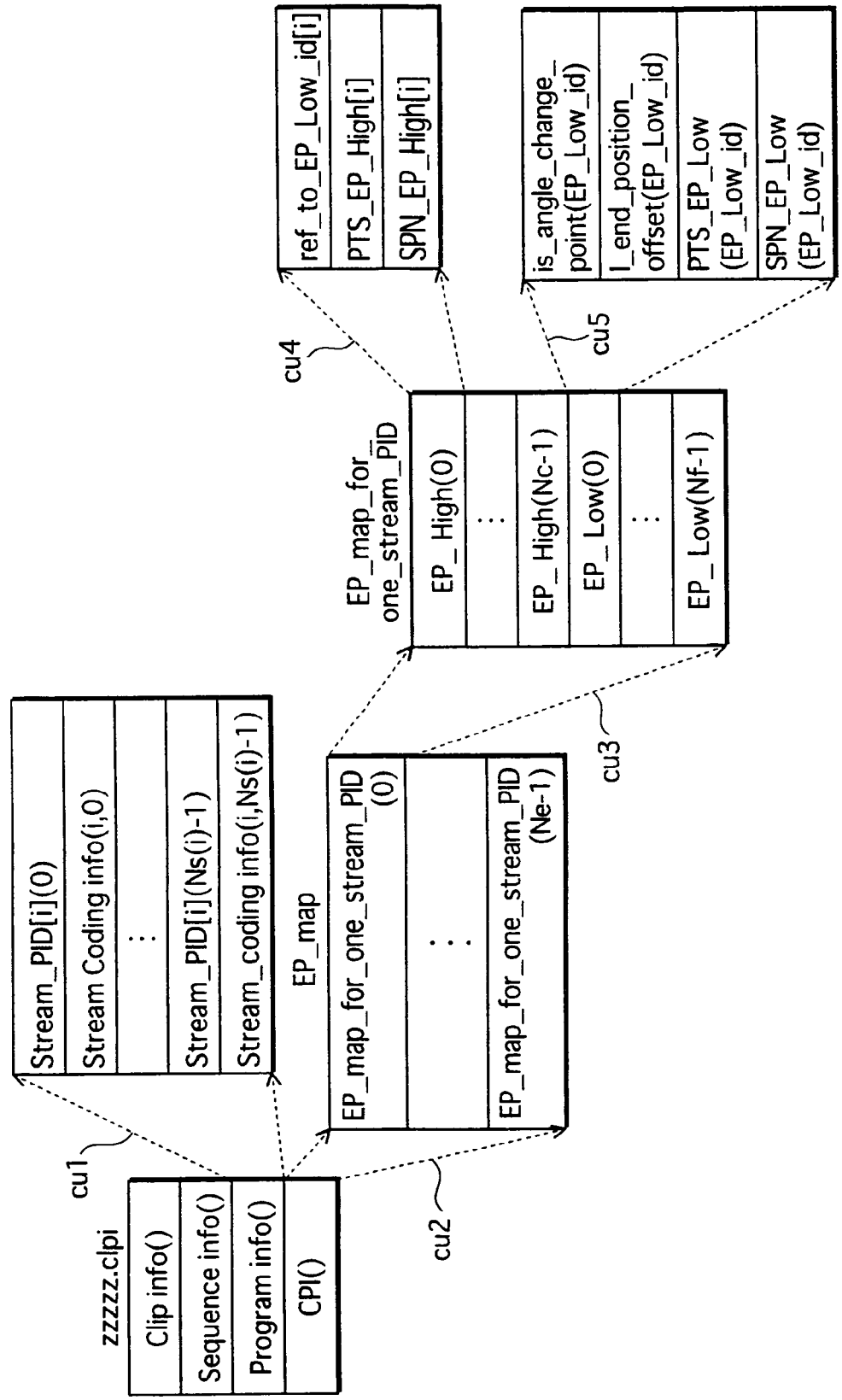
FIG. 10 illustrates the internal structure of a piece of Clip information.
Figure 12:
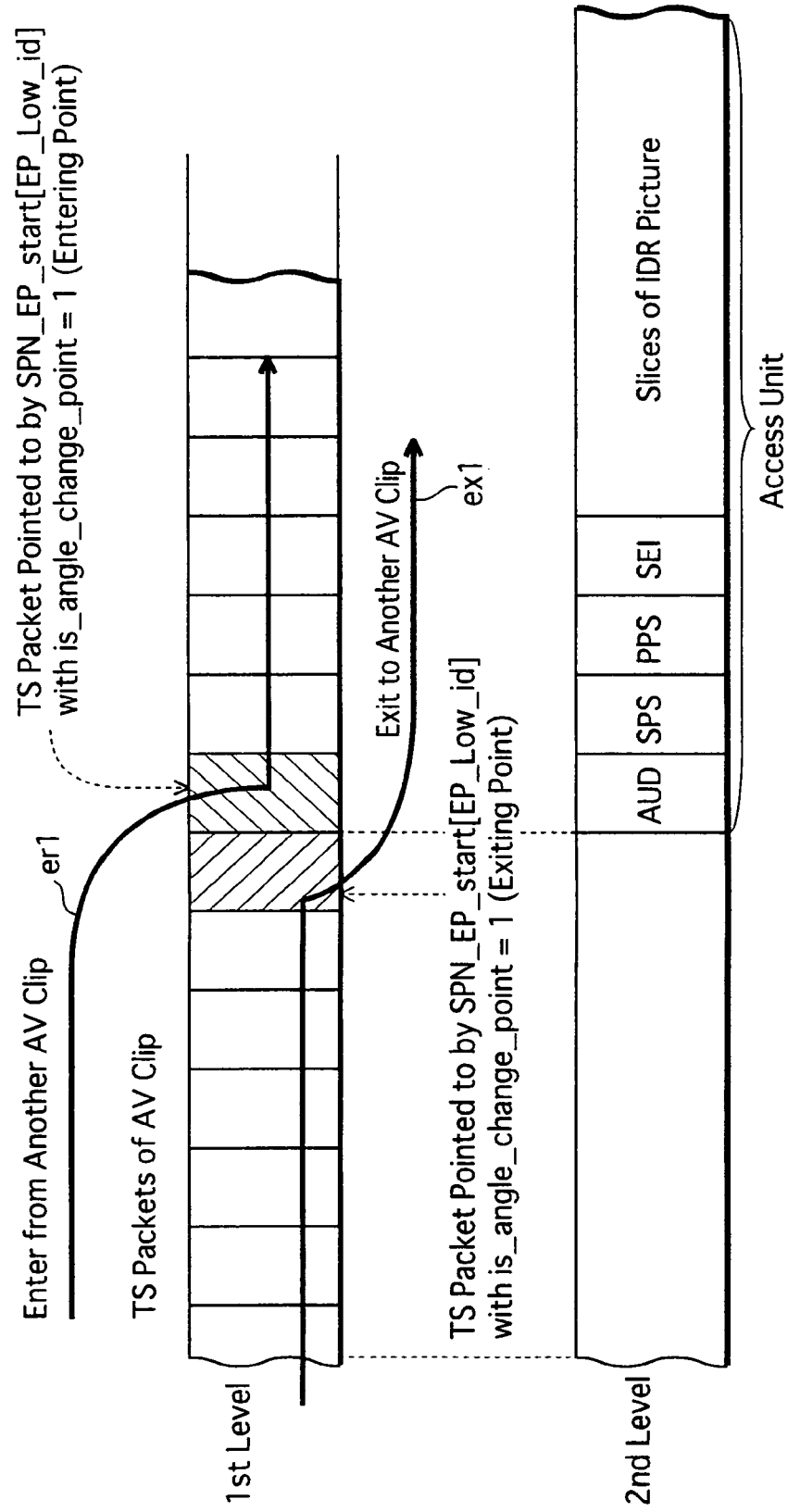
FIG. 12 illustrates the concept of entering to an AV clip and exiting form the AV clip to another AV clip.
Figure 13:
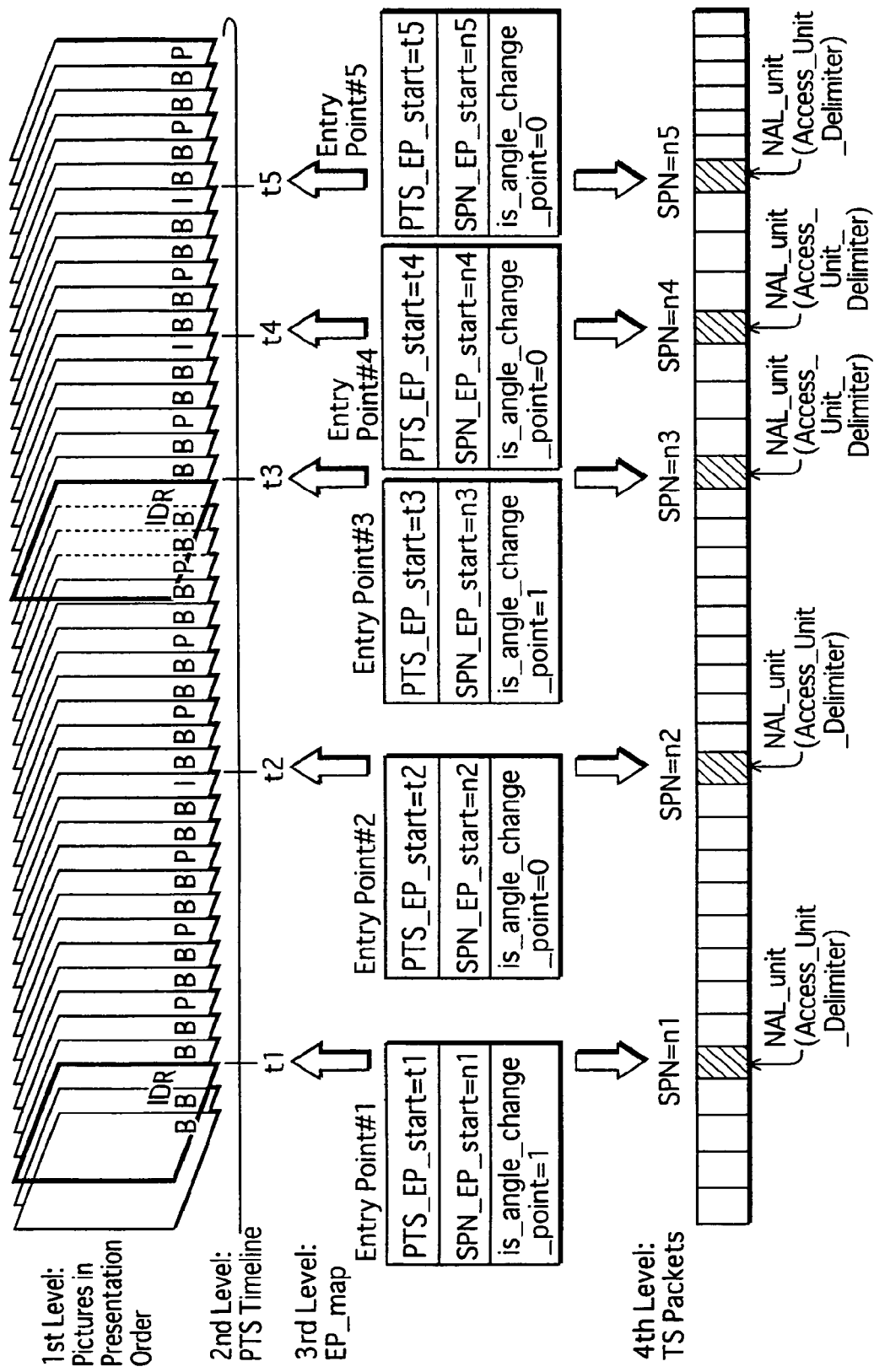
FIG. 13 illustrates the EP_map setting associated with the video stream illustrated in FIGS. 5A and 5B.
Figure 15:
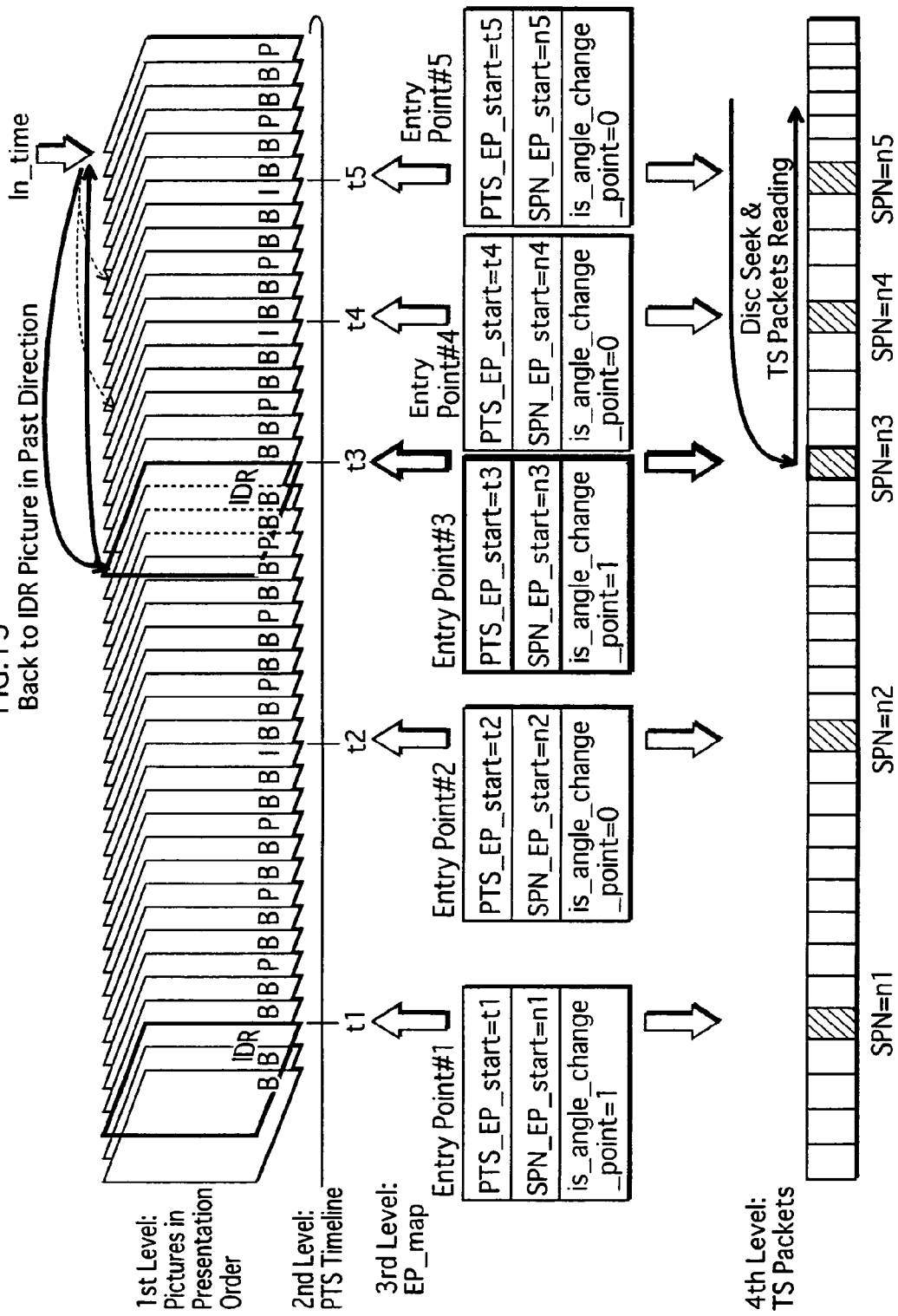
FIG. 15 illustrates the range of data to be read to execute jump playback.
Figure 16:
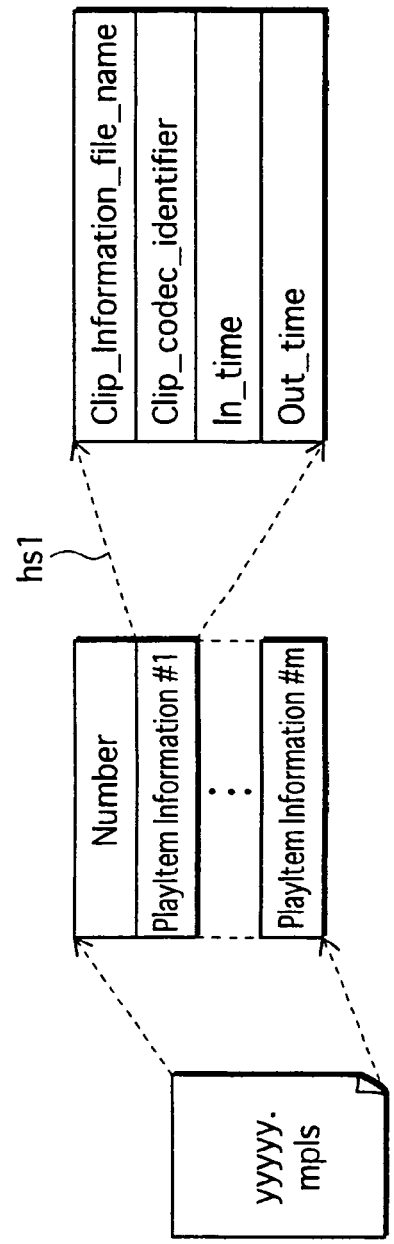
FIG. 16 illustrates the data structure of PlayList information.
Figure 17:
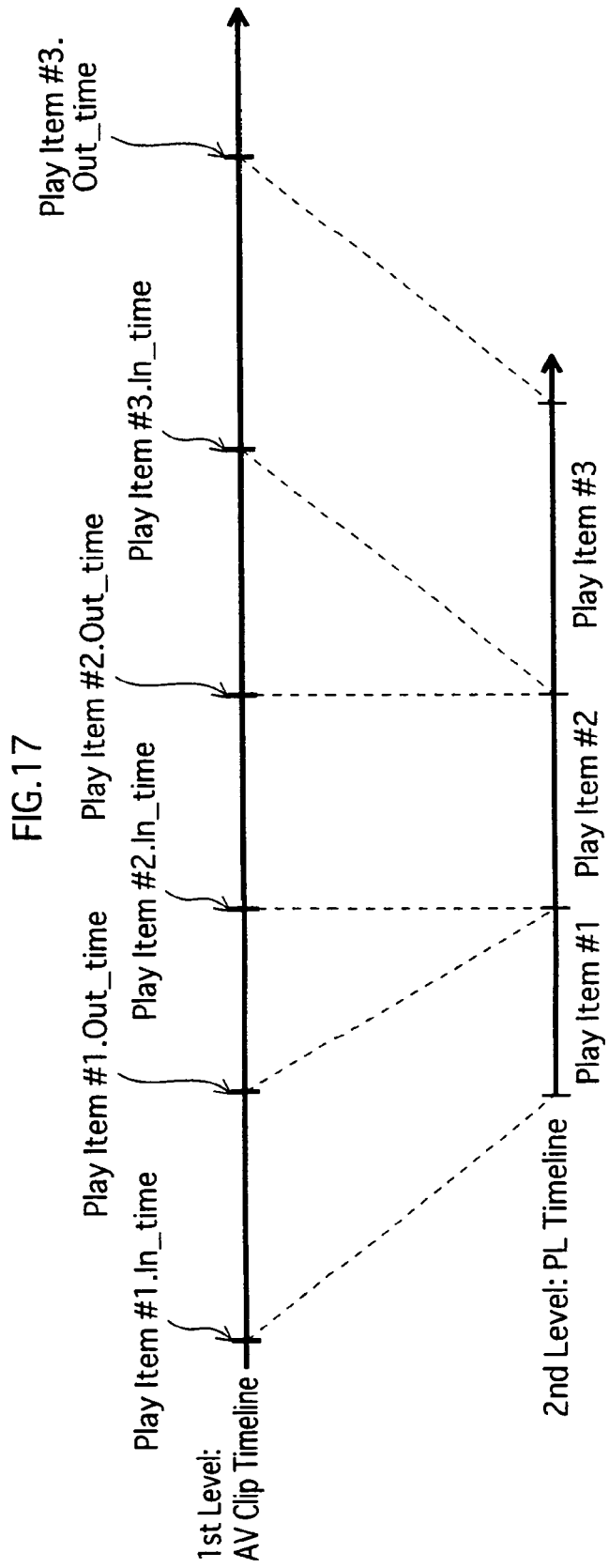
FIG. 17 illustrates the relationship between an AV clip and PlayList information.
Figure 18:
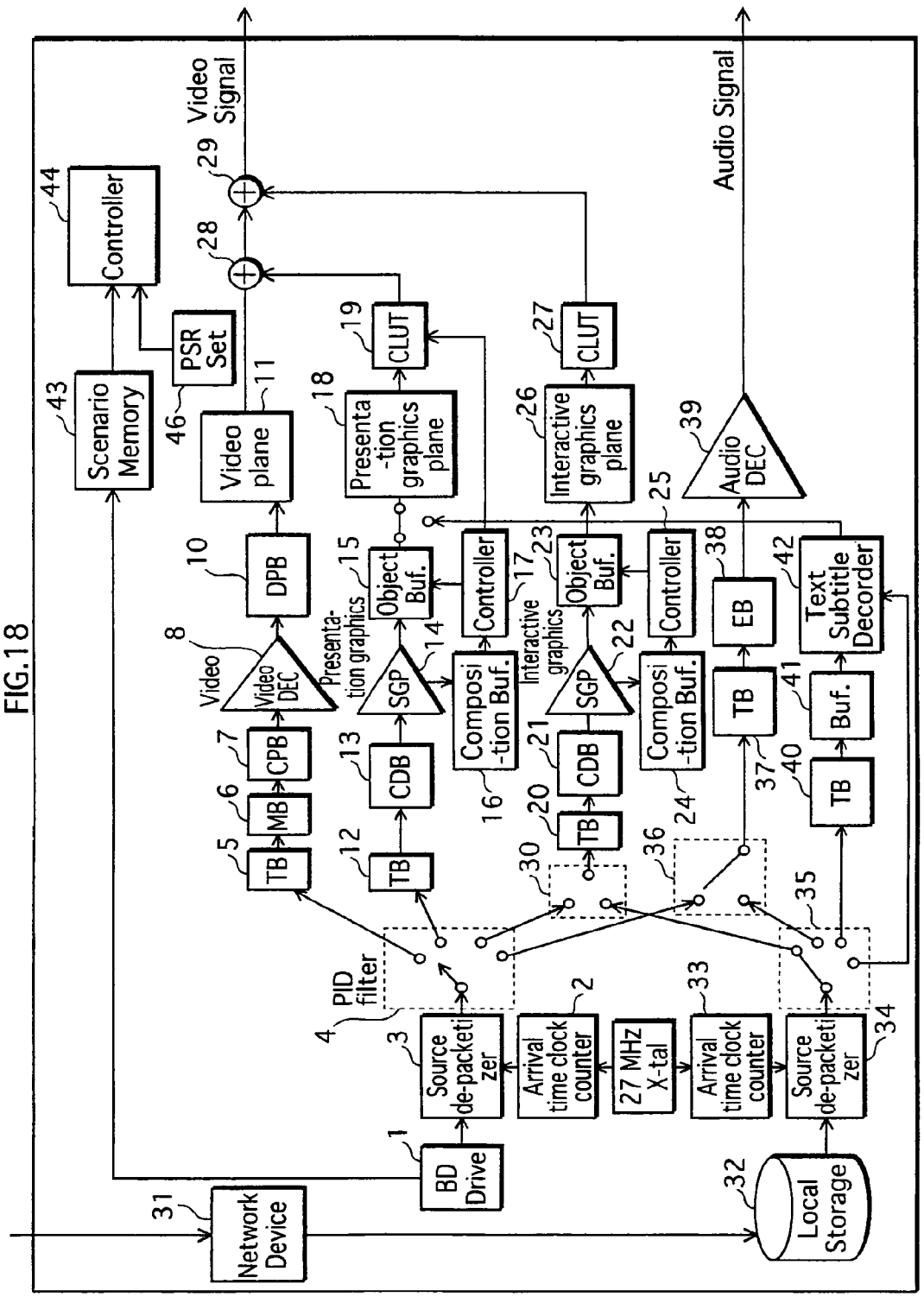
FIG. 18 illustrates the internal structure of a playback apparatus according to the present invention.
Figure 19:
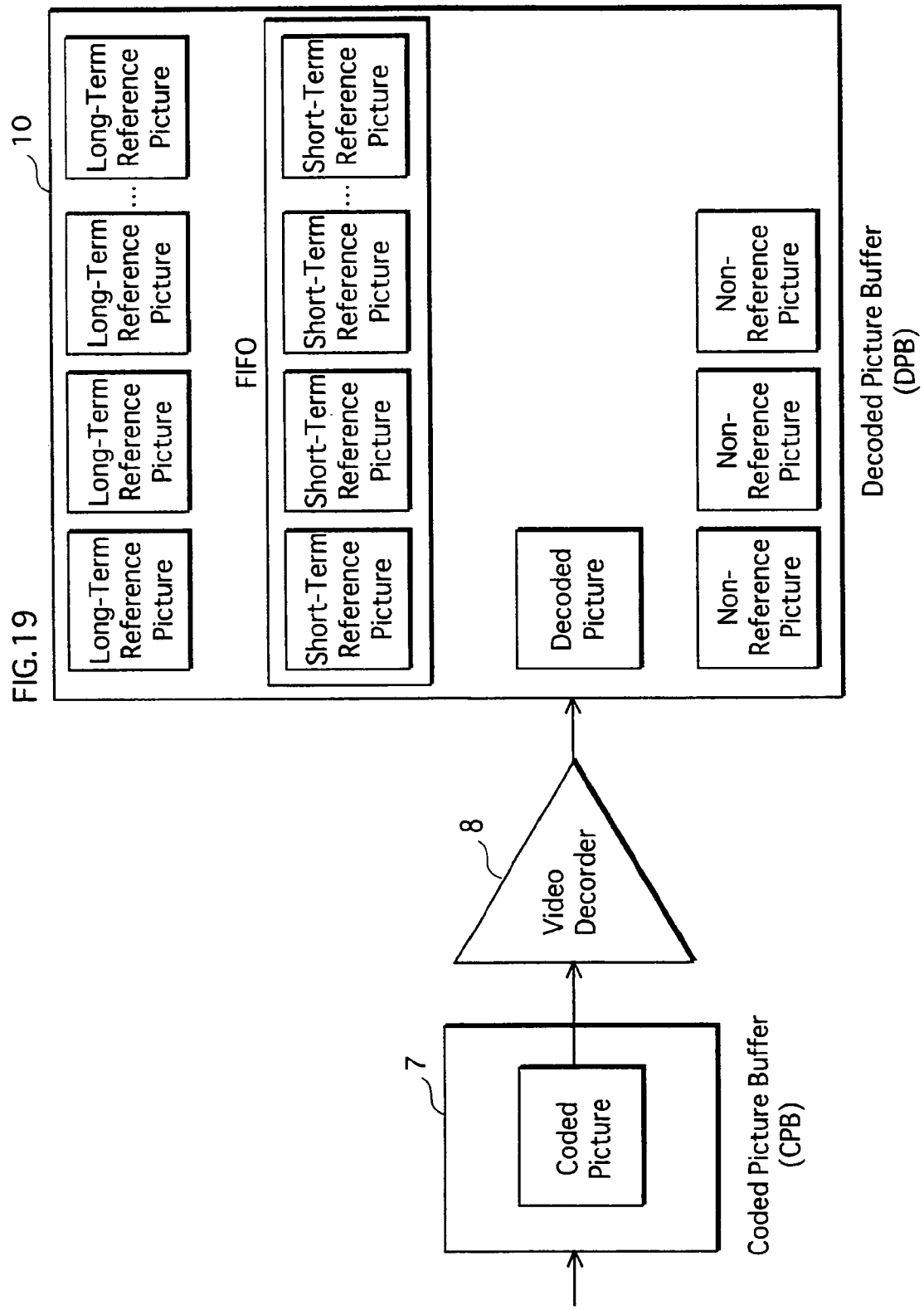
FIG. 19 illustrates the internal structure of a decoded picture buffer 10.
Figure 20:
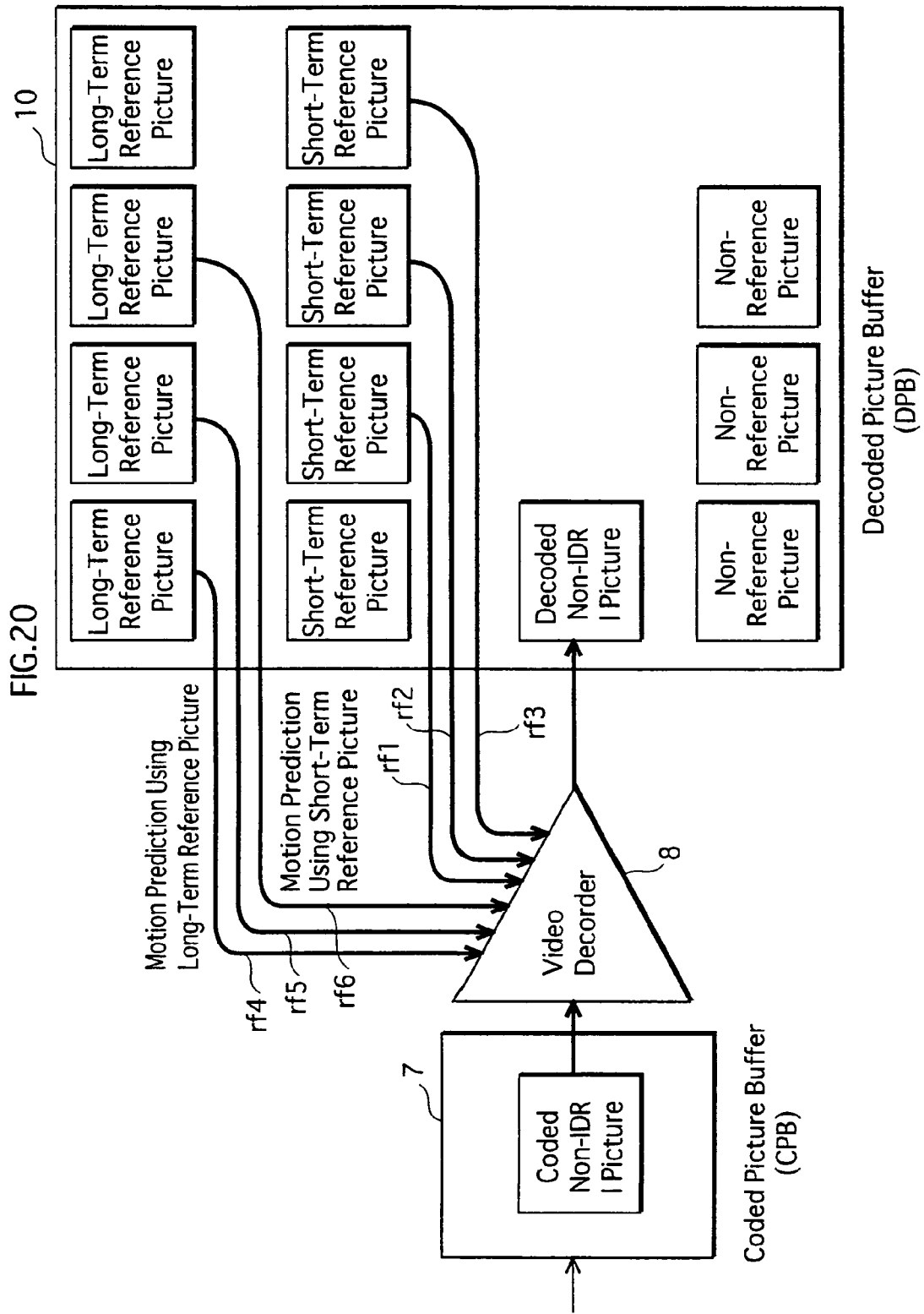
FIG. 20 illustrates a process of decoding a Non-IDR I picture by a video decoder 8.
Figure 21:
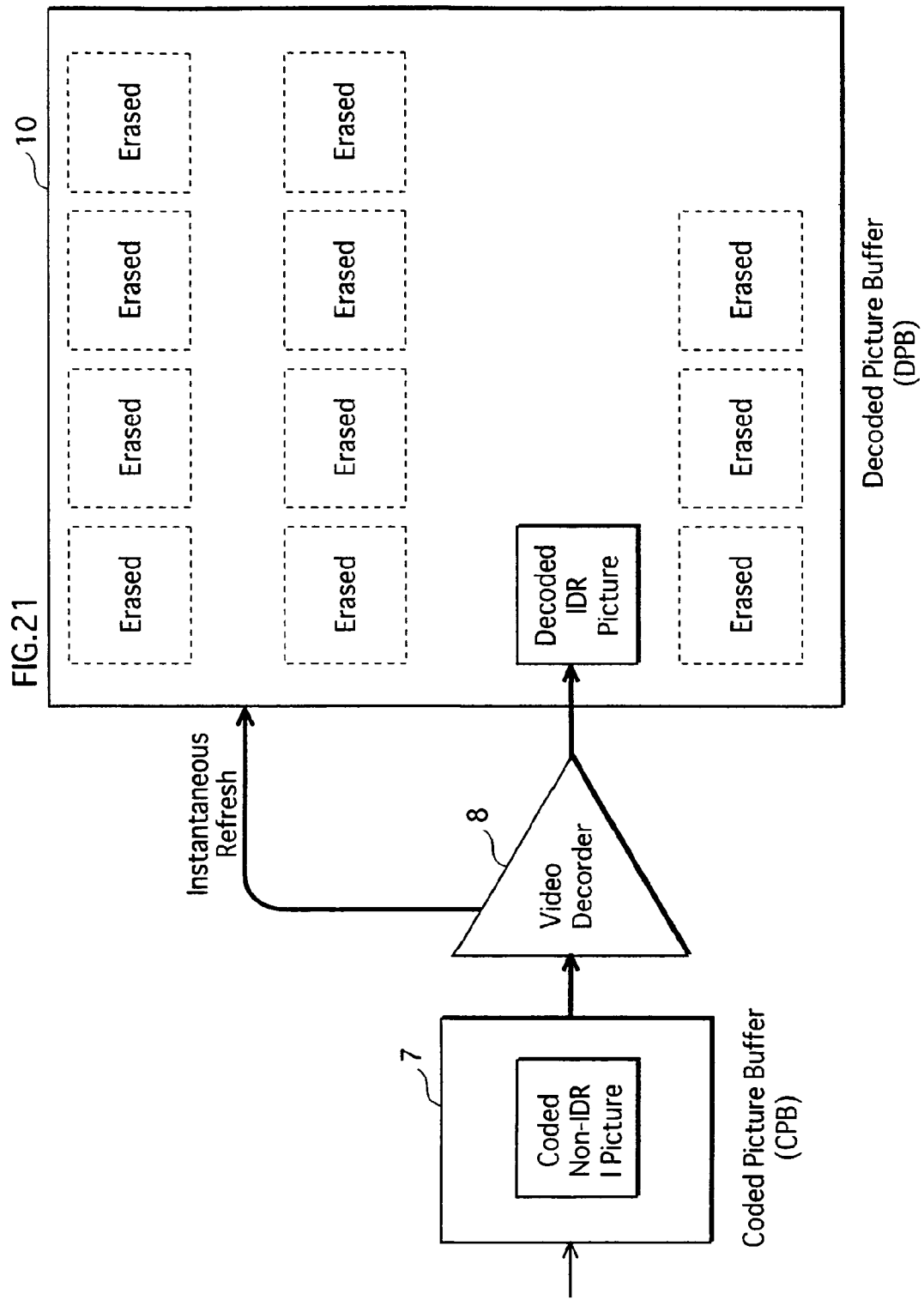
FIG. 21 illustrates the contents stored in the decoded picture buffer 10 at the time of the IDR picture decoding.
Figure 22:
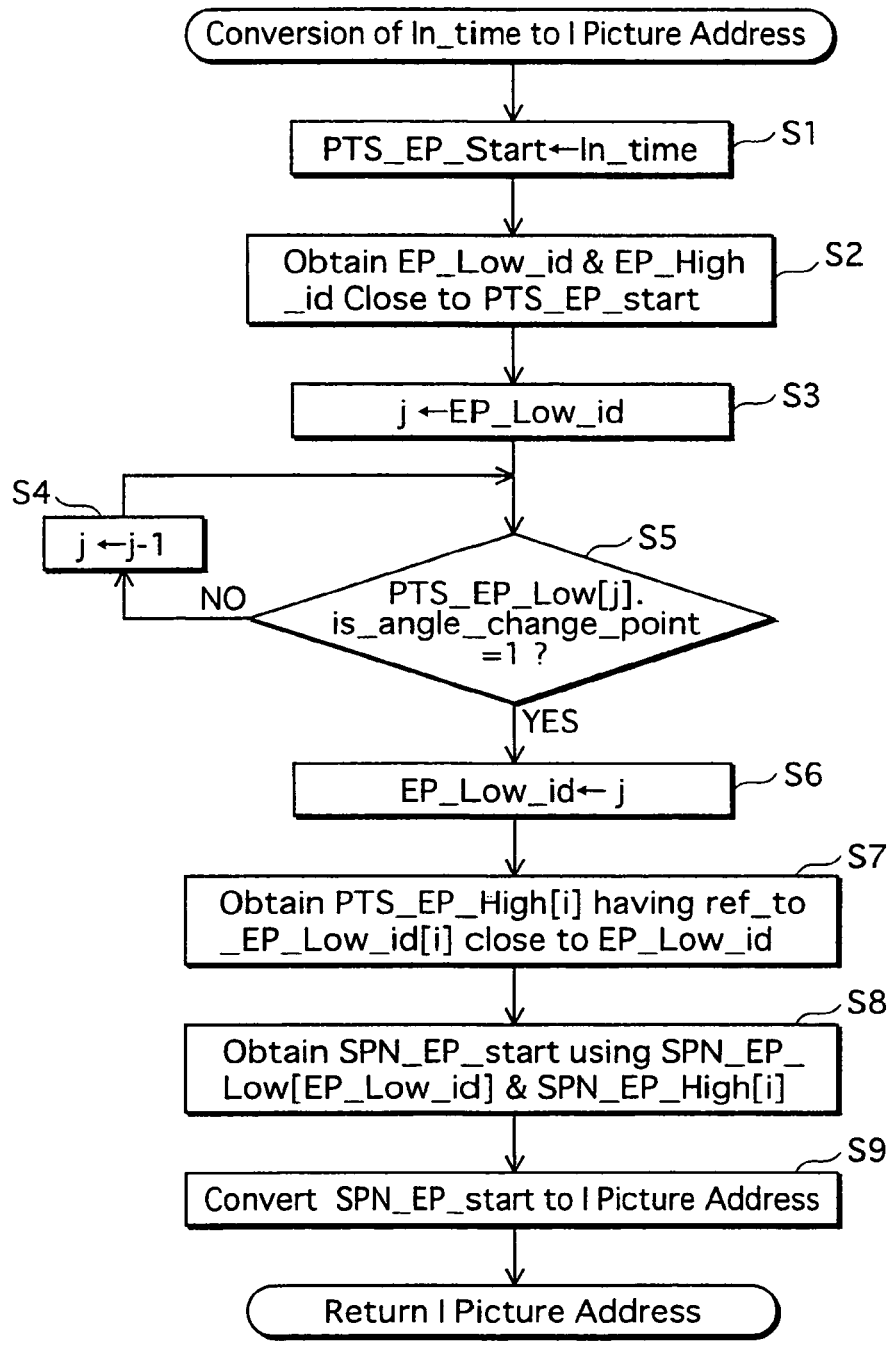
FIG. 22 is a flowchart of a process of converting timing information into an I picture address.
Figure 23:
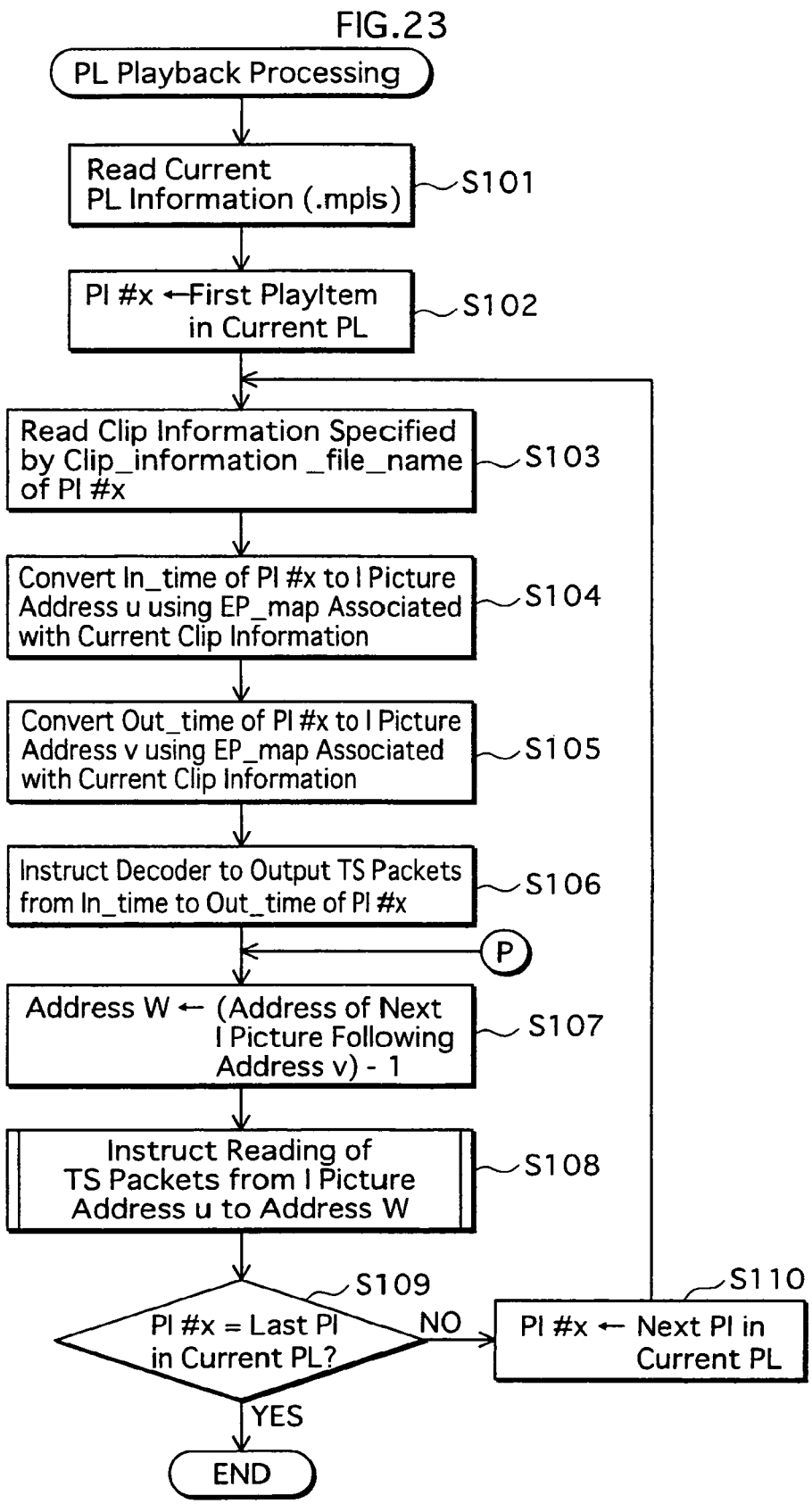
FIG. 23 is a flowchart of the PL playback performed by a controller 44.
Figure 24:
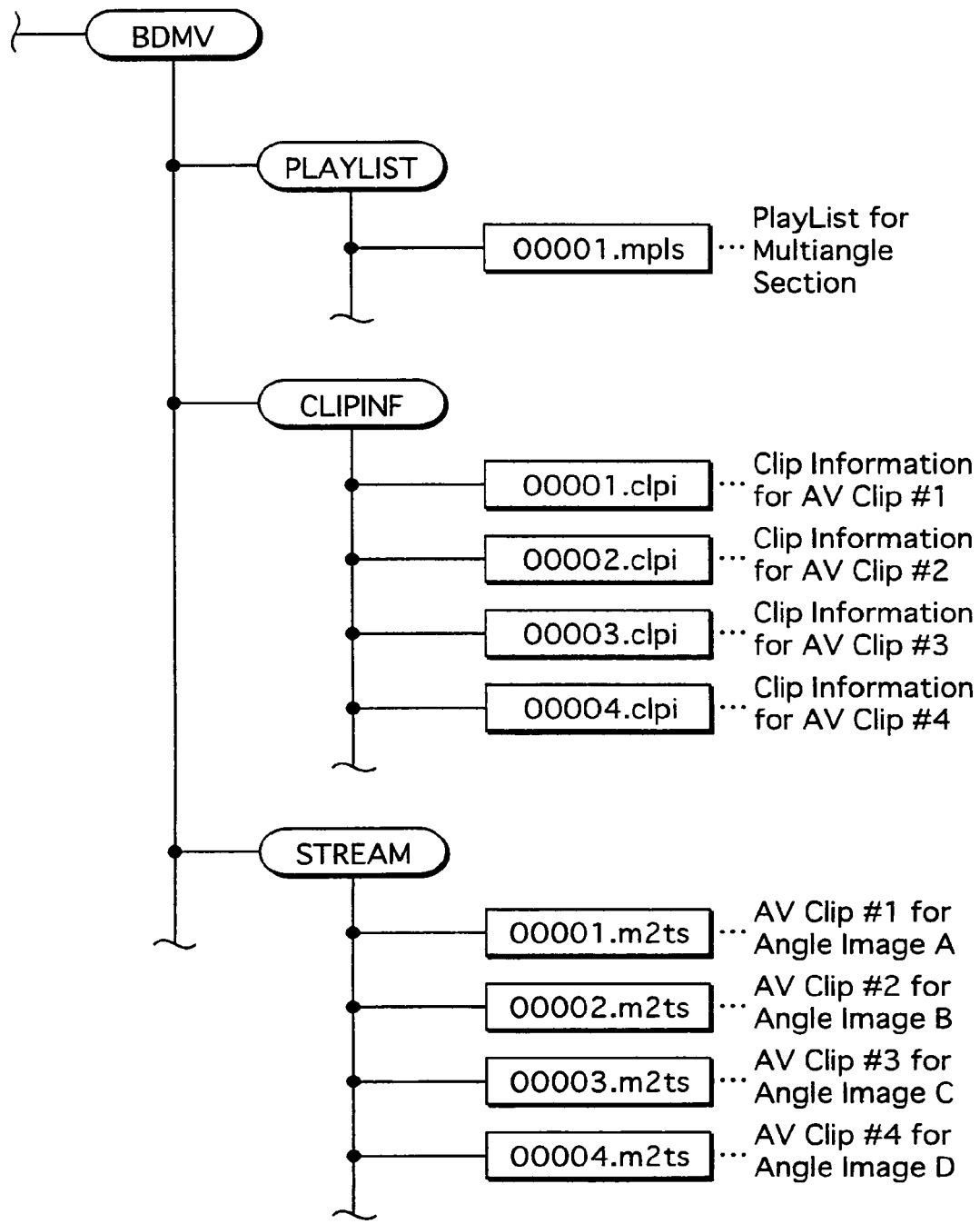
FIG. 24 illustrates an application layout implementing a multiangle section.
Figure 25:
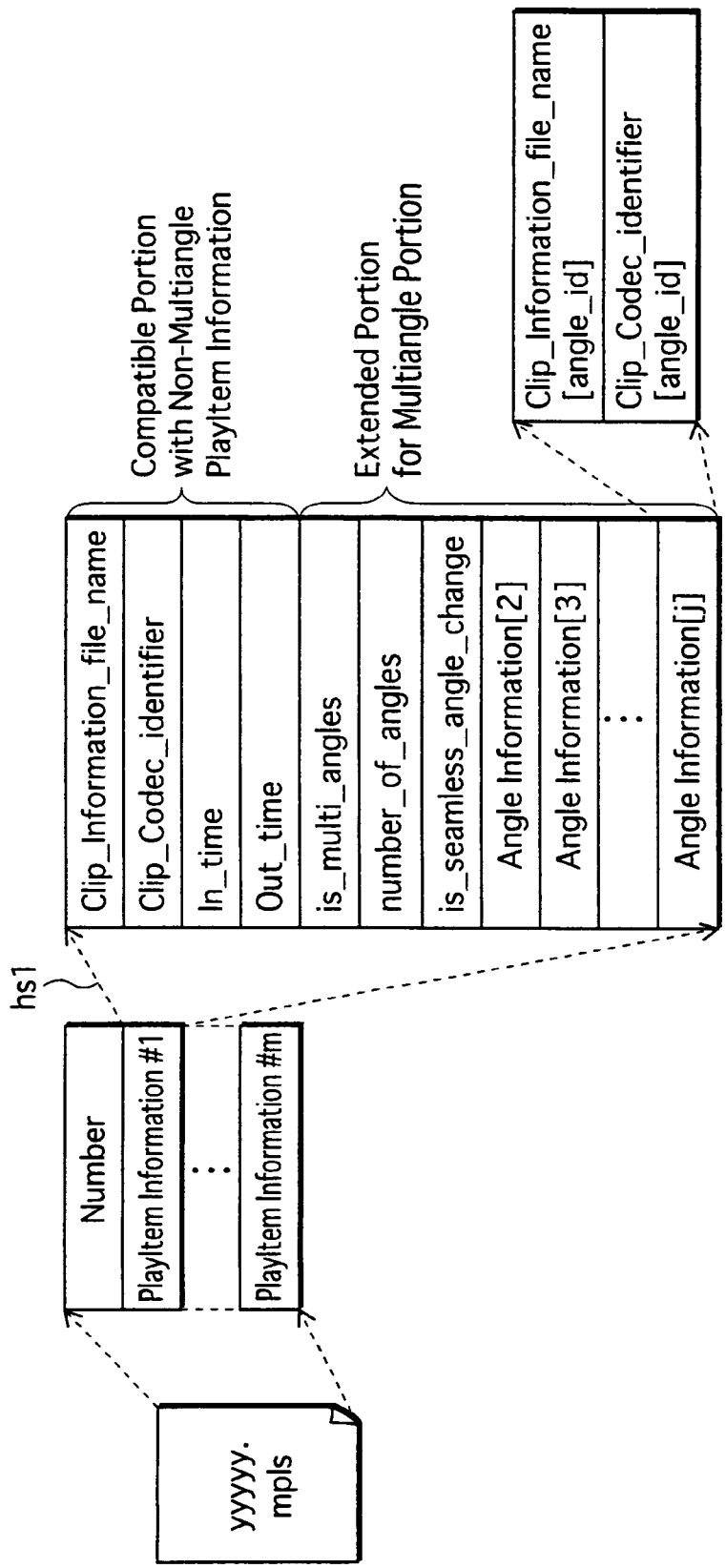
FIG. 25 illustrates the data structure of PlayList information.
Figure 27A:
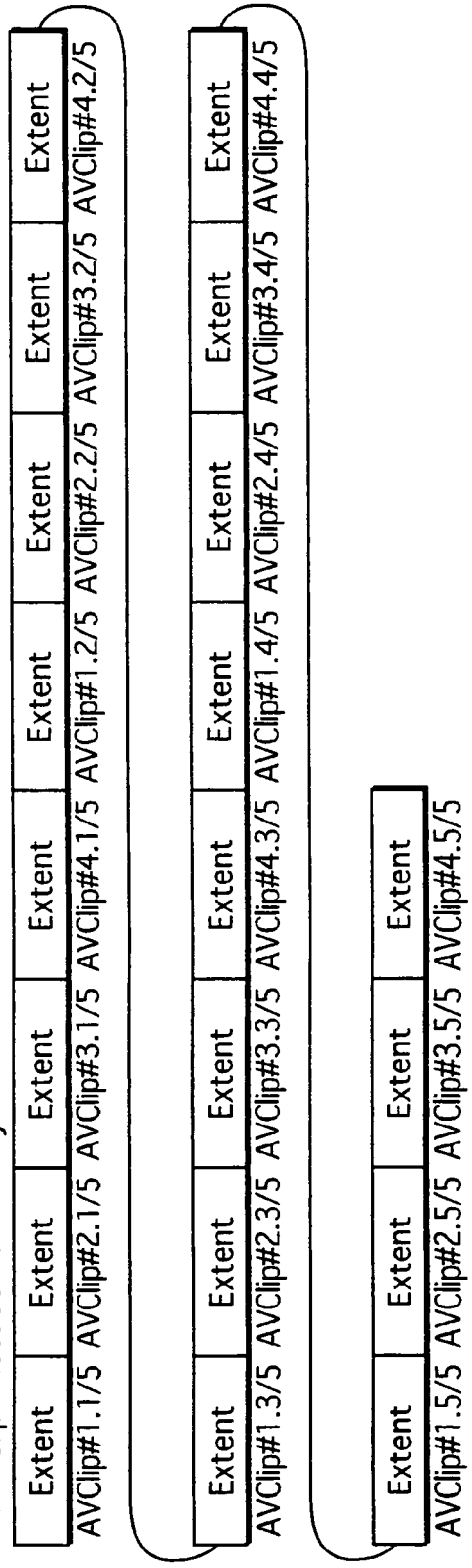
FIG. 27A is an allocation image showing the arrangement of the four AV clips constituting the multiangle section, on the BD-ROM.
Figure 27B:
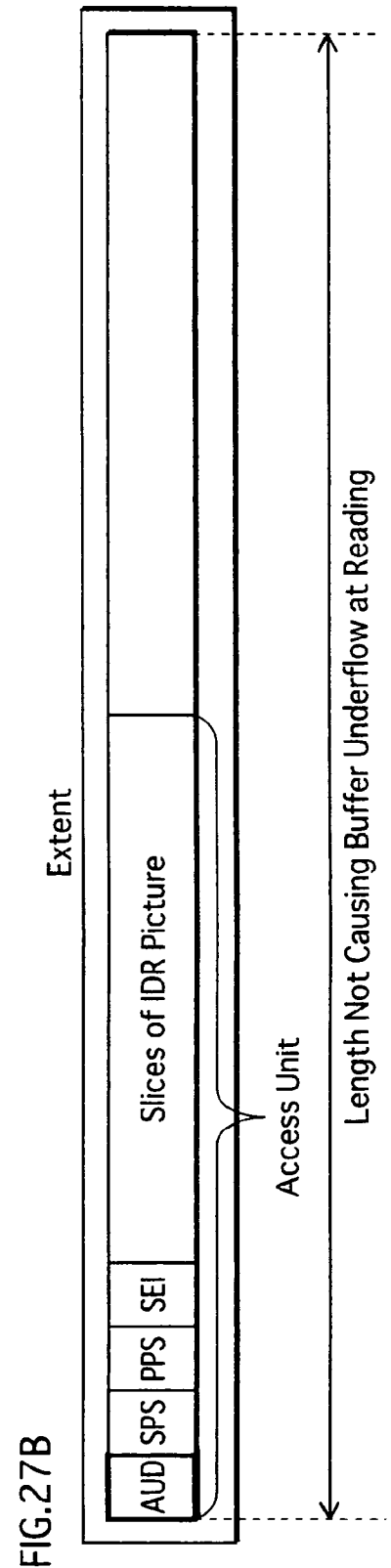
FIG. 27B illustrates the internal structure of one extent of an AV clip.
Figure 28:
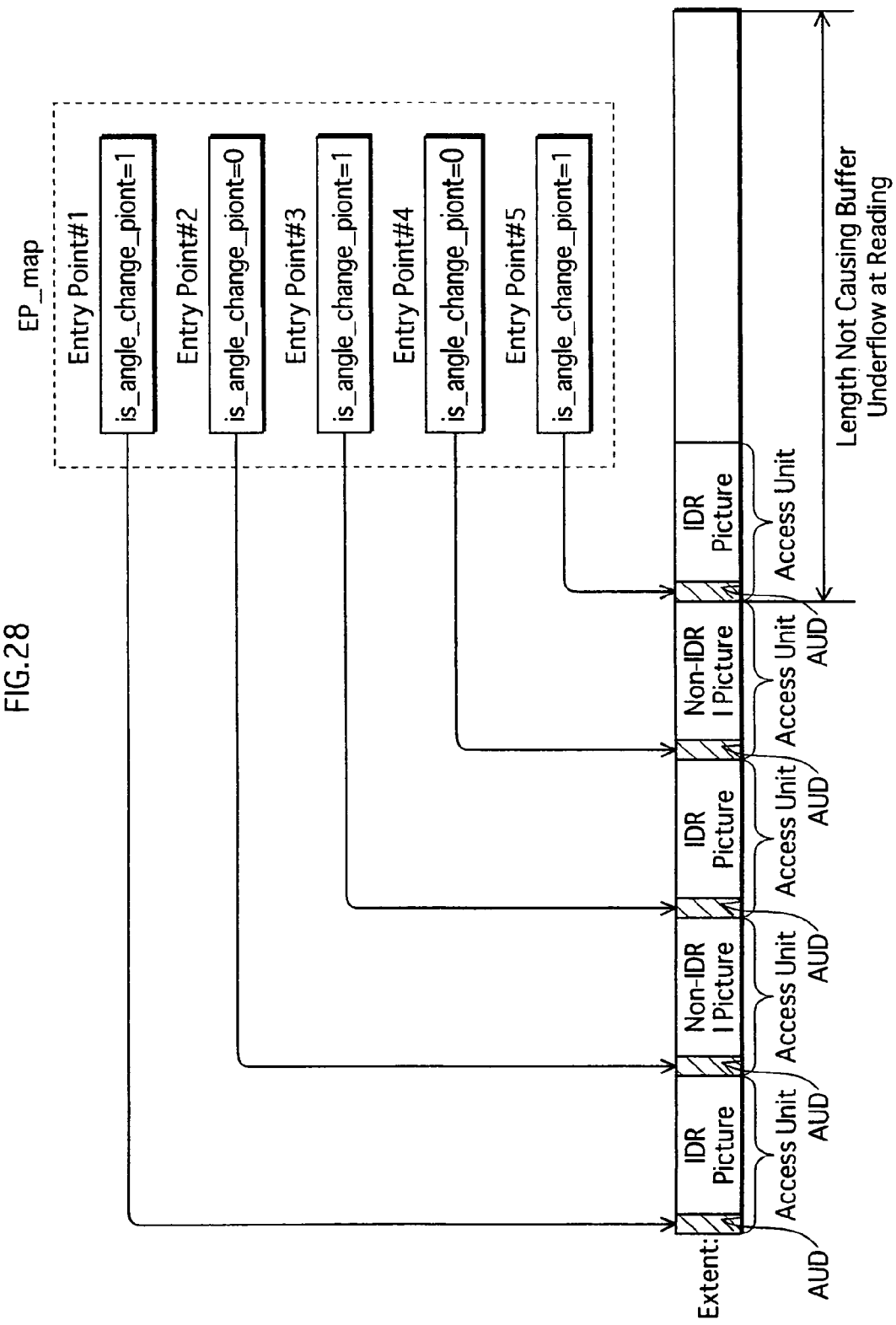
FIG. 28 illustrates the concept of how to determine the contiguous length to the extent.
Figure 29:
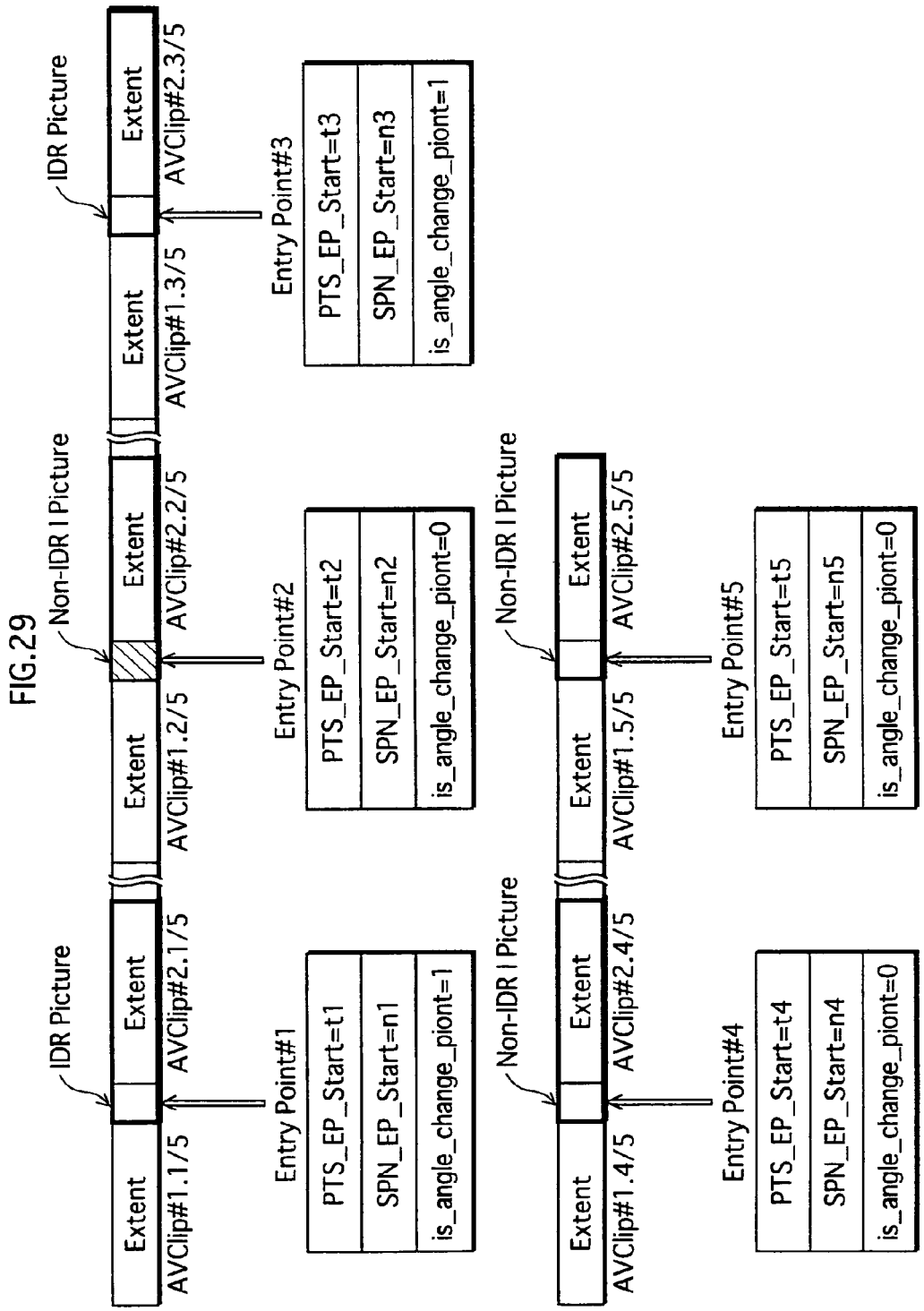
FIG. 29 illustrates the allocation of extents on the BD-ROM, along with the entry point setting.
Figure 30:
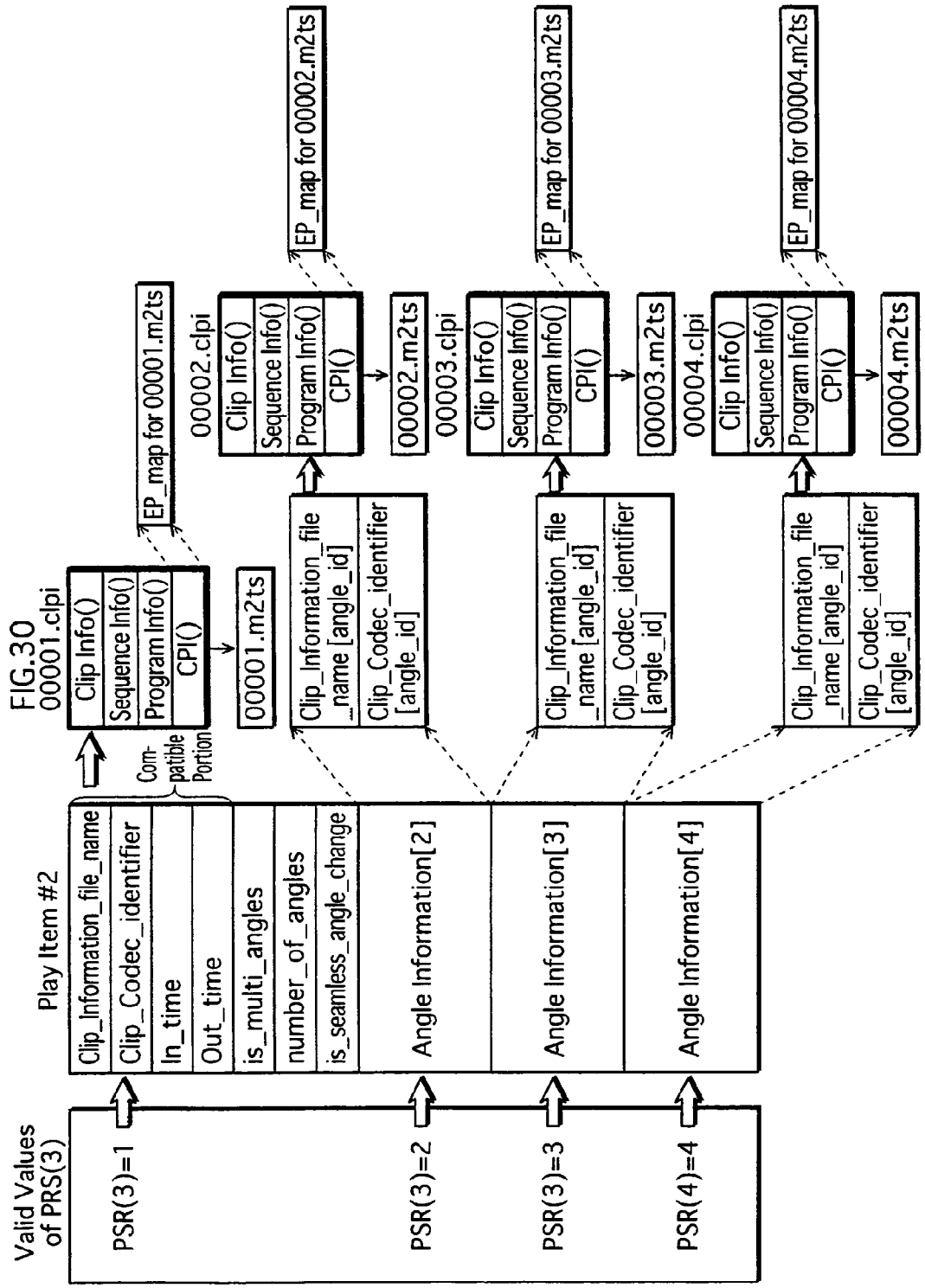
FIG. 30 illustrates valid values of PSR(3) and the relationship with PlayItem and Clip information.
Figure 31:
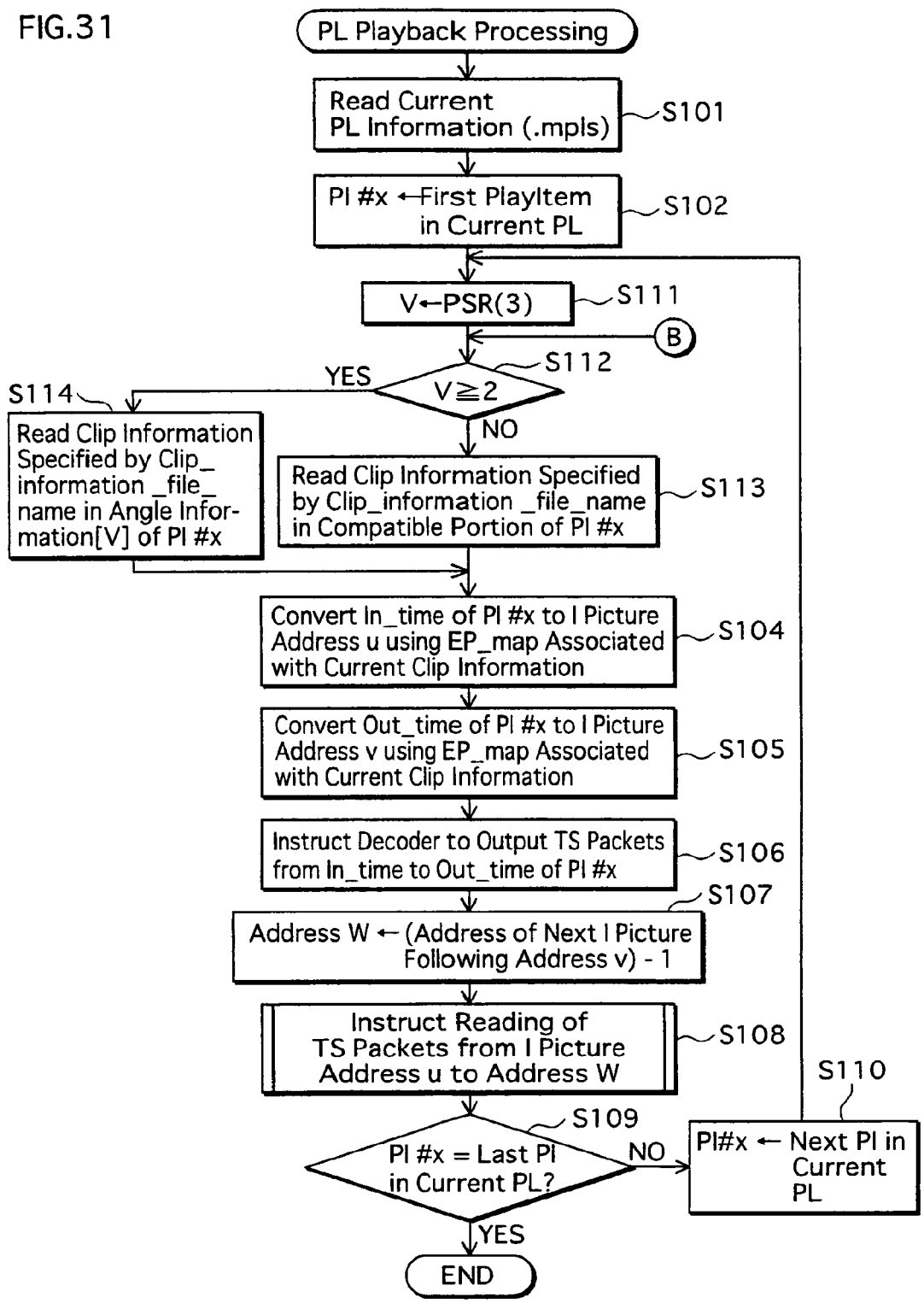
FIG. 31 is a flowchart of processing steps performed to execute playback of PlayList information according to a second embodiment of the present invention.
Figure 32:
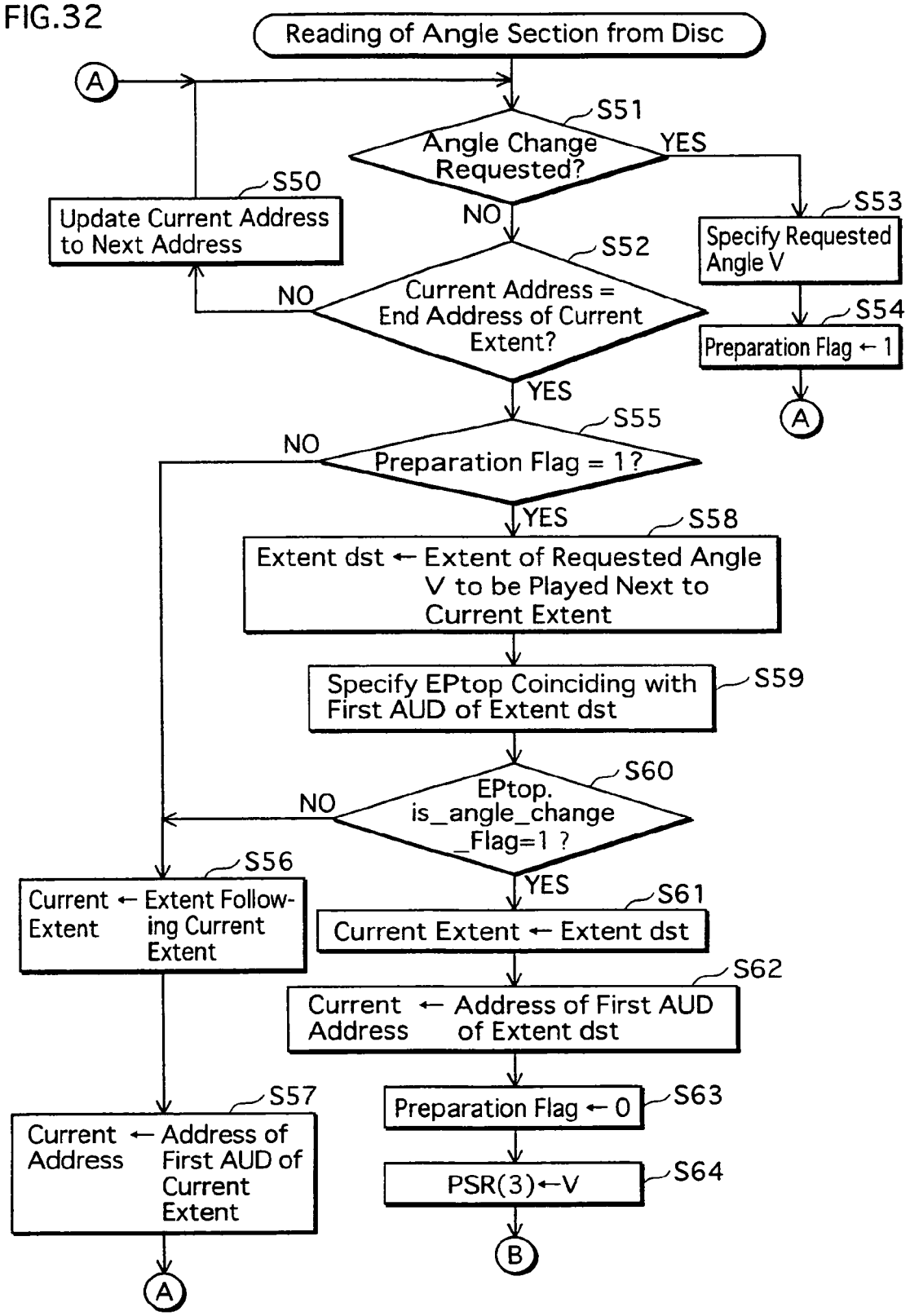
FIG. 32 is a flowchart of processing steps performed to read a multiangle section from a disc.
Figure 33:
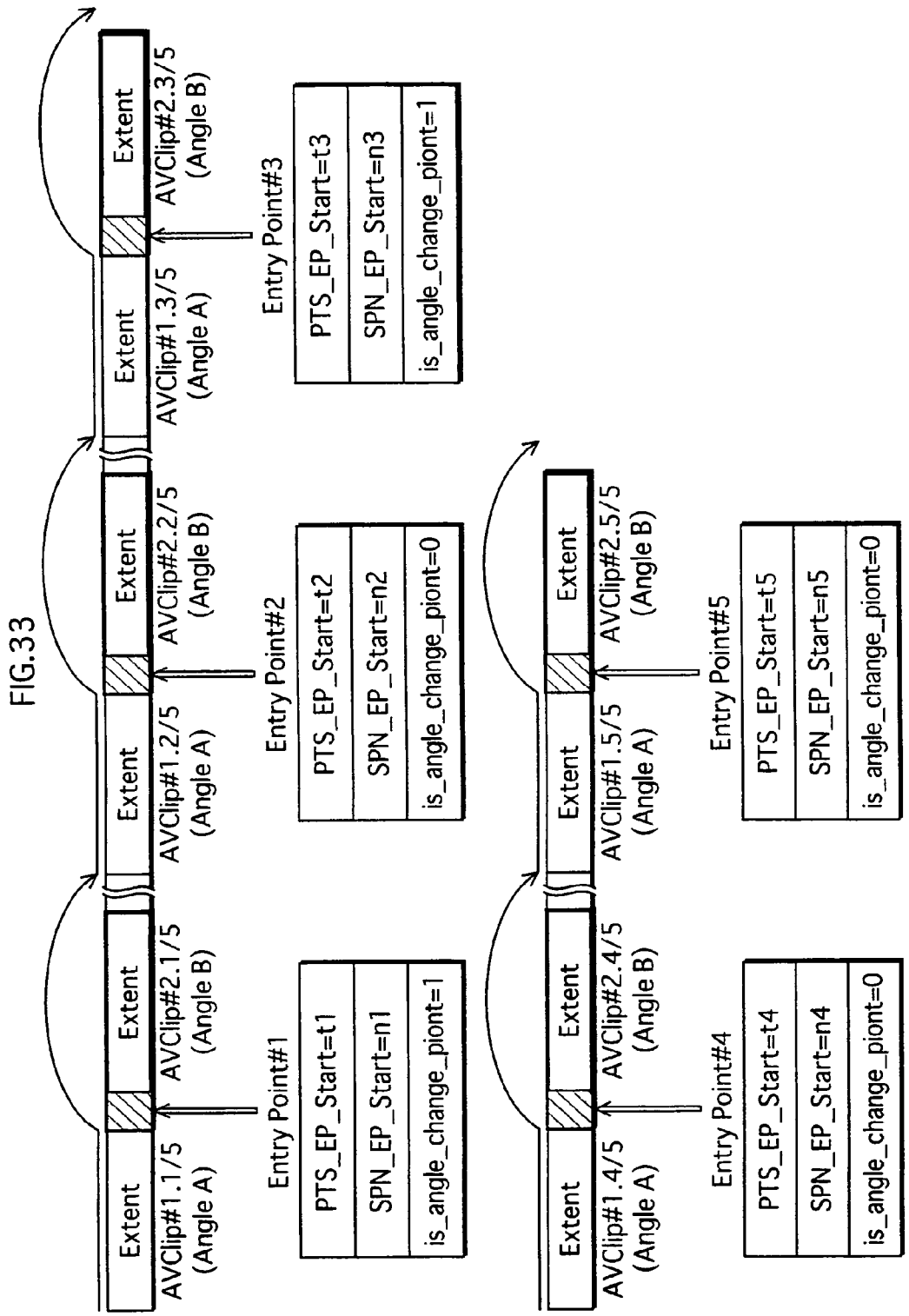
FIG. 33 illustrates a process of reading the BD-ROM for executing playback of an angle image A.
Figure 34:
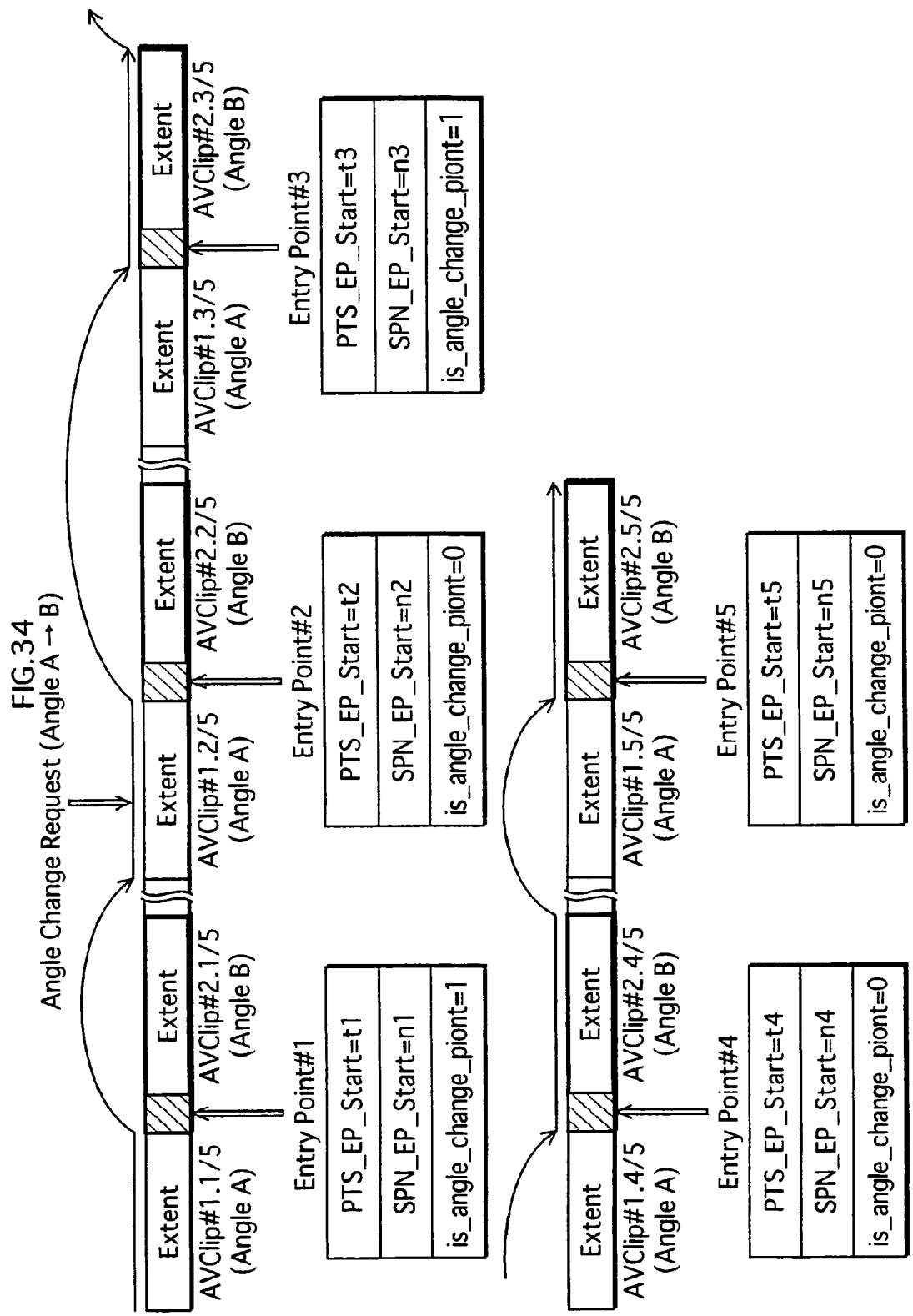
FIG. 34 illustrates a process of reading the BD-ROM performed upon receipt of a user operation of requesting an angle change.
Figure 35:
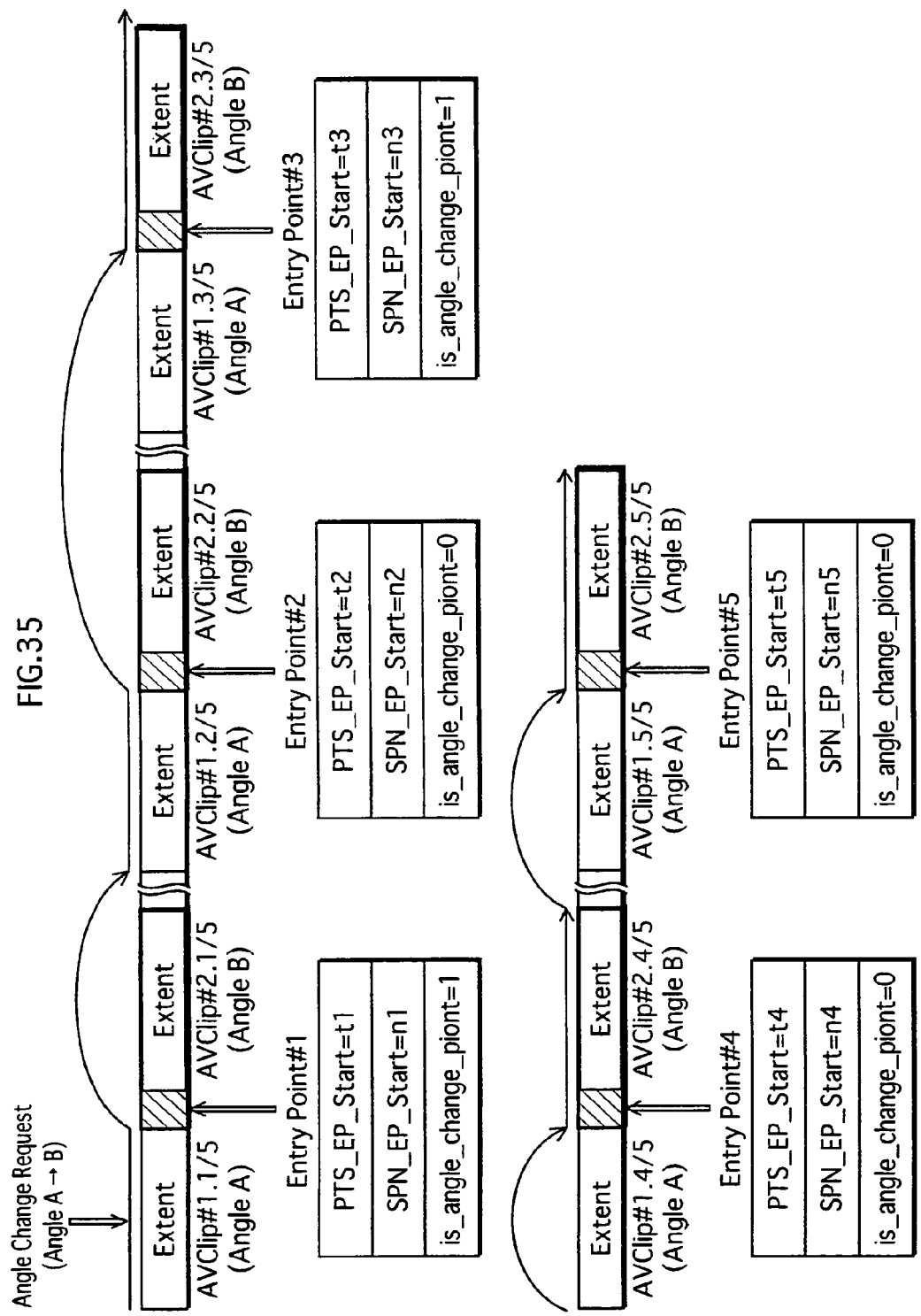
FIG. 35 illustrates a process of reading the BD-ROM performed upon receipt of a user operation of requesting an angle change.
Figure 36:
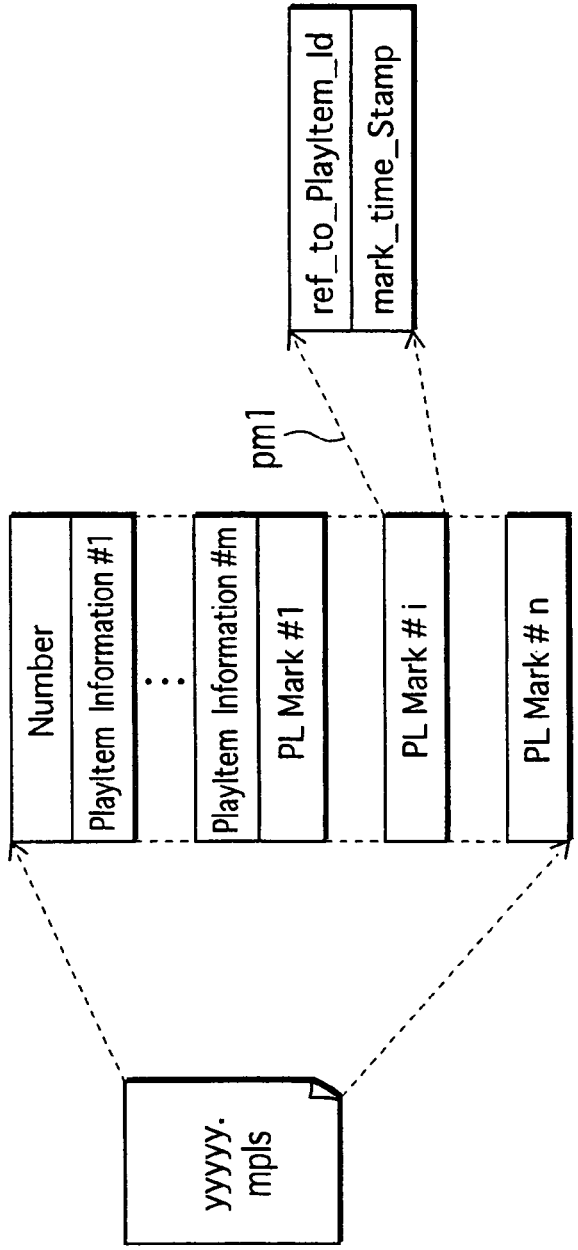
FIG. 36 illustrates the internal structure of PlayList information.
Figure 37:
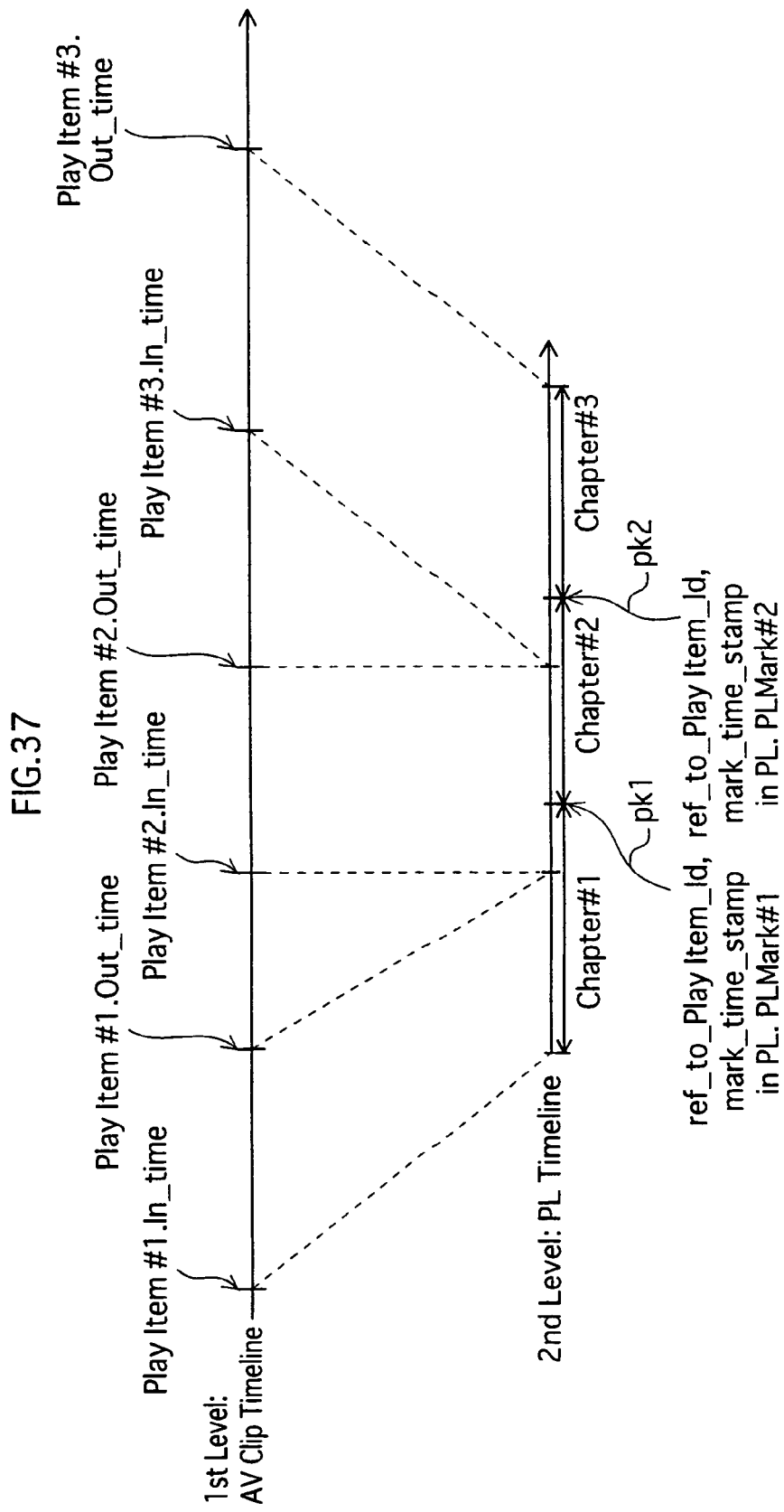
FIG. 37 illustrates chapters defined by PLMark information.
Figure 38:
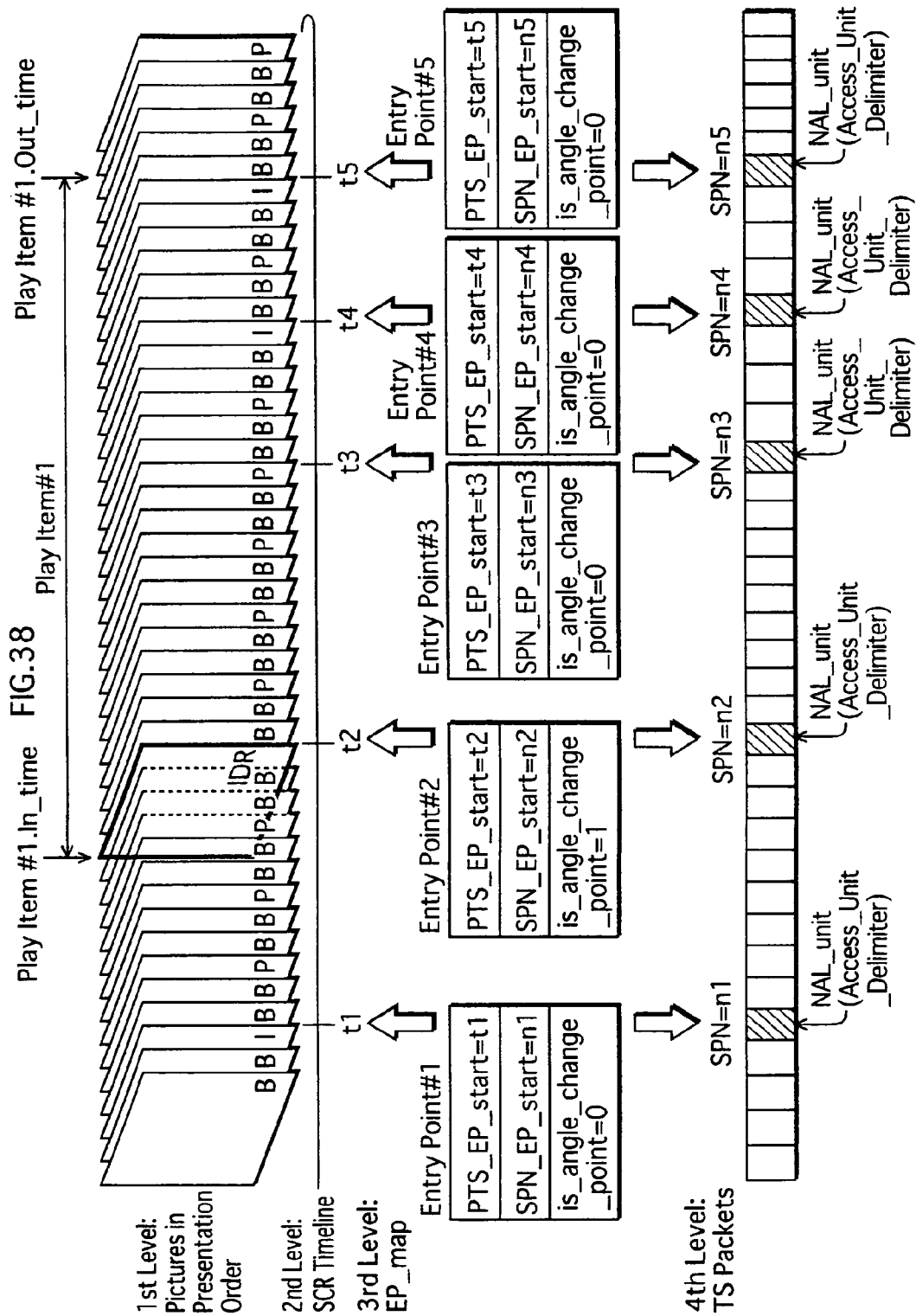
FIG. 38 illustrates pictures of a video stream used by PlayItem #1, together with the relevant part of entry_map setting.
Figure 39:
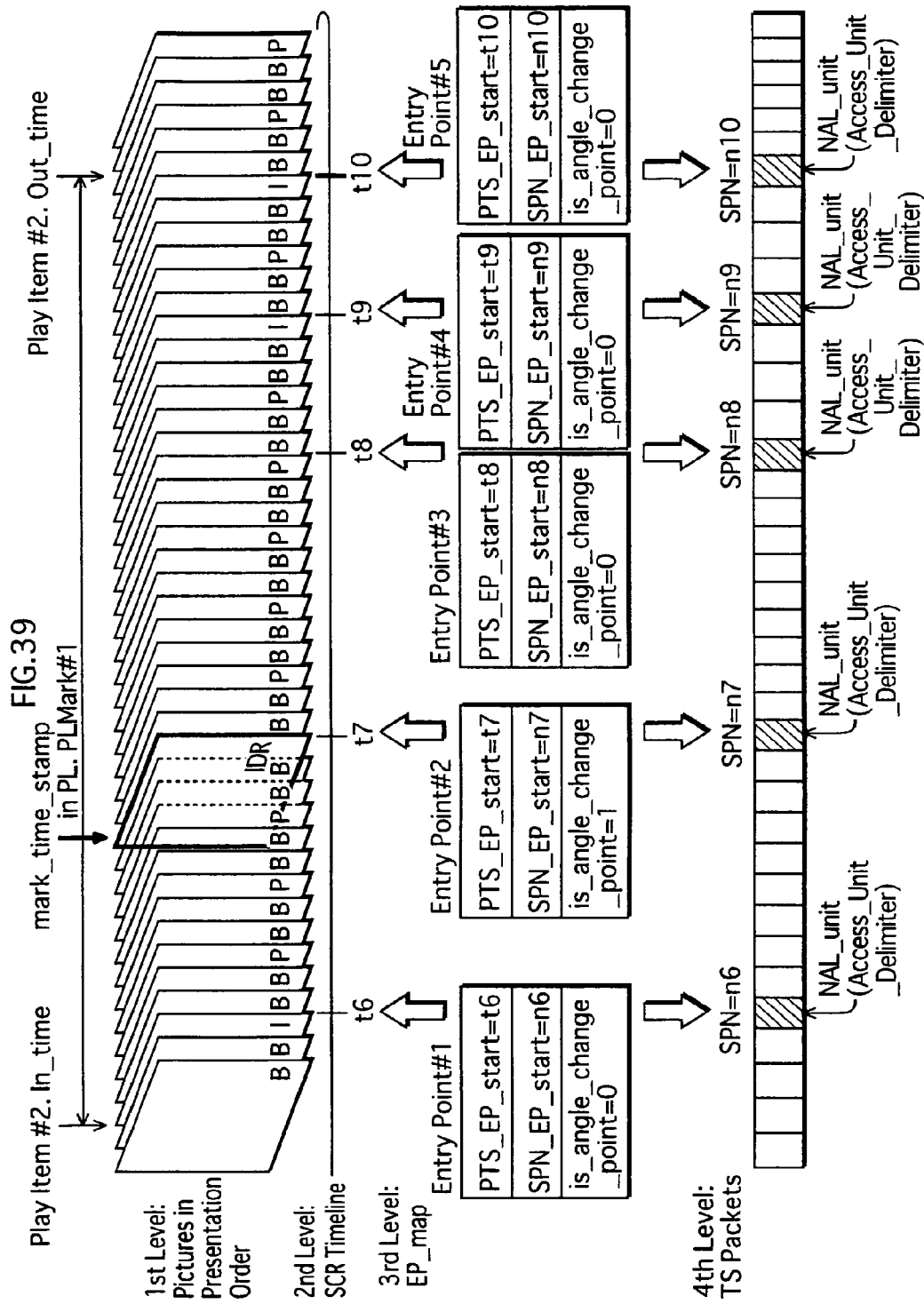
FIG. 39 illustrates pictures of a video stream used by PlayItem #2.
Figure 40:
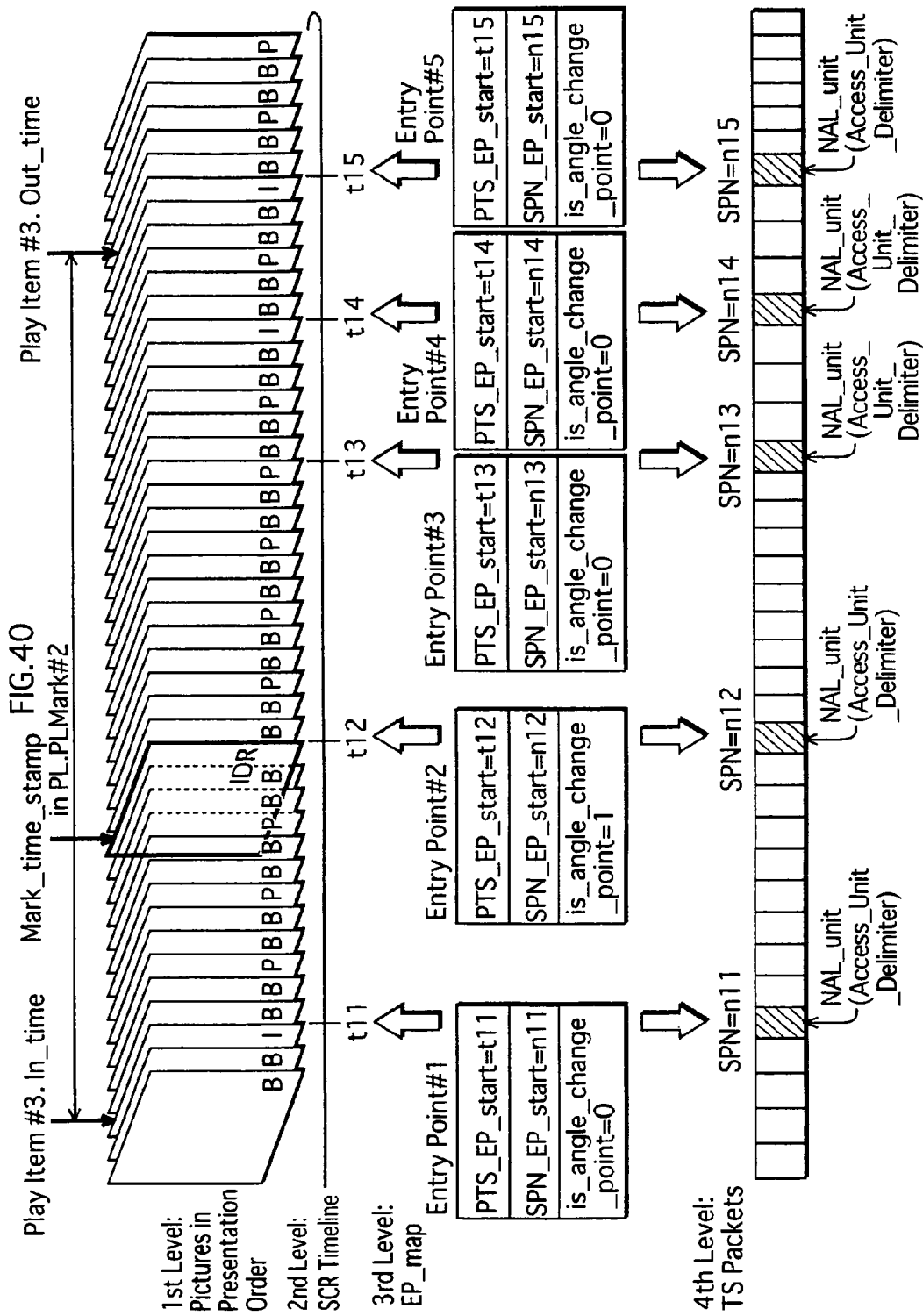
FIG. 40 illustrates pictures of a video stream used by PlayItem #3.
Figure 41:
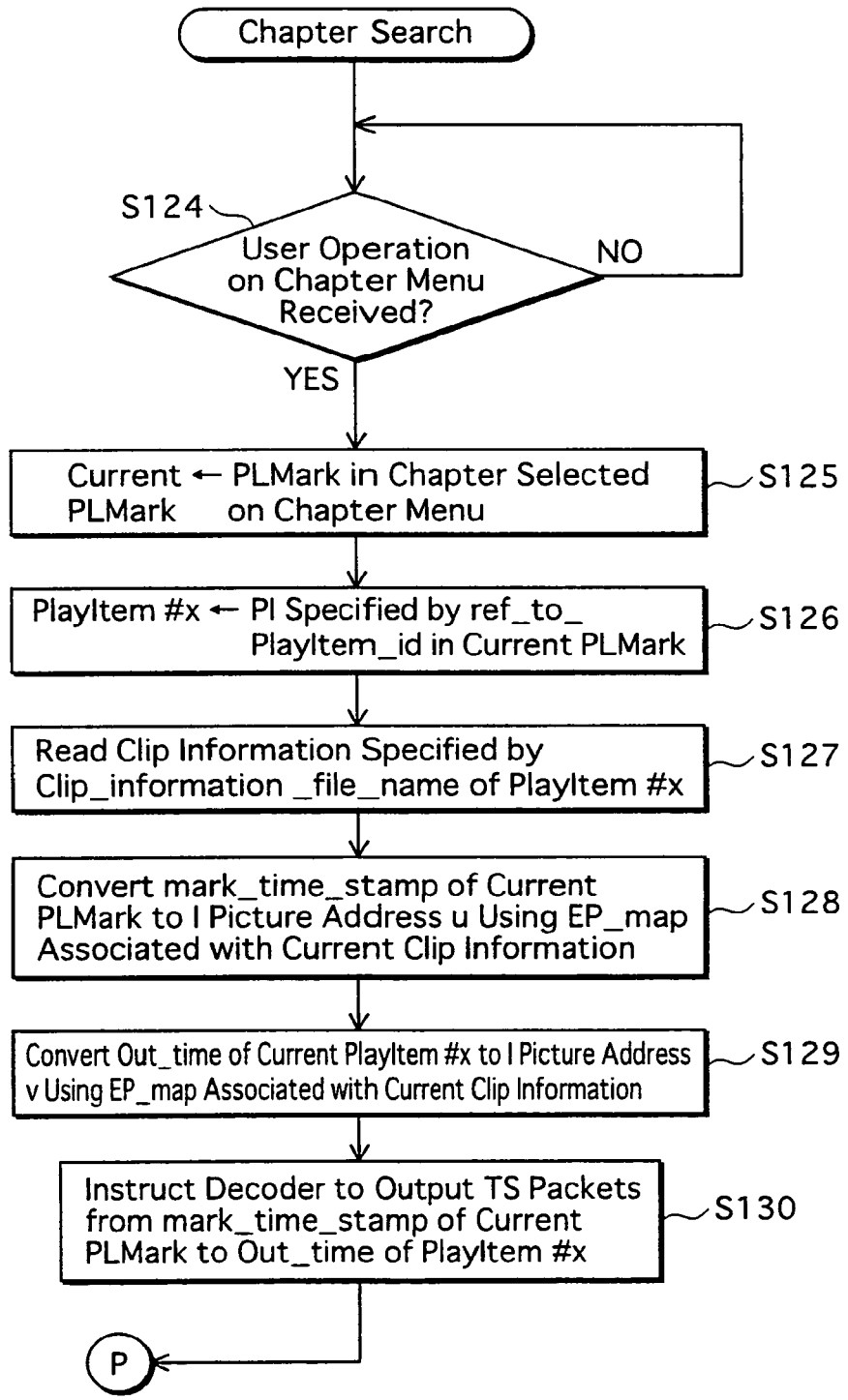
FIG. 41 is a flowchart of the processing steps for executing a chapter search function.
Figure 42:
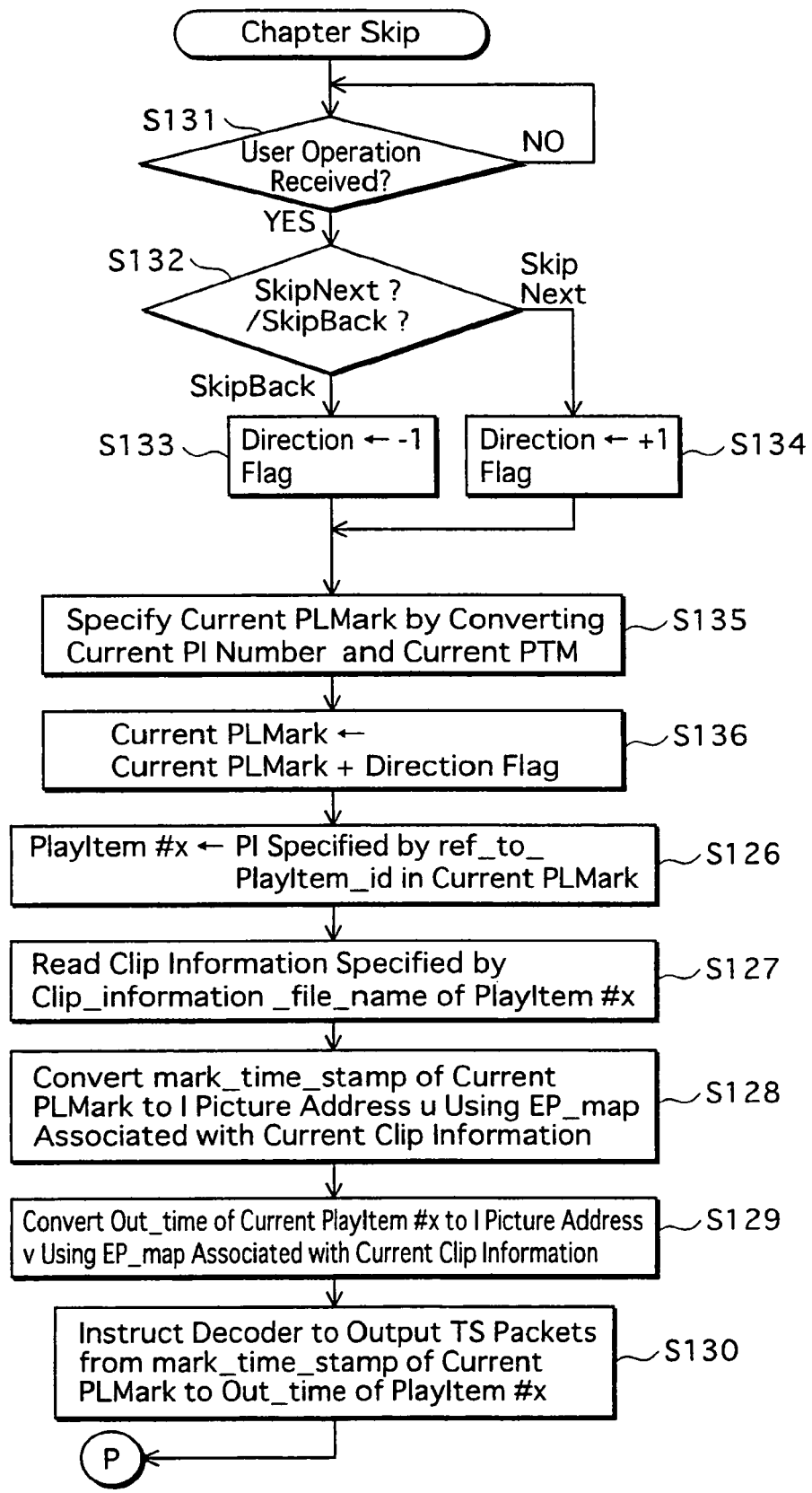
FIG. 42 is a flowchart of the processing steps for executing a chapter skip function.

| | |
|---|---|
| 1 | BD Drive |
| 2 | Arrival Time Clock Counter |
| 3 | Source De-packetizer |
| 4 | PID Filter |
| 5 | Transport Buffer |
| 6 | Multiplexed Buffer |
| 7 | Coded Picture Buffer |
| 8 | Video Decoder |
| 10 | Decoded Picture Buffer |
| 11 | Video Plane |
| 12 | Transport Buffer |
| 13 | Coded Data Buffer |
| 14 | Stream Graphics Processor |
| 15 | Object Buffer |
| 16 | Composition Buffer |
| 17 | Composition Controller |
| 18 | Presentation Graphics Plane |
| 19 | CLUT Unit |
| 20 | Transport Buffer |
| 21 | Coded Data Buffer |
| 22 | Stream Graphics Processor |
| 23 | Object Buffer |
| 24 | Composition Buffer |
| 25 | Composition Controller |
| 26 | Interactive Graphics Plane |
| 27 | CLUT Unit |
| 28 | Compositor |
| 29 | Compositor |
| 30 | Switch |
| 31 | Network Device |
| 32 | Local Storage |
| 33 | Arrival Time Clock Counter |
| 34 | Source De-Packetizer |
| 35 | PID Filter |
| 36 | Switch |
| 37 | Transport Buffer |
| 38 | Elementary Buffer |
| 39 | Audio Decoder |
| 40 | Transport Buffer |
| 41 | Buffer |
| 42 | Text Subtitle Decoder |
| 43 | Scenario Memory |
| 44 | Controller |
| 46 | PSR Set |
| 100 | BD-ROM |
| 200 | Playback Apparatus |
| 300 | Remote Controller |
| 400 | Television Set |

What is claimed is:

1. A non-transitory computer-readable recording medium having a video stream, playlist information, and an entry map recorded thereon, the video stream being an MPEG4-AVC stream and including a sequence of GOPs, each GOP having an intra picture at a start of the GOP in coding order, wherein the playlist information defines a playback path by indicating a sequence of one or more pairs of a playback start time and a playback end time within the video stream, picture data to be played back at each playback start time on a timeline of the video stream indicated in the playback path is encoded into an intra picture, the entry map indicates a plurality of entry points each of which is where the intra picture at the start of each GOP is located in the video stream, in one-to-one correspondence with a plurality of entry times and flags, each flag in the entry map indicates whether an intra picture located at the start of a corresponding GOP is an IDR picture located at the start of a Closed-GOP or a Non-IDR picture located at the start of an Open-GOP; and in response to a request for playback following the playback path, a computer is operable to execute playback of the video stream recorded on the non-transitory computer-readable recording medium by (i) specifying a nearby entry time to a playback start time of the playback path, from among entry times corresponding to a flag set to ON, and (ii) instruct a start of reading from an entry point corresponding to the specified entry time.

2. A playback apparatus for executing playback of a video stream recorded on a recording medium, comprising:

a reading unit operable to read pictures contained in the video stream from the recording medium;

a playback unit operable to play back pictures contained in the video stream; and a control unit, wherein the recording medium has playlist information and an entry map recorded thereon, the video stream is an MPEG4-AVC stream and includes a sequence of GOPs, and each GOP has an intra picture at a start of the GOP in coding order, the playlist information defines a playback path by indicating a sequence of one or more pairs of a playback start time and a playback end time within the video stream, picture data to be played back at each playback start time on a timeline of the video stream indicated in the playback path is encoded into an intra picture, the entry map indicates a plurality of entry points each of which is where the intra picture at the start of each GOP is located in the video stream, in one-to-one correspondence with a plurality of entry times and flags, each flag in the entry map indicates whether an intra picture located at the start of a corresponding GOP is an IDR picture located at the start of a Closed-GOP or a Non-IDR picture located at the start of an Open-GOP, and in response to a request for playback following the playback path, the control unit is operable to (i) specify a nearby entry time to a playback start time of the playback path, from among entry times corresponding to a flag set to ON, and (ii) instruct the reading unit to start reading from an entry point corresponding to the specified entry time.

\* \* \* \* \*